(12) United States Patent
Mino et al.

(10) Patent No.: US 12,551,285 B2
(45) Date of Patent: Feb. 17, 2026

(54) ENDOSCOPIC ULTRASOUND GUIDED TISSUE ACQUISITION

(71) Applicant: Olympus Corporation, Tokyo (JP)

(72) Inventors: Hiroyuki Mino, Westborough, MA (US); Ryohei Ogawa, Tokyo (JP); Anthony J. Spagnoli, Duxbury, MA (US)

(73) Assignee: Olympus Corporation, Tokyo (JP)

( * ) Notice: Subject to any disclaimer, the term of this patent is extended or adjusted under 35 U.S.C. 154(b) by 110 days.

(21) Appl. No.: 18/540,051

(22) Filed: Dec. 14, 2023

(65) Prior Publication Data
US 2024/0197403 A1 Jun. 20, 2024

Related U.S. Application Data

(60) Provisional application No. 63/387,752, filed on Dec. 16, 2022, provisional application No. 63/387,531, filed on Dec. 15, 2022.

(51) Int. Cl.
*A61B 34/10* (2016.01)
*A61B 8/08* (2006.01)
(Continued)

(52) U.S. Cl.
CPC ............ *A61B 34/10* (2016.02); *A61B 8/085* (2013.01); *A61B 8/12* (2013.01); *A61B 10/04* (2013.01); *A61B 34/20* (2016.02); *A61B 34/30* (2016.02); *A61B 90/06* (2016.02); *A61B 2034/107* (2016.02); *A61B 2034/2063* (2016.02); *A61B 2034/301* (2016.02); *A61B 2090/064* (2016.02)

(58) Field of Classification Search
CPC ........... A61B 34/10; A61B 8/085; A61B 8/12; A61B 10/04; A61B 34/20; A61B 34/30; A61B 90/06; A61B 2034/107; A61B 2034/2063; A61B 2034/301; A61B 2090/064
See application file for complete search history.

(56) References Cited

U.S. PATENT DOCUMENTS

| 6,141,437 A * | 10/2000 | Xu ........................ G06T 7/0012 382/172 |
| 8,750,615 B2 * | 6/2014 | Rollins ................ A61B 5/0066 382/173 |

(Continued)

*Primary Examiner* — Sanjay Cattungal
(74) *Attorney, Agent, or Firm* — Schwegman Lundberg & Woessner, P.A.

(57) ABSTRACT

Systems, devices, and methods for planning endoscopic ultrasound (EUS)-guided tissue acquisition (EUS-TA) from an anatomical target are disclosed. An endoscopy system comprises a steerable elongate instrument including an EUS probe to produce ultrasound scans of the anatomical target, and a tissue acquisition device to sample tissue. A processor receives image of the anatomical target including one or more EUS images converted from the ultrasound scans, apply the images to a trained machine-learning model to generate an EUS-TA plan. The EUS-TA plan may include a recommended tissue acquisition device, and recommended values of operational parameters for manipulating the tissue acquisition device, navigating the steerable elongate instrument, or positioning the EUS probe. The EUS-TA plan can be presented to a user, or used to facilitate a robot-assisted tissue acquisition procedure.

19 Claims, 21 Drawing Sheets

(51) Int. Cl.
  *A61B 8/12* (2006.01)
  *A61B 10/04* (2006.01)
  *A61B 34/20* (2016.01)
  *A61B 34/30* (2016.01)
  *A61B 90/00* (2016.01)

(56) References Cited

U.S. PATENT DOCUMENTS

| | | | |
|---|---|---|---|
| 9,351,642 B2* | 5/2016 | Nadkarni | A61B 5/02007 |
| 9,730,613 B2* | 8/2017 | Stigall | A61B 8/0891 |
| 9,770,172 B2* | 9/2017 | Sturm | A61B 8/4416 |
| 9,940,723 B2* | 4/2018 | Gopinath | G06T 7/13 |
| 2005/0036150 A1* | 2/2005 | Izatt | G01B 9/02044 |
| | | | 356/479 |
| 2011/0257505 A1* | 10/2011 | Suri | G16H 50/30 |
| | | | 600/443 |
| 2011/0257545 A1* | 10/2011 | Suri | A61B 8/5223 |
| | | | 600/508 |
| 2012/0078099 A1* | 3/2012 | Suri | A61B 8/483 |
| | | | 600/440 |
| 2013/0338496 A1* | 12/2013 | Hielscher | A61B 5/0064 |
| | | | 600/425 |
| 2015/0138507 A1* | 5/2015 | Thomsen | G02F 1/35 |
| 2015/0213629 A1* | 7/2015 | Celi | G06T 11/005 |
| | | | 382/128 |
| 2023/0071306 A1* | 3/2023 | Miller | A61B 5/6852 |
| 2024/0078671 A1* | 3/2024 | Buckler | G06F 18/2148 |

* cited by examiner

ENDOSCOPIC ULTRASOUND GUIDED TISSUE ACQUISITION

CROSS-REFERENCE TO RELATED APPLICATIONS

This application is based upon and claims the benefit of priority to U.S. Provisional Application Ser. No. 63/387,531, filed on Dec. 15, 2022, and U.S. Provisional Application Ser. No. 63/387,752, filed on Dec. 16, 2022, the entire contents of which is incorporated herein by reference.

FIELD OF THE DISCLOSURE

The present document relates generally to endoscopy systems, and more particularly to systems and methods for endoscopic ultrasound (EUS)-guided tissue acquisition using artificial intelligence (AI).

BACKGROUND

Endoscopes have been used in a variety of clinical procedures, including, for example, illuminating, imaging, detecting and diagnosing one or more disease states, providing fluid delivery (e.g., saline or other preparations via a fluid channel) toward an anatomical region, providing passage (e.g., via a working channel) of one or more therapeutic devices or biological matter collection devices for sampling or treating an anatomical region, and providing suction passageways for collecting fluids (e.g., saline or other preparations), among other procedures. Examples of such anatomical region may include gastrointestinal tract (e.g., esophagus, stomach, duodenum, pancreaticobiliary duct, intestines, colon, and the like), renal area (e.g., kidney(s), ureter, bladder, urethra) and other internal organs (e.g., reproductive systems, sinus cavities, submucosal regions, respiratory tract), and the like.

Some endoscopes include a working channel through which an operator can perform suction, placement of diagnostic or therapeutic devices (e.g., a brush, a biopsy needle or forceps, a stent, a basket, or a balloon), or minimally invasive surgeries such as tissue sampling or removal of unwanted tissue (e.g., benign or malignant strictures) or foreign objects (e.g., calculi). Some endoscopes can be used with a laser or plasma system to deliver energy to an anatomical target (e.g., soft or hard tissue or calculi) to achieve desired treatment. For example, laser has been used in applications of tissue ablation, coagulation, vaporization, fragmentation, and lithotripsy to break down calculi in kidney, gallbladder, ureter, among other stone-forming regions, or to ablate large calculi into smaller fragments.

Endoscopic ultrasound (EUS) is a specialized endoscopy that combines conventional endoscopy with ultrasound to obtain images of internal organs such as upper gastrointestinal (GI) tract, including organs such as the stomach, pancreas, bile duct, liver and lymph nodes, etc. An echoendoscope includes at its tip an ultrasound transducer that emits ultrasound waves and converts the ultrasound echoes into detailed images of the target organ or tissue such as pancreas and surrounding abdominal organs. Although EUS is established as a diagnostic modality with high-resolution imaging, various EUS-based interventions and techniques have emerged, including EUS-guided tissue acquisition; EUS-based pancreatic fluid collection drainage, pancreatic duct drainage, gallbladder drainage, and biliary drainage; EUS-guided pancreatic cyst ablation; EUS-guided vascular interventions; among others. EUS has also been used for cancer pain relief (celiac plexus neurolysis), and targeted cancer treatment via brachytherapy, radiofrequency ablation, or injection therapy.

EUS-guided fine-needle aspiration (EUS-FNA) combines steps of ultrasound imaging, tissue sampling, and on occasion collection of pancreatic cyst fluid. A biopsy sample can be analyzed to investigate any swelling or growths of the digestive system, such as to determine the type of tissue growth (cancerous or benign) in stomach or pancreas. FNA uses a specialized needle that can be inserted through the wall of the stomach or intestine into the pancreas. Using EUS for guidance the physician is able to accurately visualize and direct the needle to the target area. A fine needle is directed to a target site, and suction is applied to the proximal end of a lumen of the needle to aspirate cells through its distal end.

Another type of EUS-guided tissue acquisition uses needles designed to obtain biopsy specimens, also known as fine-needle biopsy (FNB) needles. The EUS-guided FNB (EUS-FNB) allows a physician to obtain a larger sample size (e.g., a larger number of cells in the sample or a "core" comprising intact adjacent cells held together in similar form to their native location) without requiring a larger-gauge needle or requiring multiple passes of the needle to reliably obtain a diagnostically efficacious sample with regard to the number and integrity of the cells in the sample.

SUMMARY

The present disclosure recognizes several technological problems to be solved with conventional endoscopes, such as duodenoscopes used for diagnostics and retrieval of sample biological matter. One of such problems is increased difficulty in navigating endoscopes, and instruments inserted therein (e.g., tissue acquisition devices), to locations in anatomical regions deep within a patient. For example, as the endoscope and the tissue acquisition device have become progressively smaller to be inserted sequentially into in progressively smaller lumens, it has become more difficult to maneuver and navigate the endoscope through the patient anatomy, maintain endoscope stabilization, and maintain correct cannulation position in a narrow space (e.g., the bile duct). It can also be difficult to maintain an appropriate cannulation angle due to limited degree of freedom in scope elevator. Cannulation and endoscope navigation require advanced surgical skills and manual dexterity, which can be particularly challenging for less-experienced operating physicians (e.g., surgeons or endoscopists).

The difficulty in cannulation and endoscope navigation may also be attributed to variability of patient anatomy, especially patients with surgically altered or otherwise difficult anatomy. For example, in Endoscopic Retrograde Cholangio-Pancreatography (ERCP) procedures for diagnosing and/or treating certain pancreaticobiliary problems, some patients may have altered anatomy to a portion of the GI tract or the pancreaticobiliary system (e.g., the ampulla). In some patients, stricture ahead of pancreas can compress the stomach and part of duodenum, making it difficult to navigate the duodenoscope in a limited lumen of the compressed duodenum and to navigate the cholangioscope to reach the duodenal papilla, the point where the dilated junction of the pancreatic duct and the bile duct (ampulla of Vater) enter the duodenum. Some patients have altered papilla anatomy. With the endoscope designed to be stable in the duodenum, it can be more difficult to reach the duodenal papilla in surgically altered anatomy.

Another identified problem of conventional endoscopy system, in its application of tissue acquisition or biopsy procedures, is a lack of capability of automatic tissue acquisition planning tailored for individual patient's anatomy and medical conditions. One goal of endoscopic tissue acquisition is to sample a sufficient amount of biopsy tissue in one biopsy procedure. Needle, knife, and biopsy forceps are the most commonly used tissue acquisition devices, while other tools are available, including brushes, snares, and suction devices. Proper tissue acquisition planning, such as determining suitable tools and proper operation and navigation of such tools, is crucial for effective and efficient tissue collection, especially in a robot-assisted tissue acquisition procedure. Conventional endoscopic tissue acquisition generally relies on manual procedure planning, where a physician picks a tissue acquisition tool and planning the operation with such selected tool. The manual planning can be time consuming, and heavily dependent on endoscopists' experience and skills. Often times, to determine a proper tissue acquisition device, the physician needs to take into consideration a multitude of factors including size, characteristics, and location of the target tissue, its neighboring environment, local conditions at the surgical site (e.g., tissue inflammation), and patient general health status, among others. For inexperienced physicians or endoscopists, it can be challenging to determine what tools to use and how to best manipulate such tools to maximize the amount of tissue collected while minimizing complications and preserving tissue functionality at the acquisition site, especially in patients with surgically altered or otherwise difficult anatomy. Furthermore, the accuracy of EUS-guided tissue acquisition (e.g., the exact biopsy site and the amount of biopsy tissue to be collected) can be affected by EUS image quality. Surgically altered anatomy in some patients add more difficulty to manual tissue acquisition planning and may reduce the tissue acquisition accuracy. More advanced procedure planning and improved visualization capabilities would be desirable to improve procedure accuracy.

The present disclosure can help solve these and other problems by providing systems, devices and method for automatic procedure planning for EUS-guided tissue acquisition (EUS-TA). Artificial intelligence (AI) or machine learning (ML) technologies can be used to produce individualized EUS-TA plan. According to one embodiment, an endoscopy system comprises a steerable elongate instrument configured to be positioned and navigated in a patient anatomy. The steerable elongate instrument may include an EUS probe to produce ultrasound scans of an anatomical target, and a tissue acquisition device to sample tissue from the anatomical target. A processor can receive images including one or more EUS images converted from the ultrasound scans of the anatomical, apply said one or more images to a trained ML model to generate an EUS-TA plan. The EUS-TA plan may include a recommended tissue acquisition device, recommended values of one or more operational parameters for manipulating the tissue acquisition device, recommended navigation path for passing the steerable elongate instrument, or positions and postures of the EUS probe. The tissue acquisition plan can be presented to a user on a user interface as a perioperative guidance to assist the operating physician during the procedure. In some examples, the system may include a controller to control an actuator to robotically facilitate tissue acquisition in accordance with the EUS-TA plan.

The AI-based tissue acquisition planning, including automated identification of tissue acquisition devices and parameters for manipulating said tools, the EUS probe, and the endoscope, can improve the efficiency of tissue acquisition and operation reliability. This can be especially desirable in a robot-assisted endoscopic procedure. Enhanced automation in endoscopic procedure can help ease the burden manual surgical planning, reduce variability of procedure outcome due to variations in experience and dexterity across operating physicians (e.g., surgeons or endoscopists), and improve the endoscopic procedure prognostic predictability. As a result, overall procedure efficiency, accuracy, patient safety, and endoscopic procedure success rate can be improved.

Example 1 is an endoscopic system, comprising: a steerable elongate instrument configured to be positioned and navigated in a patient anatomy, the steerable elongate instrument comprising (i) an endoscopic ultrasound (EUS) probe configured to produce ultrasound scans of an anatomical target and (ii) a tissue acquisition device configured to sample tissue from the anatomical target; and a processor configured to: receive images including one or more EUS images converted from the ultrasound scans of the anatomical target; apply the received images to at least one trained machine-learning (ML) model to generate an EUS-guided tissue acquisition (EUS-TA) plan; and provide the EUS-TA plan to a user or a robotic endoscopy system to sample the tissue from the anatomical target during an endoscopic procedure.

In Example 2, the subject matter of Example 1 optionally includes, wherein the received images include one or more preoperative images prior to the endoscopic procedure or one or more perioperative image during the endoscopic procedure.

In Example 3, the subject matter of any one or more of Examples 1-2 optionally include, wherein the processor is configured to select a subset of the received images based on image qualities, and to apply the selected subset of the received images to the at least one trained ML model to generate the EUS-TA plan.

In Example 4, the subject matter of any one or more of Examples 1-3 optionally include a force sensor associated with the EUS probe, the force sensor configured to sense a contact force between the EUS probe and a surface of the anatomical target when the ultrasound scans are taken, wherein the processor is configured to select a subset of the received one or more EUS images that correspond to the sensed contact force being maintained at a substantially constant value, and to apply the selected subset of the received one or more EUS images to the at least one trained ML model to generate the EUS-TA plan.

In Example 5, the subject matter of any one or more of Examples 1-4 optionally include a user interface configured to present the received images and the EUS-TA plan to the user.

In Example 6, the subject matter of any one or more of Examples 1-5 optionally include a controller configured to generate a control signal to an actuator of the robotic endoscopy system to robotically facilitate (i) navigation of the steerable elongate instrument or (ii) manipulation of one or more of the EUS probe or the tissue acquisition device in accordance with the EUS-TA plan.

In Example 7, the subject matter of any one or more of Examples 1-6 optionally include, wherein the processor includes a training module configured to generate the trained ML model using a training dataset comprising (i) images including EUS images of respective anatomical targets of a plurality of patients undergoing EUS-TA procedures and (ii) EUS-TA plans for the plurality of patients as used in the EUS-TA procedures.

In Example 8, the subject matter of any one or more of Examples 1-7 optionally include, wherein the EUS-TA plan includes a recommended type or size of the tissue acquisition device for use in the endoscopic procedure.

In Example 9, the subject matter of Example 8 optionally includes, wherein the tissue acquisition device includes at least one of a tissue aspiration needle, a tissue biopsy needle, a brush, a snare, forceps, or a suction device.

In Example 10, the subject matter of any one or more of Examples 1-9 optionally include, wherein the EUS-TA plan includes a recommended type or size of at least one of an ablation device, a drainage device, or a stricture management device.

In Example 11, the subject matter of any one or more of Examples 1-10 optionally include, wherein the EUS-TA plan includes one or more operational parameters for navigating the steerable elongate instrument, or for maneuvering the tissue acquisition device to facilitate tissue acquisition.

In Example 12, the subject matter of Example 11 optionally includes, wherein the one or more operational parameters include a position, a posture, a heading direction, or an angle of the tissue acquisition device relative to the anatomical target.

In Example 13, the subject matter of any one or more of Examples 11-12 optionally include, wherein the one or more operational parameters include a navigation path for navigating the steerable elongate instrument or maneuvering the EUS probe to the anatomical target.

In Example 14, the subject matter of any one or more of Examples 1-13 optionally include, wherein the EUS-TA plan includes one or more operational parameters for positioning and maneuvering the EUS probe to take the ultrasound scans of the anatomical target.

In Example 15, the subject matter of Example 14 optionally includes, wherein the one or more operational parameters include one or more of a position, posture, a heading direction, or an angle of the EUS probe relative to the anatomical target.

In Example 16, the subject matter of any one or more of Examples 14-15 optionally include, wherein the one or more operational parameters include a force the EUS probe exerted on a surface of the anatomical target when the ultrasound scans are taken.

In Example 17, the subject matter of any one or more of Examples 1-16 optionally include, wherein the processor is configured to apply the received images of the anatomical target to the at least one trained ML model to recognize a lesion on the anatomical target and to determine tissue malignancy of the lesion.

In Example 18, the subject matter of Example 17 optionally includes, wherein the processor is configured to generate the EUS-TA plan further based on the recognized lesion and the determined tissue malignancy.

In Example 19, the subject matter of any one or more of Examples 17-18 optionally include a microscopic imaging device coupled to the steerable elongate instrument, the microscopic imaging device configured to generate an in-vivo and substantially real-time microscopic image of the recognized lesion, wherein the processor is configured to determine the tissue malignancy using the in-vivo and substantially real-time microscopic image.

In Example 20, the subject matter of any one or more of Examples 17-19 optionally include, wherein the processor is configured to present the in-vivo and substantially real-time microscopic image to the user on a user interface.

Example 21 is a method of endoscopic ultrasound (EUS)-based tissue acquisition from an anatomical target via an steerable elongate instrument, the method comprising: receiving images including one or more EUS images converted from ultrasound scans of the anatomical target, the ultrasound scans produced using an EUS probe associated with the steerable elongate instrument; generating an EUS-guided tissue acquisition (EUS-TA) plan using the received images and at least one trained machine-learning (ML) model; and providing the EUS-TA plan to a user or a robotic endoscopy system to sample tissue from the anatomical target during an endoscopic procedure using a tissue acquisition device associated with the steerable elongate instrument.

In Example 22, the subject matter of Example 21 optionally includes presenting the received images and the EUS-TA plan to the user on a user interface.

In Example 23, the subject matter of any one or more of Examples 21-22 optionally include generating a control signal to an actuator of the robotic endoscopy system to robotically facilitate (i) navigation of the steerable elongate instrument or (ii) manipulation of one or more of the EUS probe or the tissue acquisition device in accordance with the EUS-TA plan.

In Example 24, the subject matter of any one or more of Examples 21-23 optionally include selecting a subset of the received images based on image qualities, wherein generating the EUS-guided tissue acquisition (EUS-TA) plan includes applying the selected subset of the received images to the at least one trained ML model.

In Example 25, the subject matter of any one or more of Examples 21-24 optionally include sensing a contact force between the EUS probe and a surface of the anatomical target when the ultrasound scans are taken a force sensor associated with the EUS probe, and selecting a subset of the received one or more EUS images that correspond to the sensed contact force being maintained at a substantially constant value, wherein generating the EUS-guided tissue acquisition (EUS-TA) plan includes applying the selected subset of the received one or more EUS images to the at least one trained ML model.

In Example 26, the subject matter of any one or more of Examples 21-25 optionally include, wherein the EUS-TA plan includes a recommended type or size of the tissue acquisition device, an ablation device, a drainage device, or a stricture management device for use in the endoscopic procedure.

In Example 27, the subject matter of any one or more of Examples 21-26 optionally include, wherein the EUS-TA plan includes one or more operational parameters for navigating the steerable elongate instrument, or for maneuvering the tissue acquisition device to facilitate tissue acquisition.

In Example 28, the subject matter of Example 27 optionally includes, wherein the one or more operational parameters include a position, a posture, a heading direction, or an angle of the tissue acquisition device relative to the anatomical target.

In Example 29, the subject matter of any one or more of Examples 27-28 optionally include, wherein the one or more operational parameters include a navigation path for navigating the steerable elongate instrument or maneuvering the EUS probe to the anatomical target.

In Example 30, the subject matter of any one or more of Examples 21-29 optionally include, wherein the EUS-TA plan includes one or more operational parameters for positioning and maneuvering the EUS probe to take the ultrasound scans of the anatomical target.

In Example 31, the subject matter of Example 30 optionally includes, wherein the one or more operational parameters include one or more of a position, posture, a heading direction, or an angle of the EUS probe relative to the anatomical target.

In Example 32, the subject matter of any one or more of Examples 30-31 optionally include, wherein the one or more operational parameters include a force the EUS probe exerted on a surface of the anatomical target when the ultrasound scans are taken.

In Example 33, the subject matter of any one or more of Examples 21-32 optionally include: applying the received images of the anatomical target to the at least one trained ML model to recognize a lesion on the anatomical target and to determine tissue malignancy of the lesion; and generating the EUS-TA plan further based on the recognized lesion and the determined tissue malignancy.

In Example 34, the subject matter of Example 33 optionally includes: generating an in-vivo and substantially real-time microscopic image of the recognized lesion using a microscopic imaging device coupled to the steerable elongate instrument; and determining the tissue malignancy using the in-vivo and substantially real-time microscopic image.

The presented techniques are described in terms of health-related procedures, but are not so limited. This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

DETAILED DESCRIPTION

This document describes AI-based systems, devices, and methods for planning an endoscopic tissue acquisition procedure for sampling tissue from an anatomical target. According to one embodiment, an endoscopy system comprises a steerable elongate instrument and a processor. The steerable elongate instrument includes an endoscopic ultrasound (EUS) probe to produce ultrasound scans of an anatomical target, and a tissue acquisition device to sample tissue from an anatomical target. The processor can receive images including one or more EUS images converted from the ultrasound scans of the anatomical target, apply the received images to at least one trained ML model to generate an EUS-guided tissue acquisition (EUS-TA) plan including a recommended tissue acquisition device, and recommended values of operational parameters for manipulating the tissue acquisition device, navigating the steerable elongate instrument, or positioning the EUS probe. The EUS-TA plan can be presented to a user, or provided to a robotic endoscopy system to facilitate robot-assisted tissue acquisition.

Figure 1:
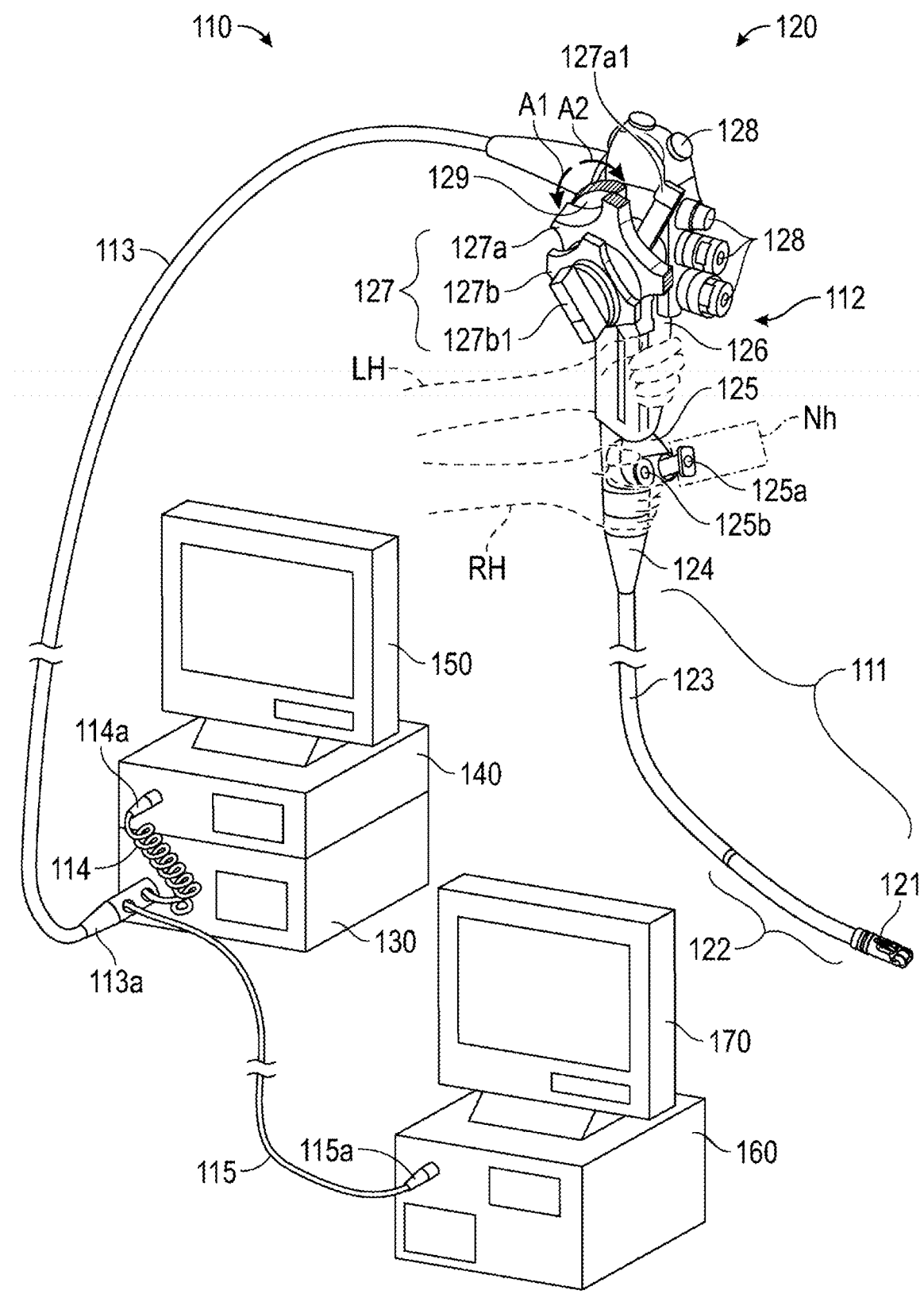
FIG. 1 is a schematic diagram illustrating an example of an echoendoscopy system for use in endoscopic ultrasound (EUS) procedures.

FIG. 1 is a schematic diagram illustrating an example of an echoendoscopy system 100 for use in endoscopic ultrasound (EUS) procedures for diagnostic or treatment purposes, such as EUS-guided tissue acquisition. The echoendoscopy system 100 comprises an ultrasound endoscope, also referred to as an echoendoscope 120, a light source apparatus 130, a video processor 140, a first monitor 150 for displaying an optical image, an ultrasound observation apparatus 160, and a second monitor 170 for displaying an ultrasound image.

The echoendoscope 120 includes an insertion portion 111, an operation portion 112 from which the insertion portion 111 extends, and a universal cord 113 that from the operation portion 112. The insertion portion 111 extends in a longitudinal direction and configured to be inserted into a living body. The universal cord 113 can be connected to the light source apparatus 130 via a scope connector 113A provided at a proximal end portion. A coiled scope cable 114 and an ultrasound signal cable 115 extend from the scope connector 113A. An electric connector portion 114A is provided at one end of the scope cable 114. The electric connector portion 114A can be connected to the video processor 140. An ultrasound connector portion 115A is provided at one end of the ultrasound signal cable 115. The ultrasound connector portion 115A can be connected to the ultrasound observation apparatus 160.

The insertion portion 111 of the echoendoscope 120 can be configured to consecutively connect a distal end portion 121, a bending portion 122, and a flexible tube portion 123 in that order from the distal end. Channel opening portions, an optical observation window, an optical illuminating window and an ultrasound transducer, or the like are arranged on one side of the distal end portion 121, as to be described further with reference to FIGS. 2A-2B.

The operation portion 112 may include a bend preventing portion 124 from which the insertion portion 111 extends, a channel opening setting portion 125, an operation portion body 126 making up a grip portion, a bending operation portion 127 including two bending operation knobs 127A and 127B provided so as to superimpose on one another on one upper side of this operation portion body 126, a plurality of switches 128 that instruct the execution of various endoscope functions and a raising lever 129 for operating a raising stand. Examples of the switches 128 include an air/water feeding button, a suction button and a freeze button.

The channel opening setting portion 125 is provided on one side in the lower part of the operation portion body 126 and provided with one or more ports each configured to receive respective treatment instruments. By way of example and not limitation, two forceps ports 125A and 125B are disposed at the channel opening setting portion 125. Such forceps ports can communicate with respective two channel opening portions provided at the distal end portion 121 of the insertion portion 111 via two respective treatment instrument channels (not shown) inside the insertion portion 111. In an example, the forceps port 125A can receive a tissue acquisition device, such as a fine needle for use in EUS-guided tissue acquisition, such as EUS-FNA or EUS-FNB. In an example, the forceps port 125B can receive a cannula for use in endoscopic retrograde cholangiopancreatography (ERCP). A puncture needle handle portion Nh shown by a single-dot dashed line is fitted into the forceps port 125A.

The two forceps ports 125A and 125B can be arranged at the channel opening setting portion 125 such that when the operator brings the right hand RH close to the channel opening setting portion 125, the forceps port closer to the right hand RH becomes the forceps port 125B and the forceps port farther from the right hand RH becomes the forceps port 125A. More specifically, as shown by a dotted line in FIG. 1, the operator manipulates the treatment instrument inserted into each forceps port by the right hand RH while holding the operation portion body 126 by the left hand LH. The manipulation using the treatment instrument such as ERCP cannula has a higher degree of difficulty than manipulation using a treatment instrument of an EUS-FNA puncture apparatus. Thus, the forceps port 125B for a treatment instrument such as cannula requiring fine manipulation when the operator holds the operation portion body 126 by the left hand LH is arranged at the channel opening setting portion 125 so as to be located on the right side compared to the forceps port 125A when seen from the operator.

The bending knob 127A is a vertical direction bending knob and the bending knob 127B is a horizontal direction bending knob. A bending fixing lever 127A1 for fixing the vertical direction bending state is provided on the proximal end side of the bending knob 127A and a bending fixing lever 127B1 for fixing the horizontal direction bending state is provided on the distal end side of the bending knob 127B.

An image pickup section for acquiring an optical image inside a subject, and an illumination section and an ultrasound transducer section (see FIGS. 2A and 2B) for acquiring an ultrasound tomographic image inside the subject are provided at the distal end portion 121 of the echoendoscope 120. This allows the operator to insert the echoendoscope 120 into the subject and causes the monitors 150 and 170 to display an optical image and an ultrasound tomographic image inside the subject at a desired position in the subject respectively.

Figure 2A:
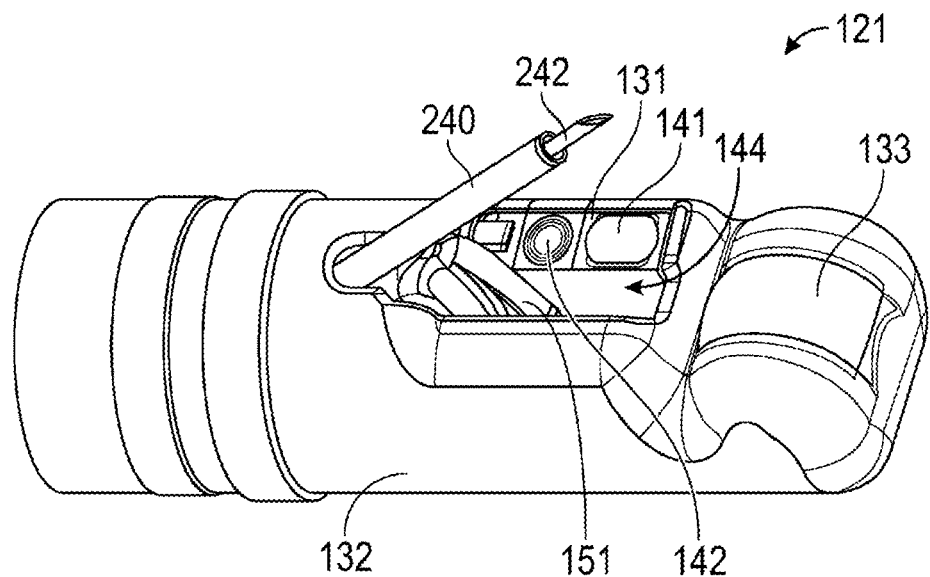
FIGS. 2A-2B illustrate perspective views of a distal end portion of an echoendoscope that includes an EUS probe and a treatment instrument such as a tissue acquisition device.
Figure 2B:
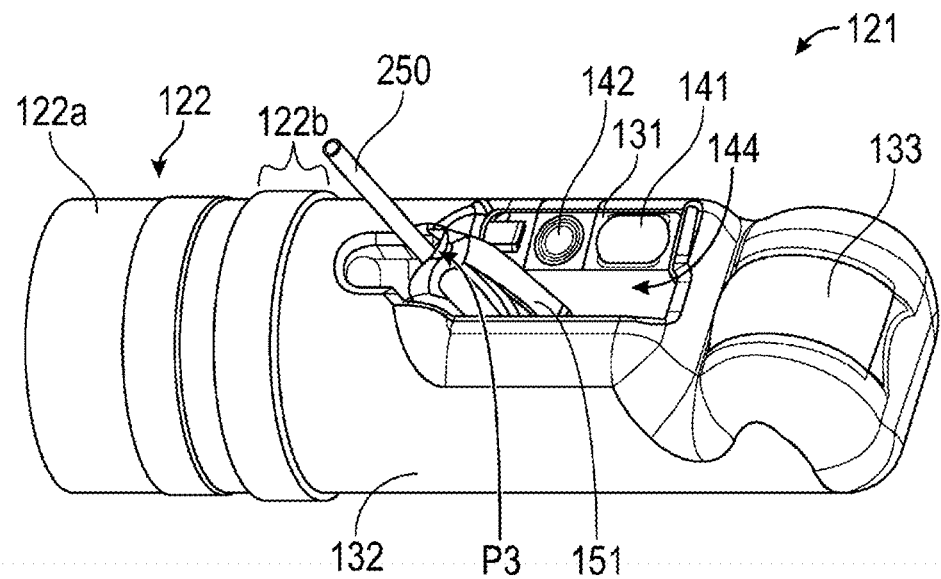

FIGS. 2A-2B illustrate, by way of example, perspective views of the distal end portion 121 of the insertion portion 111 of the echoendoscope 120. The distal end portion 121 may include a metallic distal end rigid member 131 and a cylindrical cover member 132 in which the distal end rigid member 131 is inserted, such that the cylindrical cover member 132 can partially cover the distal end rigid member 131. An ultrasound transducer section 133 is accommodated within the distal end portion 121. The ultrasound transducer section 133 may include an ultrasound transducer configured to emit ultrasound waves sideward at a predetermined angle with respect to an insertion axis of the insertion portion 111. The cylindrical cover member 132 provides insulation of the distal end portion 121, and allows the ultrasound transducer section 133 to be reliably fixed therewithin.

When the cover member 132 is attached to the distal end rigid member 131, part of the opening portion of the cylindrical cover member 132 is covered with part of the distal end rigid member 131 on which an illuminating window 141 and an optical observation window 142 are arranged. Optical light emitted from a light source, such as located at the distal end portion 121 of the echoendoscope 120 and coupled to the light source apparatus 130, can pass through the illuminating window 141 and incident on the anatomical target and surrounding environment. The optical observation window 142 allow an imaging device (e.g., a camera lens, not shown) at the distal end portion 121 of the echoendoscope 120 to view target tissue. Other part of the opening portion not covered with part of the distal end rigid member 131 forms an opening portion 144 from which a raising stand 151 protrudes when the raising stand 151 is raised.

One or more treatment instruments can be activated to protrude from the opening portion 144. The treatment instrument(s) can be diagnostic or therapeutic in nature. FIG. 2A illustrates a treatment instrument 240 protruding from the opening portion 144 when the raising stand 151 is in a maximum raised position. By way of example and not limitation, the treatment instrument 240 is a puncture device from which a needle 242 protrudes. The needle 242 may be used to sample tissues from an anatomical target such as an pancreaticobiliary target in a EUS-FNA or EUS-FNB procedure. Additionally or alternatively, the treatment instrument 240 may include other types of tissue acquisition devices, such as a brush, a snare, forceps, a suction device, among others. In various examples, the treatment instrument 240 can be an object retrieval device for retrieving biological matters (e.g., cancerous tissue, gallstones, bill duct stones), or a resection device for surgically removing tissue. In some examples, the treatment instrument 240 can be a therapeutic device configured to direct a therapeutic modality to the anatomical target. Examples of such EUS-guided therapeutic devices may include an ablation device (e.g., radio-frequency ablation, laser ablation, or injection of chemotherapy ablation agent), a drainage device such as a needle to tube to drain pancreatic cysts or pseudocysts, or a stricture management device to open or dilate a narrowed or obstructed portion of a duct in the pancreaticobiliary system, among others. The treatment instrument 240 can be inserted into one of the forceps ports on the operation portion 112 of the echoendoscope 120, such as the forceps port 125A, pass through a channel within the echoendoscope 120, and controllably protrude from the opening portion 144 of the distal end portion 121.

FIG. 2B illustrates a treatment instrument 250 protruding from the opening portion 144 when the raising stand 151 is in a maximum raised position. By way of example and not limitation, the treatment instrument 250 is a cannula or the like that can be endoscopically inserted through the papilla during an ERCP procedure. The treatment instrument 250 can be inserted into a different forceps port than the port for inserting the treatment instrument 240, such as forceps port 125B on the operation portion 112, pass through a channel within the echoendoscope 120, and controllably protrude from the opening portion 144 of the distal end portion 121.

The different forceps ports and dedicated channels within the echoendoscope 120 allow an operator to use the echoendoscope 120 to perform different operations (e.g., ERCP cannulation and EUS-guided tissue acquisition) using one ultrasound endoscope. For example, the operator may first insert the treatment instrument 240 (e.g., aspiration or biopsy needle) from the forceps port 125A and perform EUS-FNA or EUS-FNB of tissue of a target pancreaticobiliary anatomy. When a lesioned part is confirmed from an ultrasound image (optionally along with other diagnostic information) and ERCP cannulation is indicated, the operator can then insert the treatment instrument 250 (e.g., ERCP cannula) from the forceps port 125B even without pulling out the echoendoscope 120, and perform ERCP by inserting the cannula or the like through the papilla.

In some examples, the echoendoscope 120 can be robotically controlled, such as by a robot arm attached thereto. The robot arm can automatically, or semi-automatically (e.g., with certain degree of user manual control or commands), via an actuator, position and navigate instrument such as the echoendoscope 120 in an anatomical target, or position a device at a desired location with desired posture to facilitate an operation on the anatomical target (e.g., to collect tissue samples from the anatomical target using a brush, a snare, forceps, or a suction device). In accordance with various examples discussed in this document, a controller can use artificial intelligence (AI) to determine cannulation and navigation parameters and/or tool operational parameters (e.g., position, angle, posture, force, and navigation path), and generate a control signal to the actuator of the robot arm to facilitate operation of such instrument or tools in accordance with the determined navigation and operational parameters in a robot-assisted procedure.

Figure 3A:
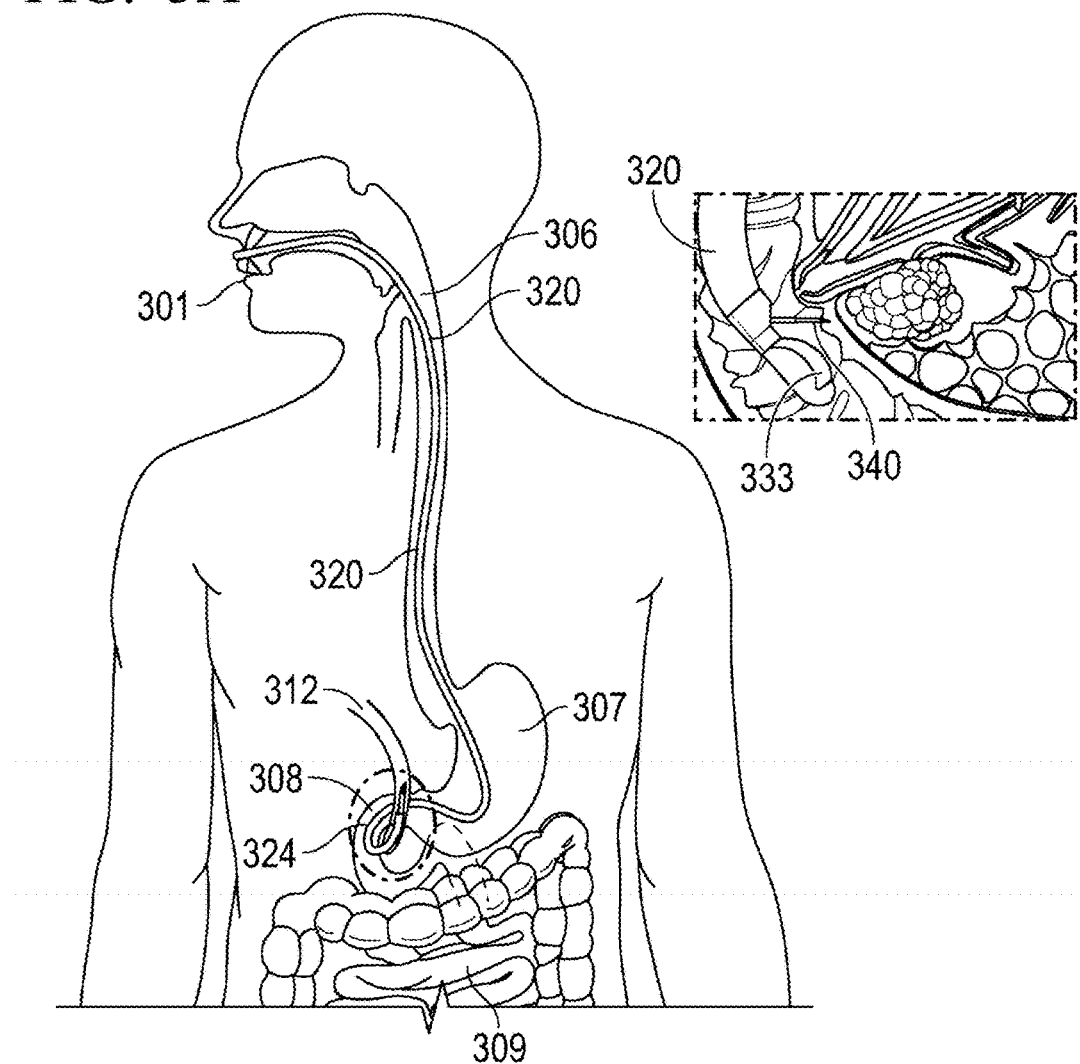
FIGS. 3A-3B illustrates an example of EUS procedure for high-resolution ultrasound imaging and treatment modalities such as fine-needle aspiration or biopsy.
Figure 3B:
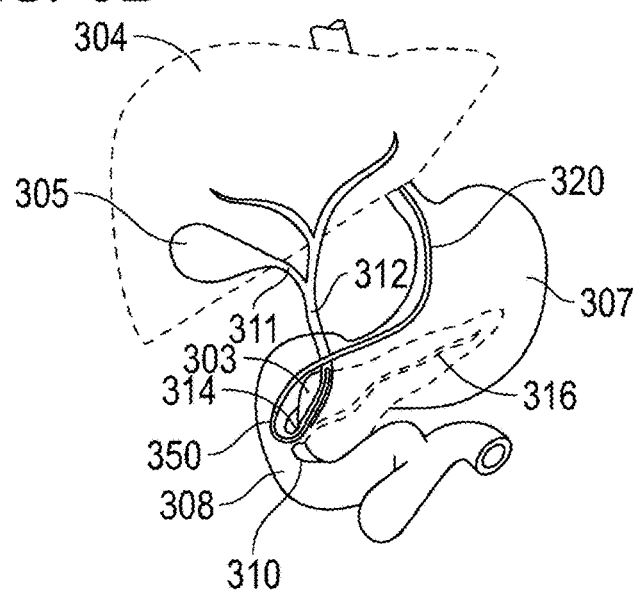

FIGS. 3A-3B are diagrams illustrating an example of endoscopic ultrasound (EUS) procedure, also known as echoendoscopy, for high-resolution ultrasound imaging and diagnostic or therapeutic modalities such as fine-needle aspiration (FNA) or fine-needle biopsy (FNB). As illustrated in FIG. 3A, the EUS procedure involves insertion of an echoendoscope 320 perorally into the upper GI tract. The echoendoscope 320, which is an embodiment of the echoendoscope 120 as illustrated in FIG. 1, can extend into mouth 301, through esophagus 306, through stomach 307 to reach the duodenum 308. Similar to the distal end portion 121 of the echoendoscope 120 as shown in FIGS. 2A-2B, at the distal end portion of the echoendoscope 320 is an ultrasound transducer 333 configured to produce ultrasound scans of the pancreas and surrounding tissue or organs of the pancreaticobiliary system. The ultrasound scans can be converted to detailed EUS images. Based on the analysis of the EUS images, a diagnostic or therapeutic modality may be directed to the anatomical target, such as tissue aspiration or biopsy via a tissue acquisition device 340 extended from the distal end portion of the echoendoscope 320. An example of the tissue acquisition device 340 is the needle 242 that protrudes from the treatment instrument 240 as illustrated in FIG. 2A. The needle may pierce through the duodenal wall collect aspiration or biopsy sample from the anatomical target, such as pancreatic cystic tumors. In addition or alternative to the fine needles, one or more other tissue acquisition devices may be passed through the lumen of the echoendoscope 320 and extended from the distal end portion therefor, such as a brush, a snare, forceps, or a suction device.

FIG. 3B is a schematic view of an EUS procedure involving insertion of an echoendoscope 320 perorally into the duodenum 308 and performing ERCP or biliary intervention procedures through the duodenal papilla 314 into one of the ducts in the pancreaticobiliary system using a biliary intervention device 350 extended from the distal end portion of the echoendoscope 320. The biliary intervention device 350 can be an embodiment of the treatment instrument 250 as illustrated in FIG. 2B. As illustrated in FIG. 3B, the duodenum 308 is connected to the common bile duct 312 via duodenal papilla 314. Common bile duct 312 can branch off into pancreatic duct 316 and gallbladder duct 311. Duodenal papilla 314 may include sphincter of Oddi 310 that controls flow of bile and pancreatic juice into the intestine (duodenum). Pancreatic duct 316 can lead to pancreas 303. Pancreatic duct 316 carries pancreatic juice from pancreas 303 to the common bile duct 312. Gallbladder duct 311 can lead to gallbladder 305. The treatment instrument 250 may include an ERCP cannula, a stricture management device, an ablation device, or a drainage device configured to pass through duodenal papilla 314 to enter into the common bile duct 312. In patients with biliary stricture (abnormal narrowing or blockage of a portion of the bile duct), EUS-guided stricture management generally involves placing a stricture management device to open or dilate the narrowed or obstructed portion of the duct. As illustrated in FIG. 3B, analysis of the EUS images can provide guidance for selection of property types of stricture management device such as dilating catheters, balloon dilators, or stents. In an example, biliary endoscopic sphincterotomy (EST) may be performed to cut the biliary sphincter and intraduodenal segment of the common bile duct following selective cannulation, using a high frequency current applied with a special knife, sphincterotome, inserted into the papilla. Biliary endoscopic sphincterotomy is either used solely for the treatment of diseases of the papilla of Vater, such as dysfunction of sphincter of Oddi 310, or to facilitate subsequent therapeutic biliary interventions.

Figure 4:
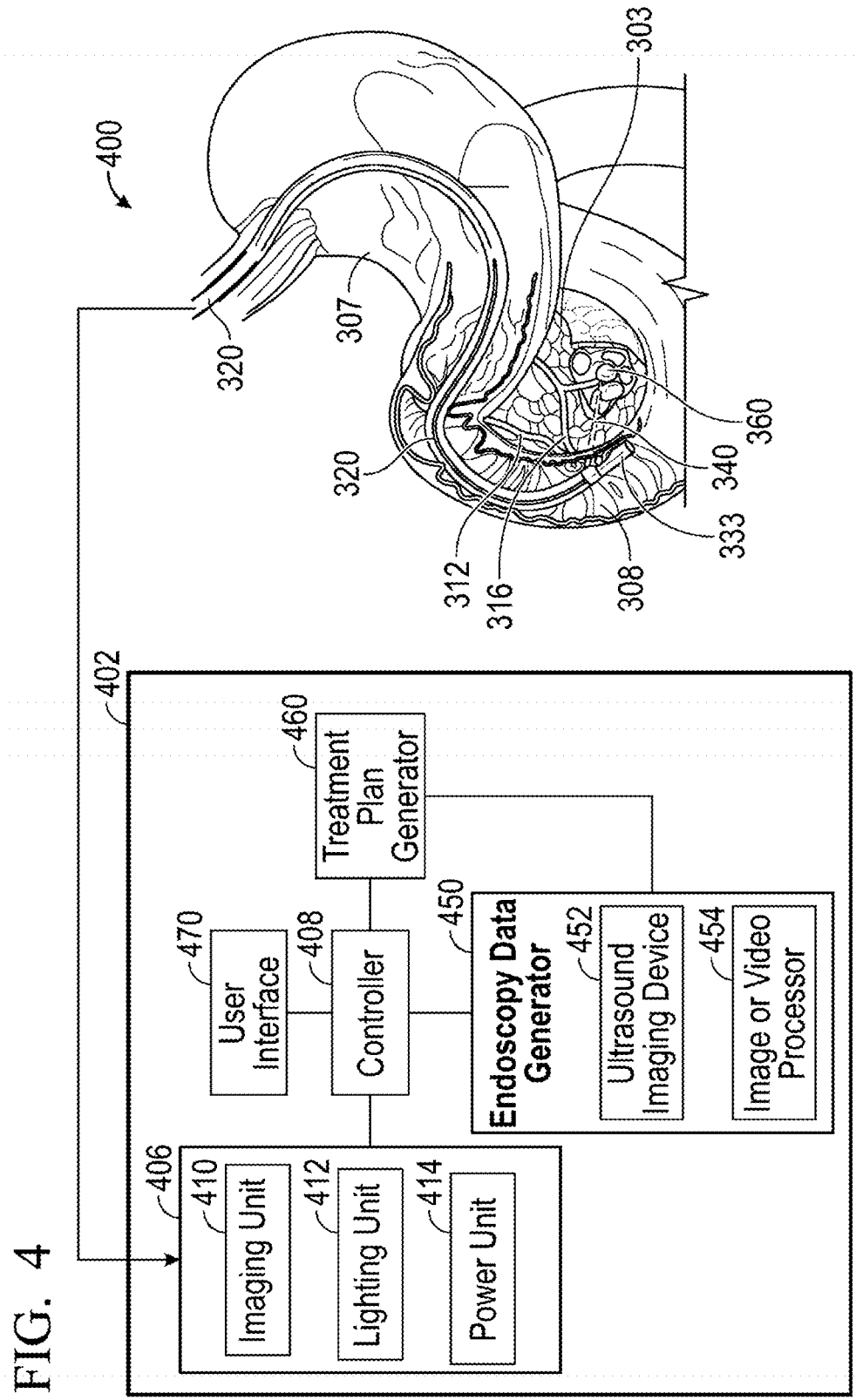
FIG. 4 illustrates an example of a portion of an EUS-guided tissue acquisition (EUS-TA) system and a portion of patient anatomy at the procedure site.

FIG. 4 is a diagram illustrating an example of a portion of an EUS-guided tissue acquisition system 400 and a portion of the anatomy at the procedure site. The system 400 comprises the echoendoscope 320 that inserted perorally into an upper GI tract, and an imaging and control system 402 controllably interfacing with the echoendoscope 320. As described above with reference to FIG. 3A, the echoendoscope 320 includes, at its distal end portion, an ultrasound transducer 333 to produce ultrasound scans of an anatomical target, and a treatment instrument such as the tissue acquisition device 340 extendable from the distal end portion of the echoendoscope 320 to sample tissue from a cyst or tumor 360 of pancreas 303.

The imaging and control system 402 may include a control module 406, which can further include or be coupled to a controller 408. The control module 406 can comprise an imaging unit 410, a lighting unit 412 and a power unit 414 for controlling an imaging device (e.g., a camera) and a light source connected to the echoendoscope 320. The control module 406 can activate an imaging device (e.g., camera lens) at the distal end portion of the echoendoscope 320 to view the anatomical target via optically enhanced materials and components, such as the observation window 142 at the at the distal end portion 121 of the echoendoscope 120 as illustrated in FIG. 2A. The control module 406 can activate a light source located at the distal end portion of the echoendoscope 320 and coupled to the lighting unit 412 (which is an embodiment of the light source apparatus 130) to shine light on anatomical target and surrounding environment.

The controller 408 may include, or be coupled to, an endoscopy data generator 450, and a treatment plan generator 460. The endoscopy data generator 450 can generate images of an anatomical target, such as strictures or stenosis in biliary and pancreatic ductal system. The endoscopy data generator 450 may include an ultrasound imaging device 452, which can be an embodiment of the ultrasound observation apparatus 160 as shown in FIG. 1, configured to generate real-time EUS images of the anatomical target and its surrounding environment based on the ultrasound scans produced by the ultrasound transducer 333 at the distal end portion of the echoendoscope 320. The endoscopy data generator 450 may include an image or video processor 454, such as the video processor 140 as shown in FIG. 1, which can generate real-time optical images of the anatomical target and its surrounding environment using an imaging sensor such as a camera at the distal end portion of echoendoscope 320. In addition to the ultrasound images and optical images, in some examples, the endoscopy data generator 450 can receive images of other modalities from external imaging devices such as X-ray or fluoroscopy images, electrical potential map or an electrical impedance map, computer tomography (CT) images, magnetic resonance imaging (MRI) images such as those obtained from Magnetic resonance cholangiopancreatography (MRCP), among others. The endoscopy data generator 450 may additionally generate or receive other procedure-related information, including sensor information (e.g., sensors associated with the endoscope or with a treatment device passing through the endoscope), device information, patient medical history etc. In some examples, the endoscopy data generator 450 can retrieve, such as from a database, stored control log data (e.g., time-series data) of past endoscopic procedures performed by a plurality of physicians on a plurality of patients. The control log data can represent preferred cannulation and endoscope navigation approaches and habits of physicians with different experience levels.

The treatment plan generator 460 can generate a tissue acquisition plan based at least on the real-time EUS images of the anatomical target and its surrounding environment produced by the ultrasound imaging device 452. Alternatively or additionally, optical endoscopic images or videos produced by the image video or processor 454 or other information produced or received by the endoscopy data generator 450. The tissue acquisition plan may include identification of suitable tissue acquisition devices, and operational parameters for operating such devices and navigating the endoscope over which the tissue acquisition devices are deployed, among other treatment or control parameters. According to some examples, the tissue acquisition plan can be generated or updated using artificial intelligence (AI) or machine learning (ML) techniques. The tissue acquisition plan (represented in the form of texts or graphs), optionally along with information used for generating the tissue acquisition plan (e.g., real-time EUS images) can be displayed to the operating physician as a guidance during the procedure. The AI- or ML-based tissue acquisition plan can assist the operating physician in sampling tissue using appropriate tools more accurately and efficiently, while minimizing the complication and preserving functionality of the anatomy at the biopsy site. In some examples, the tissue acquisition plan may additionally or alternatively be provided to a robotic endoscopy system to facilitate a robot-assisted endoscopic tissue acquisition procedure. Examples of AI-based tissue acquisition planning are discussed below with reference to FIGS. 6 and 7A-7D.

Figure 5A:
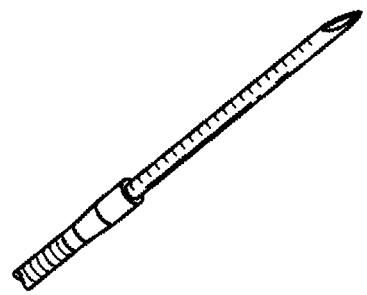
FIGS. 5A-5D illustrate examples of tissue acquisition devices that may be used in an endoscopic biopsy procedure.

FIGS. 5A-5D illustrate, by way of example and not limitation, tissue acquisition devices that may be used in an endoscopic biopsy procedure. FIG. 5A illustrates a fine needle for aspiration (FNA) or for biopsy (FNB) procedures. The fine needle may vary in flexibility and size, such as 19 gauge (G), 22 G and 25 G, with 25 G needle being smaller in diameter and highly flexible. Such fine needles may be used with an endoscopic ultrasound system (EUS) for ultrasonically guided FNA and FNB of submucosal and extramural lesions within the GI tract (e.g., pancreatic masses, mediastinal masses, perirectal masses and lymph nodes). The EUS guided FNA allows for the safe and efficacious sampling of solid lesions that are in close proximity to the GI tract, including extraintestinal masses, subepithelial tumors, and peri-intestinal lymphadenopathy. EUS guided FNB has the potential of accruing larger tissue samples during biopsies, which may enable more precise diagnosis and rapid cytodiagnosis, a technique for on-the-spot pathological diagnosis of tissues collected during surgery.

Figure 5B:
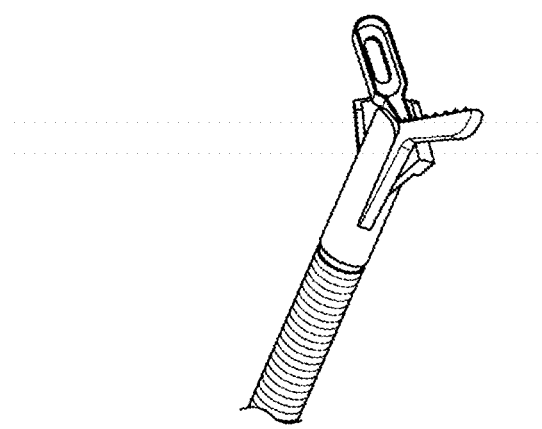

FIG. 5B illustrates endoscopic biopsy forceps that can enter the gastrointestinal tract via a flexible endoscope to perform biopsy at the anatomical target. The forceps may come with different size to fit into a particular endoscope channel. The forceps may include a cup to facilitate capturing and collecting the biopsied tissue. The cup can be an oval cup, or alligator cup with serrated jaws to prevent slippage. A blade inside the cup can deliver sharp cutting performance to ensure clean-edged specimens. Some forceps include a swinging jaw mechanism to aid tangential biopsies. Some forceps include a needle for improved anchorage.

Figure 5C:
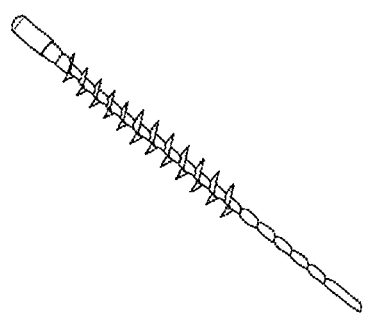

FIG. 5C illustrates an endoscopic biopsy brush including bristles to brush off and collect biopsy tissue. The brush can be delivered via a flexible endoscope to perform biopsy at the anatomical target. Like the biopsy forceps, the biopsy brushes may come with different size to fit into a particular endoscope channel and for easy insertion. The brush may be built on a control wire that provides increased warp resistance, improved insertion ability, and easier brushing capabilities. Some biopsy brushes include stiffer bristles and soft bristles in one brush. The stiffer bristles are to assist in creating a defect in the target tissue, and the softer bristles are to capture specimens after tissue debridement.

Figure 5D:
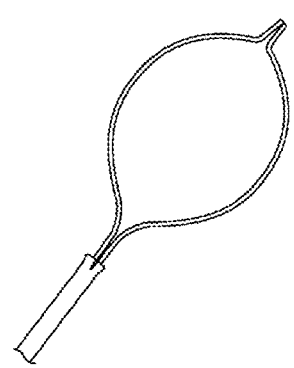

FIG. 5D illustrates a biopsy snare that can enter the gastrointestinal tract via a flexible endoscope and reach an anatomical target, grasp, dissect, and transect tissue therein. The snare may include one or more loops of particular shapes, e.g., circle, oval, hexagon, or diamond shaped loops. In ERCP, after placing the tip of the duodenoscope on an anatomical target, a snare can be deployed from the endoscope, opens up so that it can encircle the base of the target. Constant tension was applied to the snare loop during excision until the lesion was transected. Some snares have loops made of braided wire (such snares are therefore named "braided snares") to prevent or reduce slippage and improve gripping force, thereby enhancing the precision in tissue transection.

Figure 6:
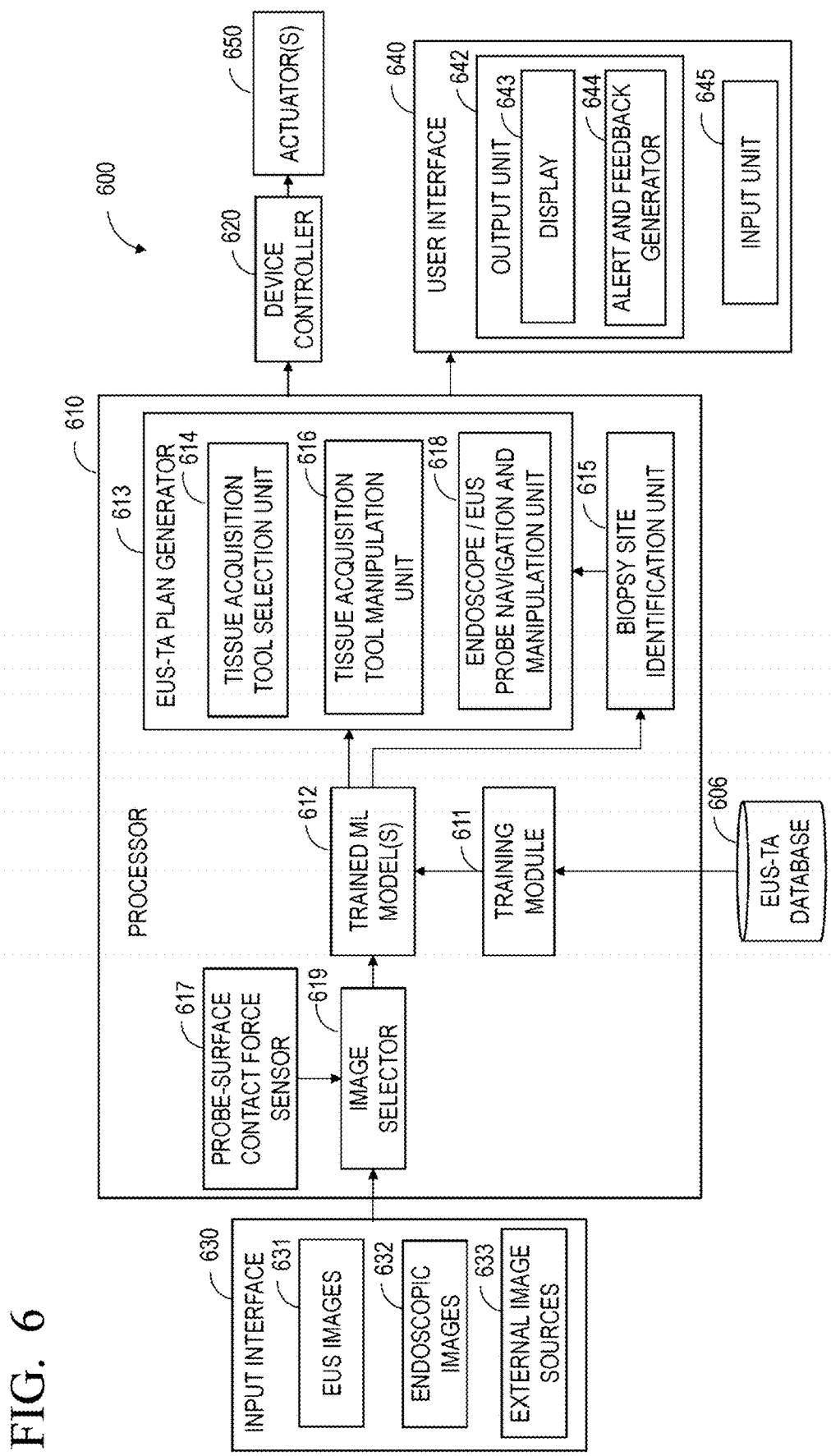
FIG. 6 illustrates an example of an EUS-TA planning system that can automatically generate an EUS-TA plan for endoscopic tissue aspiration or biopsy.

FIG. 6 is a block diagram illustrating an example of an EUS-guided tissue acquisition (EUS-TA) planning system 600 that can automatically generate an EUS-TA plan for use in an endoscopic procedure such as tissue aspiration or biopsy. The EUS-TA plan may include a recommended tissue acquisition device and recommended manipulation of such device to sample an adequate amount of biopsy tissue. In some examples, the EUS-TA plan may also include recommended operation and navigation of a steerable elongate instrument (such as the echoendoscope 120 or 320) for passing and supporting the recommended tissue acquisition device, as well as recommended positioning and navigation of the EUS probe to take ultrasound scans of the anatomical target. The system 600 can be a part of the imaging and control system 402 as shown in FIG. 4.

The system 600 may include a processor 610, a device controller 620, an input interface 630, and a user interface device 640. In some examples, the system 600 may include or be communicatively coupled to an EUS-TA database 606. The processor 610 may include circuit sets comprising one or more other circuits or sub-circuits that may, alone or in combination, perform the functions, methods, or techniques described herein. In an example, the processor 610 and the circuits sets therein may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a general-purpose processor that may receive and execute a set of instructions of performing the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The processor 610 may generate a EUS-TA plan using various sources of data specific to a patient received from the input interface 630. In some embodiments, the input interface 630 may be a direct data link between the system 600 and one or more medical devices that generate at least some of the input features. For example, the input interface 630 may transmit EUS images 631, endoscopic images 632, and external image sources 633, optionally along with other information such as collected by physiological sensors during an endoscopic procedure directly to the system 600. Additionally or alternatively, the input interface 630 may be a classical user interface that facilitates interaction between a user and the system 600. For example, the input interface 630 may facilitate a user interface through which the user may manually provide input data to the system 600. Additionally or alternatively, the input interface 630 may provide the system 600 with access to an electronic patient record from which one or more data features may be extracted. In any of these cases, the input interface 630 can collect one or more of sources of patient information before and during the endoscopic procedure.

The EUS images 631 may include perioperative EUS images converted from ultrasound scans of the anatomical target during an EUS-guided procedure using, for example, the echoendoscope 320 as described above with reference to FIGS. 3A-3B and 4. The endoscopic images 632 may include perioperative endoscope images or videos of the anatomical target and its surrounding environment (e.g., biliary duct strictures) captured by an imaging sensor associated with the echoendoscope. The external image sources 633 may include preoperative or perioperative images of the anatomical target acquired by external imaging devices other than the echoendoscope, which may include, for example, X-ray or fluoroscopy images, electrical potential map or an electrical impedance map, CT images, or MRI images such as images obtained during MRCP, among others.

In addition to images of various modalities or from various sources, the input interface 630 may receive other information including, for example, endo-therapeutic device information including specification data, including size, dimension, shape, and structures of the endoscope used in the procedure or other steerable instruments such as a cannular, a catheter, or a guidewire; size, dimension, shape, and structures of tissue acquisition devices (e.g., knives, forceps, brushes, snares, suction devices). Such device specification information may be used to determine cannulation or navigation parameter values such as the angle and/or the force applied to the device, or for selecting suitable tools and determining tool operational parameters to effectively and efficiently sample biopsy tissue. In an example, the input interface 630 may receive information from sensors coupled to the echoendoscope or a treatment device passing through the endoscope, or otherwise associated with the patient. In an example, a proximity sensor positioned at a distal end portion of the echoendoscope can sense information including position, direction, or proximity of a distal portion of the echoendoscope relative to an anatomical target. In some examples, the input interface 630 may receive physician/patient information, such as operating physician's habits or preference of using a steerable elongate instrument (e.g., preferred approach for cannulation and endoscope navigation) or past procedures of the similar type to the present procedure performed by the physician and the corresponding procedure outcome (e.g., success/failure assessment, procedure time, prognosis and complications), or patient information including patient demographics (e.g., age, gender, race), medical history such as prior endoscopic procedures and images or data associated therewith, etc.

The processor 610 may include an EUS-TA plan generator 613 and a biopsy site identification unit 615. The EUS-TA plan generator 613 can generate a EUS-TA plan using information received by the input interface 630, such as the EUS images 631, the endoscopic images 632, and/or the external image sources 633. The EUS-TA plan generator 613 may include one or more of a tissue acquisition device selection unit 614, a tissue acquisition device manipulation unit 616, and an endoscope/EUS probe navigation and manipulation unit 618. The tissue acquisition device selection unit 614 can automatically determine a tissue acquisition device recommendation for use in an EUS-TA procedure based at least on an input image (e.g., the EUS images 631, the endoscopic images 632, and/or the external image sources 633). Other data from the input interface 630 may additionally or alternatively be used to determine the tissue acquisition tool recommendation, such as size and geometry of candidate tools (as a part of the endo-therapeutic device information), sensor data indicating spatial restrictions of an environment of the anatomical target, or size, location, morphology, among other characteristics of the anatomical target as estimated by the biopsy site identification unit 615. The tissue acquisition device recommendation includes a type of tool selected from, for example, aspiration or biopsy needles, brushes, forceps, knives, snares, or suction devices. The tissue acquisition device recommendation can further include a recommend a tool size, such as 19-, 22-, or 25-gauge (G) needles that may be included in the echoendoscope 120 or 320 in EUS-FNA or EUS-FNB procedures. These needles vary in flexibility and size. For example, a 25 G needle has a smaller diameter, high flexibility, and yields less bloody samples. In other examples, the tissue acquisition device recommendation may include a drainage device for EUS-based pancreatic fluid collection drainage, pancreatic duct drainage, gallbladder drainage, or biliary drainage. Examples of such drainage device include plastic or metallic stents of various sizes, such as from 5 to 10 French gauge (Fr). In some examples, the acquisition tool recommendation may include a stricture management device to open or dilate an obstructed or narrowed portion of the ductal system, such as dilating catheters, balloon dilators, and stents.

The tissue acquisition device manipulation unit 616 can determine recommended values of one or more operational parameters for navigating and manipulating a tissue acquisition device during the procedure to safely and effectively collect a sufficient amount of biopsy tissue. Similar to the tool recommendation above, recommended values of the tool operational parameters can be determined using input images such as the EUS images 631, the endoscopic images 632, and/or the external image sources 633, among other information from the input interface 630, or characterization of the biopsy site (e.g., recognition of lesion and malignancy state) as identified by the biopsy site identification unit 615. The tool operational parameters may include, for example, a position, a posture, a heading direction, or an angle of the tissue acquisition device relative to the anatomical target. Recommended values of the tool operational parameters can vary depending on the type of the tool used for tissue acquisition. For example, for endoscopic forceps, the tool operational parameters may include forceps location; orientation, angle, or orbit of the forceps towards the biopsy site; advance length or distance from the biopsy site; jaw opening states such as having one jaw open or both jaw open, among others. Proper operational parameters as determined by the tissue acquisition device selection unit 614 can assist the operating physician in precisely collecting a desired amount of tissue while minimizing complication and preserving functionality of the anatomy at the biopsy site.

The endoscope/EUS probe navigation and manipulation unit 618 can automatically estimate navigation parameters of an echoendoscope (or other steerable elongate instrument) over which the tissue acquisition device is deployed. Examples of the navigation parameters may include: distance from the endoscope distal portion to duodenal papilla; a heading direction of the distal portion of the endoscope relative to the biopsy site; an insertion angle of a cannula or a surgical element used in cannulation; a protrusion amount of a cannula or a surgical element; a speed or a force applied to the endoscope distal portion or a surgical element; a rotational direction or a cutting area of a surgical element; a navigation path for navigating the echoendoscope (or other steerable elongate instrument) to the anatomical target while avoiding injury or damage to internal organs or tissue (e.g., pancreas or vessels). The endoscope/EUS probe navigation and manipulation unit 618 can also automatically estimate one or more operational parameters for positioning and navigating the EUS probe to take ultrasound scans of the anatomical target. Such EUS probe operational parameters may include, for example, a position, posture, a heading direction, or an angle of the EUS probe relative to the anatomical target. In some examples, the EUS probe operational parameters may include a contact force applied to the EUS probe against a surface of the anatomical target where the ultrasound scans are taken. The probe-surface contact force can be sensed using a force sensor 617 associated with the EUS probe. As a consistent probe-surface contact force is correlated to consistent and stable EUS image quality, the sensed contact force can be used as a feedback to the operator or a robotic endoscopy system to control the operation of EUS probe against the tissue wall with consistent force so as to produce high-quality EUS images, which can assist in tissue acquisition device selection and biopsy site identification. In some examples, the endoscope/EUS probe navigation and manipulation unit 618 can estimate a probability of success, or estimated procedure time, associated with the use of the selected tissue acquisition tool in accordance with the automatically determined tool operational parameters and the estimated endoscope navigation parameters.

The biopsy site identification unit 615 can use an input image (e.g., EUS images 631, the endoscopic images 632, and/or the external image sources 633), or image features extracted from such input image, to automatically identify a biopsy site and determine one or more characteristics thereof. Examples of the biopsy site characteristics may include location, size, and shape of the tissue at the biopsy site. In some examples, the biopsy site identification unit 615 can recognize pathophysiological properties of the tissue at the biopsy site, such as a lesion, an inflammation state, a stricture level, or a malignancy state (e.g., degree or area of invasion by cancer) of the tissue to be acquired. In some examples, the biopsy site identification unit 615 can have a rapid on-site evaluation (ROSE) capability of performing real-time, in vivo tissue diagnosis. The echoendoscope for tissue acquisition may include an onboard microscopic imaging device such as disposed at the distal end portion of the echoendoscope. The microscopic imaging device can produce in vivo and substantially real-time microscopic images of a lesion at the anatomical target. The biopsy site identification unit 615 can analyze the in vivo and substantially real-time microscopic image to provide an in vivo diagnosis of tissue malignancy of the lesion. After the removal of the identified malignant tissue, the biopsy site identification unit 615 can analyze the images of the tissue removal site to confirm ex vivo that the malignant tissue has been completely removed. Additionally or alternatively, the in vivo and substantially real-time microscopic image may be output to a user on a user interface for diagnosis. The identified characteristics of the biopsy site (e.g., identified lesion and malignancy thereof) can be utilized by the EUS-TA plan generator 613 to determine or fine-tune the EUS-TA plan, such as to determine proper type and size of tissue acquisition devices and manipulation of such tools to safely and efficiently sample the tissue.

The processor 610 may include an image selector 619 to select a subset of the received images from the input interface 630 that may be used by the EUS-TA generator 613 to generate the EUS-TA plan. In an example, the selection can be on image qualities, such as signal to noise ratio, sharpness, contrast, level of distortion, exposure accuracy, among other attributes. In an example, the image selector 619 can be coupled to a force sensor 617 associated with the EUS probe. As described above, the force sensor 617 can sense contact force between the EUS probe and a surface of the anatomical target where the ultrasound scans are taken. A consistent probe-surface contact force is correlated to consistent and stable EUS image quality. In an example, the image selector 619 can select a subset of the received perioperative EUS images converted from the ultrasound scans taken while the sensed contact force is maintained at a substantially constant value (e.g., within a 5% margin) or within a specific value range. The subset of perioperative EUS images such selected can then be used to generate the EUS-TA plan. Inconsistent contact force (e.g., exerted by the operator during the procedure when imaging the biopsy site) can introduce noise or variability in the images being used to identify a proper biopsy site. Selecting the EUS images based on the consistent probe-surface contact force can help improve the accuracy of tissue acquisition device selection and biopsy site identification.

One or more of the tissue acquisition device selection unit 614, the tissue acquisition device manipulation unit 616, the endoscope/EUS probe navigation and manipulation unit 618, or biopsy site identification unit 615 can each use one or more trained machine-learning (ML) models 612 to perform their respective tasks as stated above. The one or more trained ML models can have a neural network structure comprising an input layer, one or more hidden layers, and an output layer. The input interface 630 may deliver one or more sources of input data, or features generated therefrom, into the input layer of the ML model(s) 612 which propagates the input data or data features through one or more hidden layers to the output layer. The ML model(s) 612 can provide the system 600 with the ability to perform tasks, without explicitly being programmed, by making inferences based on patterns found in the analysis of data. The ML model(s) 612 explores the study and construction of algorithms (e.g., ML algorithms) that may learn from existing data and make predictions about new data. Such algorithms operate by building the ML model(s) 612 from training data in order to make data-driven predictions or decisions expressed as outputs or assessments.

The ML model(s) 612 may be trained using supervised learning or unsupervised learning. Supervised learning uses prior knowledge (e.g., examples that correlate inputs to outputs or outcomes) to learn the relationships between the inputs and the outputs. The goal of supervised learning is to learn a function that, given some training data, best approximates the relationship between the training inputs and outputs so that the ML model can implement the same relationships when given inputs to generate the corresponding outputs. Unsupervised learning is the training of an ML algorithm using information that is neither classified nor labeled, and allowing the algorithm to act on that information without guidance. Unsupervised learning is useful in exploratory analysis because it can automatically identify structure in data.

Common tasks for supervised learning are classification problems and regression problems. Classification problems, also referred to as categorization problems, aim at classifying items into one of several category values. Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM). Examples of DNN include a convolutional neural network (CNN), a recurrent neural network (RNN), a deep belief network (DBN), or a hybrid neural network comprising two or more neural network models of different types or different model configurations.

Some common tasks for unsupervised learning include clustering, representation learning, and density estimation. Some examples of commonly used unsupervised learning algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed. Federated learning enables multiple actors to build a common, robust machine learning model without sharing data, thus allowing to address critical issues such as data privacy, data security, data access rights and access to heterogeneous data.

As illustrated in FIG. 6, the ML model(s) 612 may be trained using a training module 611, which can be included in the processor 610 as shown in FIG. 6. Alternatively, the training module 611 can be implemented in a separate unit. To train an ML model, a training dataset can be constructed using past endoscopic procedure data such as selected and retrieved from the EUS-TA database 606. The training data may include procedure data acquired during respective endoscopic procedures performed on a plurality of patients. The endoscopic procedures can be those of the same type as the endoscopic procedure to be performed on the present patient. The training data can be from various data sources, such as any of those shown in the input interface 630. The training data used for training an ML model can vary depending on the parameters to estimate. In an example of a ML-based determination of endoscope/EUS probe navigation and manipulation, the training data may include images or videos showing patient anatomy, cannulation and endoscope navigation routes, progress of cannulation or navigation, among other information. In an example of a ML-based tissue acquisition device selection, the training data may include past endoscopic images or images from external sources showing the biopsy sites, and information of tools used in past procedures at respective biopsy sites. The tool information may include type, size, operational data associated with the use of such tools in past procedures (which can be recorded during the procedure, or obtained offline via analysis of the endoscopic images or videos), and procedure outcome (e.g., success/failure assessment of the procedure, total procedure time, procedure difficulty and skills requirement, etc.)

In an example, the training data can be screened such that only data of procedures performed by certain physicians (such as those with substantially similar experience levels to the operating physician), and/or data of procedures on certain patients with special requirement (such as those with substantially similar anatomy or patient medical information to the present patient) are included in the training dataset. In an example, the training data can be screened based on a success rate of the procedure, including times of attempts before a successful cannulation or navigation, such that only data of procedures with a desirable success rate achieved within a specified number of attempts are included in the training dataset. In another example, the training data can be screened based on complication associated with the patients. In some examples, particularly in case of a small training dataset (such as due to data screening), the ML model can be trained to identify a suitable tissue acquisition device and methods of operating such tool at the biopsy site, determine navigation parameters of the endoscope for delivering the tissue acquisition device, and identify characteristics of the biopsy site by extrapolating, interpolating, or bootstrapping the training data, thereby creating a EUS-TA plan specifically tailored to the specific patient and physician. The training of the ML model may be performed continuously or periodically, or in near real time as additional procedure data are made available. The training involves algorithmically adjusting one or more ML model parameters, until the ML model being trained satisfies a specified training convergence criterion.

In some examples, a plurality of ML models can be separately trained, validated, and used (in an inference phase) in different applications, such as estimating different parameters of the devices used in an endoscopic procedure or planning of such a procedure. For example, a first ML model (or a first set of ML models) may be trained to establish a correspondence between (i) EUS images and/or other external images of biopsy sites from past endoscopic procedures (optionally along with other information) and (ii) tissue acquisition devices used in those past procedures, and the tool characteristics including their types, sizes, and operational parameters. The trained first ML model(s) can be used by the tissue acquisition device selection unit 614 and the tissue acquisition device manipulation unit 616 in an inference phase to automatically determine, from an input image (or a sequence of images or a live video) of an anatomical target (optionally along with other information), a tissue acquisition device recommendation including a recommend tool of a particular type and size and operational parameters for manipulating to tool to collect tissue from the anatomical target.

In an example, a second ML model (or a second set of ML models) may be trained to establish a correspondence between (i) EUS images and/or other external images of biopsy sites from past endoscopic procedures (optionally along with other information) and (ii) navigation and treatment parameters in those past procedures, including direction, angle, speed, force, and amount of intrusion for navigating and placing endoscopes, EUS probes, catheters, or other steerable elongate instrument over which a tissue acquisition device is deployed, or estimated success rate and procedure time, among other parameters. The trained second ML model(s) can be used by the endoscope/EUS probe navigation and manipulation unit 618 in an inference phase to automatically determine, from an input image (or a sequence of images or a live video) of patient anatomy including the anatomical target (optionally along with other information), proper navigation parameters that may be used as a procedure guidance.

In an example, a third ML model (or a third set of ML models) may be trained to establish a correspondence between (i) EUS images and/or other external images of biopsy sites from past endoscopic procedures (optionally along with other information) and (ii) characteristics of the biopsy site such as location, size, shape, orientation, and pathophysiological properties of the tissue at the biopsy site such as an inflammation state, or a malignancy state of the tissue to be acquired. The trained third ML model(s) can be used by the biopsy site identification unit 615 in an inference phase to identify, from an input image (or a sequence of images or a live video) of an anatomical target (optionally along with other information), characteristics of the biopsy site.

The device controller 620 can generate a control signal to one or more actuators 650, such as a motor actuating a robot arm. The one or more actuators 650 can be coupled to a steerable elongate instrument, which can be a diagnostic or therapeutic endoscope, a cannula, a catheter, a guidewire, or a guide sheath, among others. The steerable elongate instrument may include a treatment tool (e.g., a lithotripsy device or a calculi extraction device) robotically operable via the one or more actuators 650. In response to the control signal, the one or more actuators 650 can robotically adjust position, posture, direction, and navigation path of the steerable elongate instrument and a tissue acquisition device included therein in accordance with the navigation parameters estimated by the endoscope/EUS probe navigation and manipulation unit 618, and/or the tool operational parameters estimated by the tissue acquisition device selection unit 614.

The user interface device 640 may include an output unit 642 and an input unit 645. The input unit 645 can receive input from the user or from other data sources. In an example, the input interface 630 can be included in the input unit 645. The output unit 642 may include a display 643 that can display images of the biopsy site and various characteristics thereof as identified by the biopsy site identification unit 615, tool recommendations including information about the type and size of the tools, and recommended methods of operating such tools such as values of one or more operational parameters generated by the tissue acquisition device selection unit 614. In some examples, the display 643 can present a graphical representation of the navigation of an endoscope based on the navigation parameters produced by the endoscope/EUS probe navigation and manipulation unit 618, and/or a graphical representation of the operation of a tissue acquisition tool based on the tool operational parameters produced by the tissue acquisition device selection unit 614.

In an example, the displayed region of the anatomical target images can be automatically adjusted according to the position or direction of a distal end of the endoscope relative to an anatomical target. For example, the output unit 642 may automatically zoom in an image as the endoscope tip gets closer to the anatomical target. Alternatively, the zooming function can be activated and adjusted manually by the user (e.g., operating physician) via the input unit 645. In an example, the output unit 642 can display a cross-section view of an anatomy in a direction specified by a user, such as via the input unit 645. In an example, the user may adjust viewing angle (e.g., rotating the view) and have a 360-degree view of the anatomical site via the input unit 645.

In some examples, the display 643 may automatically center the anatomical target in a viewing area, such as based on the distance and viewing angle of the imaging device (e.g., camera) relative to the anatomical target. In an example, the processor 610 can control the positioning and direction of the endoscope to adjust viewing angle of the imaging device to achieve auto-centering of the anatomical target. Additionally or alternatively, the processor 610 can post-process the acquired image including re-positioning the identified anatomical target at the center of the viewing area.

In some examples, the output unit 642 may display on the image a visual indication of the anatomical target; a projected navigation path toward the anatomical target; or a progression of the endoscope toward the target anatomy along the projected navigation path. Display settings can be adjusted by the user via the input unit 645. The visual indication may take the format of markers, annotations (icons, texts, or graphs), highlights, or animation, among other visual indicators. For example, markers of different shapes, colors, forms, or sizes can be display on the reconstructed or integrated image to distinguish different tissue, anatomical regions, their accessibility or criticality.

The output unit 642 may include an alert and feedback generator 644 that can generate an alert, a notification, or other formats of human-perceptible feedback to the operating physician on the status or progress of the cannulation or navigation in reference to the navigation plan. For example, an alert can be generated to indicate a risk of tissue damage associated with improper cannulation. The feedback can be in one or more forms of audio feedback, visual feedback, or haptic feedback. For example, when the endoscope tip enters or comes closer to a "critical zone" (e.g., proximity sensor detecting a distance to a critical anatomy of interest shorter than a threshold distance), the critical zone can be shown in different colors to represent such distance (e.g., green zone, yellow zone, and read zone as the endoscope gets closer to the critical zone). Additionally or alternatively, haptic feedback such as touch or vibration may be generated and felt by the operating physician. In an example, the alert and feedback generator 644 can automatically adjust the vibration strength according to the distance to the critical zone. For example, a low vibration can be generated when the endoscope tip is in a green zone. If the system predicts, based on present advancing speed and direction of the endoscope, that the endoscope tip will reach the critical zone in a time lower than a predetermined threshold, then alert and feedback generator 644 can apply moderate vibration when the endoscope tip reaches a yellow zone, and apply high vibration when the endoscope tip reaches red zones to indicate a risk of tissue damage. The real-time alert and feedback in an image-guided endoscopic procedure as described herein can improve the efficiency of cannulation and endoscope navigation, especially for inexperienced physicians, and can improve endoscopic procedure success rate and patient outcome.

Figure 7A:
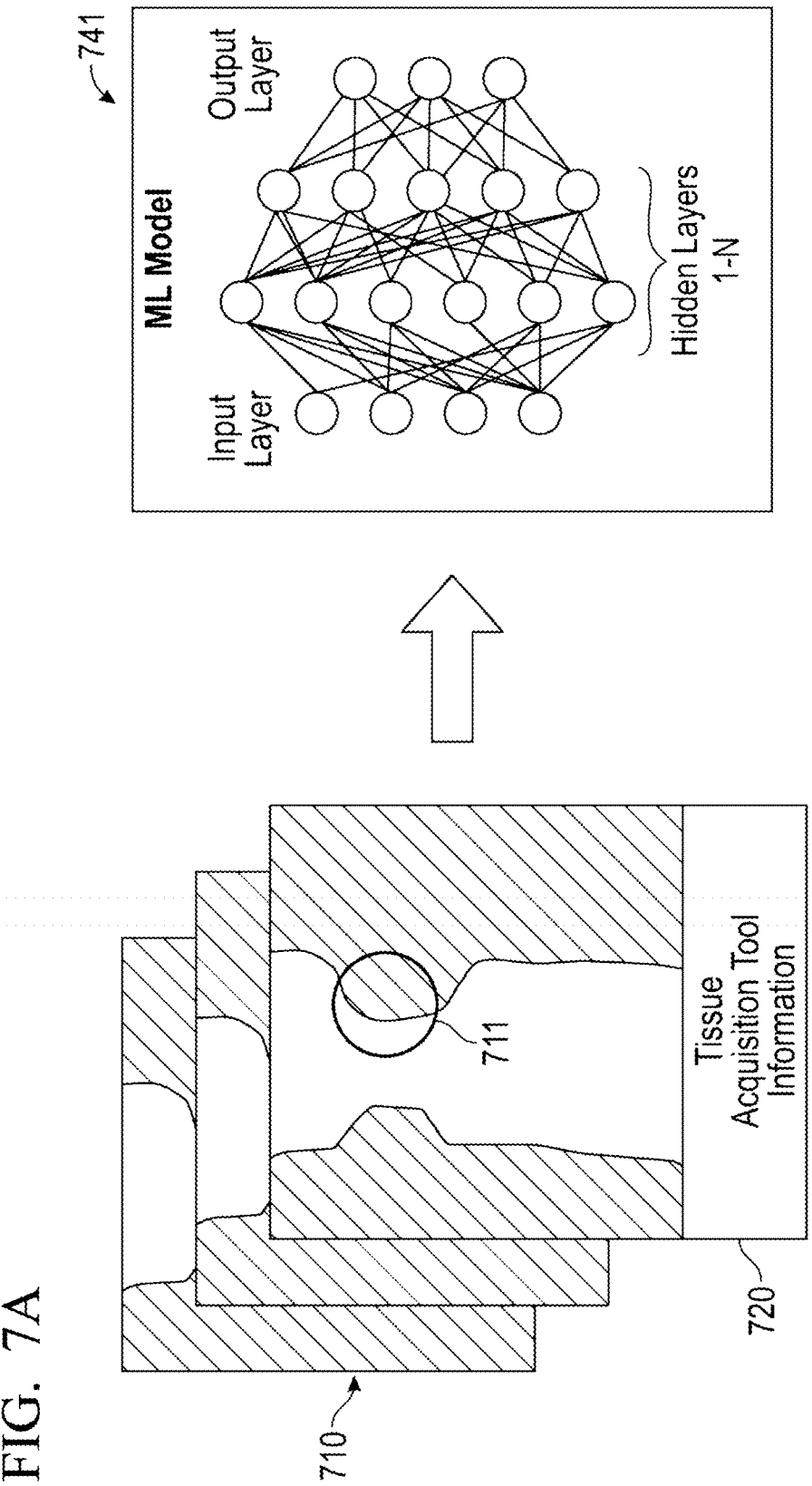
FIGS. 7A-7D illustrate examples of training a machine-learning (ML) model and using the trained ML model to generate a EUS-TA plan for collecting tissue from a biliary ductal stricture.

FIGS. 7A-7D are diagrams illustrating examples of training an ML model and using the trained ML model to generate a EUS-TA plan for endoscopically collecting tissue from a biliary ductal stricture. FIG. 7A illustrates an ML model training (or learning) phase during which an ML model 741 may be trained using training data comprising a plurality of images 710 of respective anatomical target 711 from past endoscopic tissue acquisition procedures performed on a plurality of patients. The training data may also include annotated procedure data 720 including information about the tissue acquisition devices used in each of the procedures, such as biopsy forceps of particular size and characteristics. The tool information may include type, size, operational data associated with the use of such tools in the past endoscopic tissue acquisition procedures. The training data may also include procedure outcome, such as success/failure assessment of the procedure, total procedure time, procedure difficulty and skills requirement, etc. The ML model 741 can be trained using supervised learning, unsupervised learning, or reinforcement leaning. Examples of ML model architectures and algorithms may include, for example, decision trees, neural networks, support vector machines, or a deep-learning networks, etc. Examples of deep-learning networks include a convolutional neural network (CNN), a recurrent neural network (RNN), a deep belief network (DBN), or a hybrid neural network comprising two or more neural network models of different types or different model configurations.

The training of the ML model may be performed continuously or periodically, or in near real time as additional procedure data are made available. The training process involves algorithmically adjusting one or more ML model parameters, until the ML model being trained satisfies a specified training convergence criterion. The trained ML model 741 can establish a correspondence between the images of the biliary ductal strictures from past endoscopic procedures and the tissue acquisition devices and the tool operational parameters.

Figure 7B:
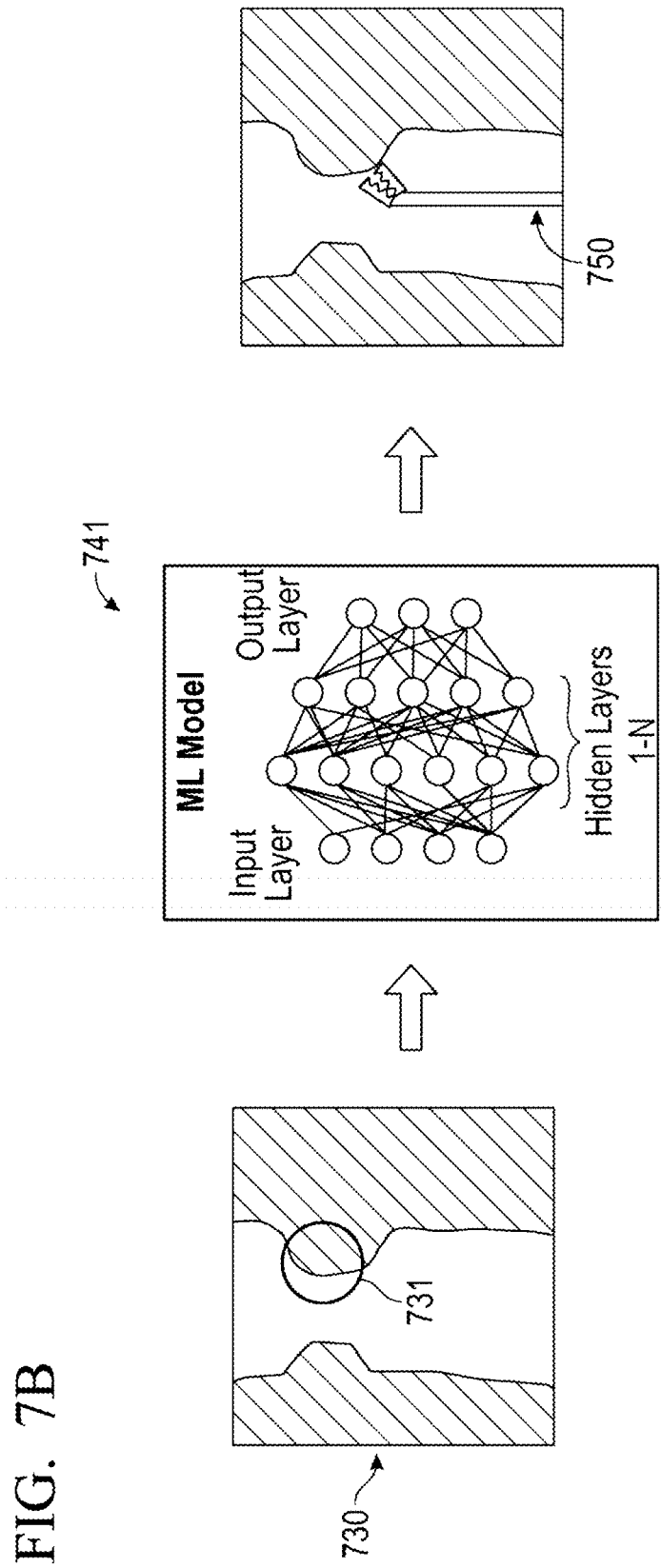

FIG. 7B illustrates an inference phase during which a live image 730 of a biliary ductal stricture 731 is applied to the trained ML model 741 to automatically determine a tissue acquisition device recommendation 750 (which is biopsy forceps with serrated jaws in this example). The tool recommendation can be communicated to a user (e.g., a physician) to assist in procedure planning. Additionally or alternatively, the tool recommendation may be provided to a robotic endoscopy system to facilitate a robot-assisted tissue acquisition procedure.

Figure 7C:
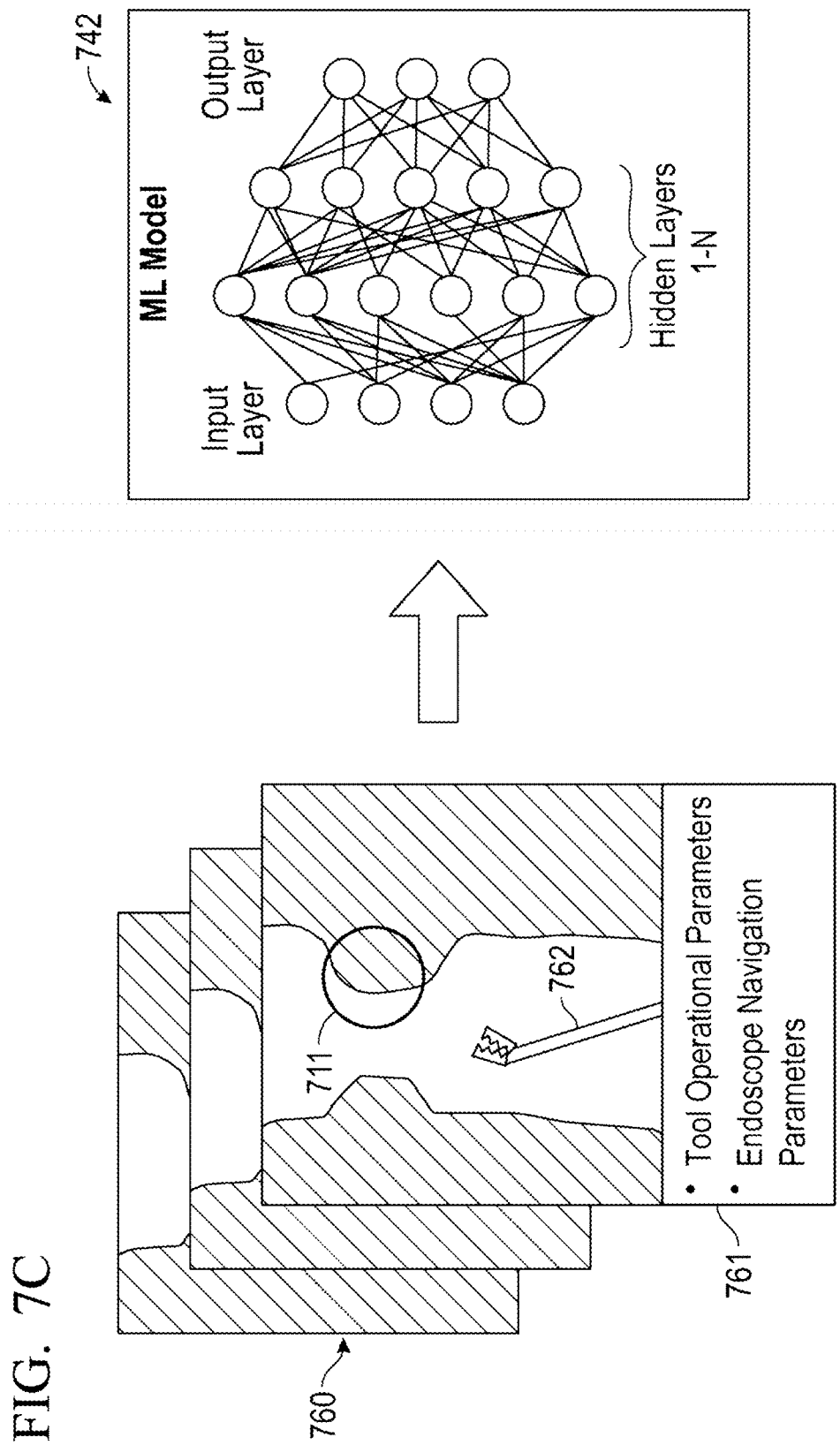

FIG. 7C illustrates an ML model training (or learning) phase during which an ML model 742 may be trained to estimate operational parameters for a tissue acquisition device (such as the recommended tool as determined by the trained ML model 741). In some examples, the ML model 742 may also be trained to estimate navigation parameters of an endoscope (or another steerable elongate instrument) for delivering the tissue acquisition device. The training data may comprise a plurality of biopsy images 760 from past endoscopic biopsy procedures representing anatomy of the anatomical target 711. The training data may also include information of tissue acquisition device 762 used each of the past procedures corresponding to the plurality of images 760, and information of the endoscope navigation and tool operational parameters 761. The training data may also include procedure outcome, such as success/failure assessment of the procedure, total procedure time, procedure difficulty and skills requirement, etc. Similar to the ML model 741 above, the ML model 742 can have a particular architecture, and can be trained using supervised learning, unsupervised learning, or reinforcement leaning.

The trained ML model 742 can establish a correspondence between the biopsy images from past endoscopic procedures and endoscope navigation and tool operational parameters.

In some examples, the trained ML model 742 can further establish a correspondence between the biopsy images from past endoscopic procedures.

Figure 7D:
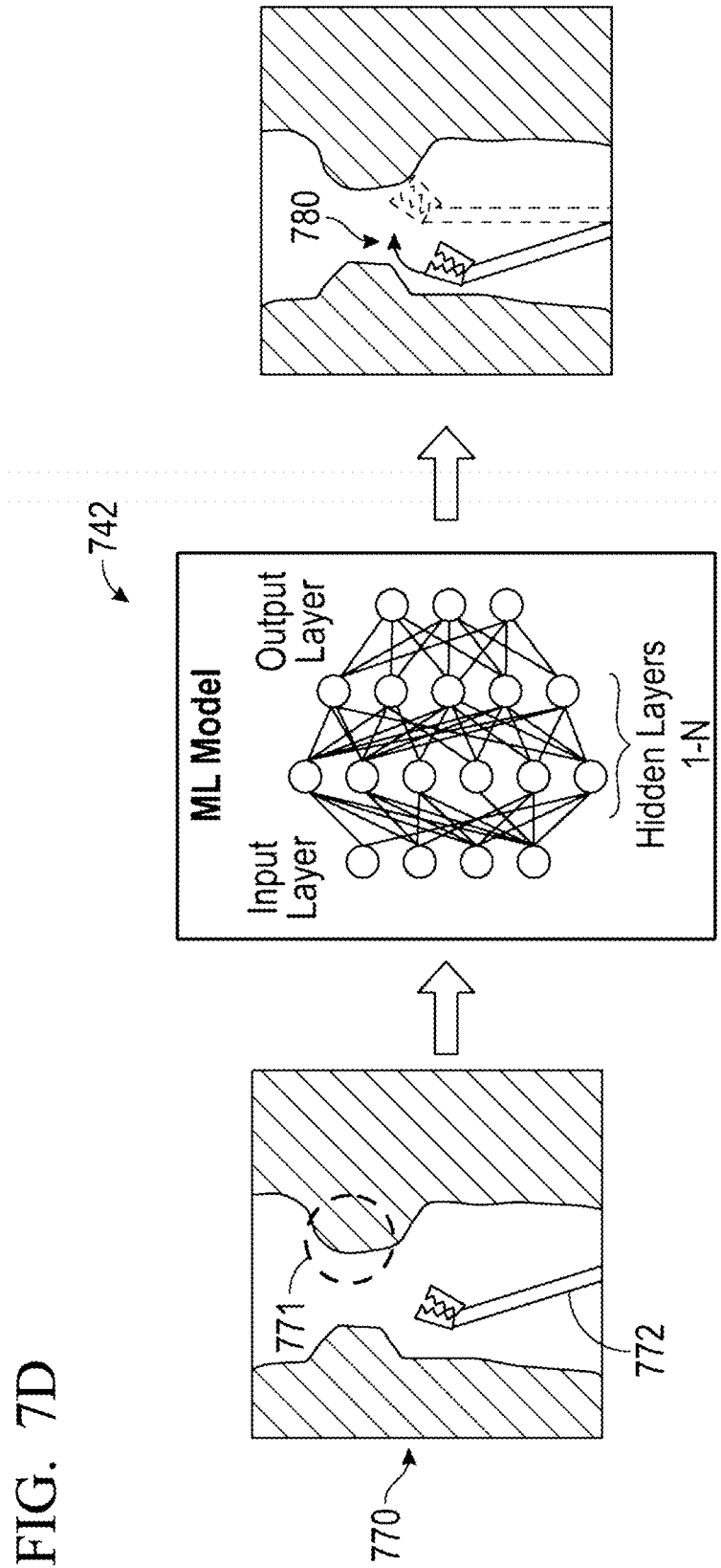

FIG. 7D illustrates an inference phase during which a live biopsy image 770 of a biliary ductal stricture 771 is applied to the trained ML model 742 to determine operational parameters for maneuvering the tissue acquisition device 772 and endoscope navigation parameters. The determined tool operational parameters and the endoscope navigation parameters can be communicated to a user (e.g., a physician) to assist in procedure planning. In the example as illustrated in FIG. 7D, the automatically determined tool operational parameters can be represented by a graph 780 showing desired location, posture, orientation, and an advancement path of the tissue acquisition device 772 relative to the biopsy site of the stricture 771. In some examples, the estimated operational parameters for maneuvering the tissue acquisition device 772 may be used to facilitate robotic maneuvering of the tissue acquisition device in a robot-assisted procedure.

Figure 8:
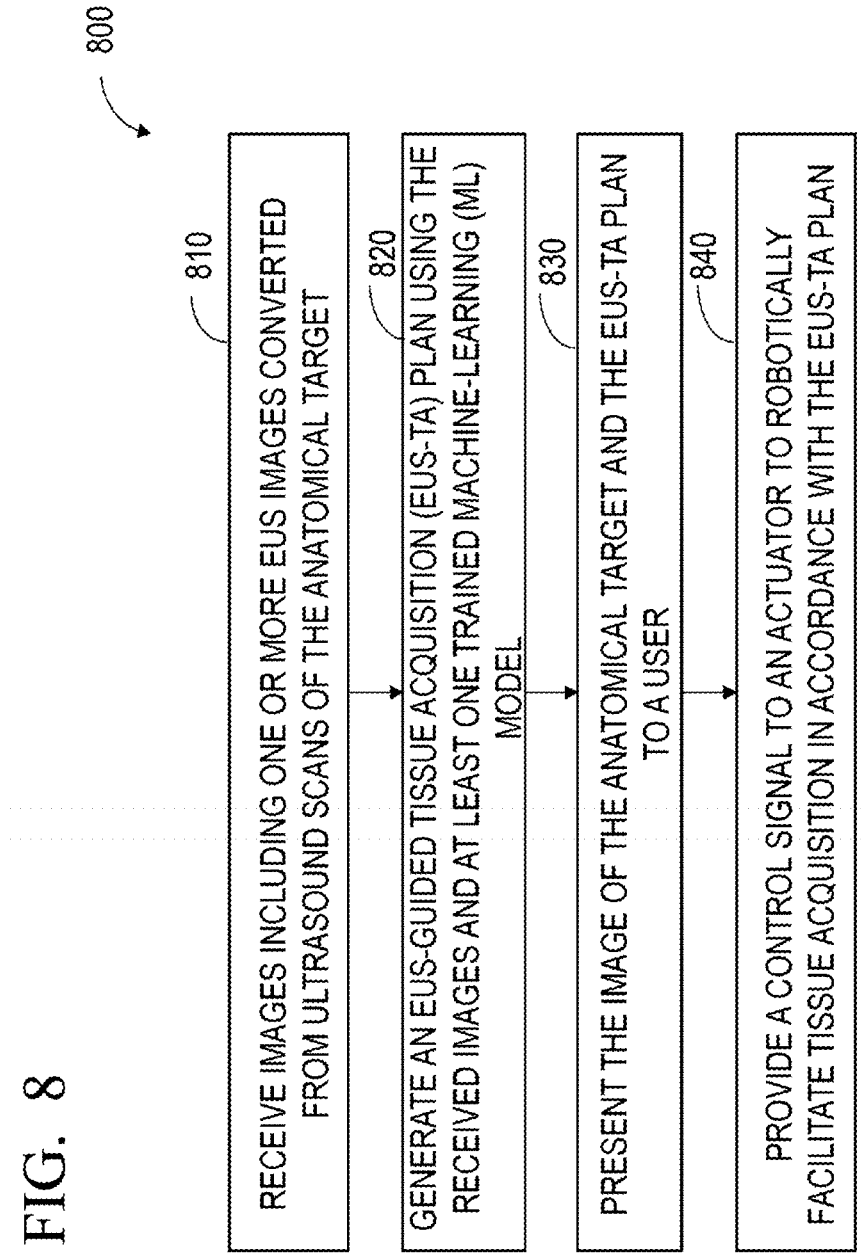
FIG. 8 is a flow chart illustrating an example method for planning an EUS-TA procedure.

FIG. 8 is a flow chart illustrating an example method 800 for planning an endoscopic ultrasound (EUS)-based tissue acquisition (EUS-TA) procedure via an endoscopy system, such as the EUS-TA planning system 600 as illustrated in FIG. 6. Although the processes of the method 800 are drawn in one flow chart, they are not required to be performed in a particular order. In various examples, some of the processes can be performed in a different order than that illustrated herein.

At 810, images including one or more EUS images converted from ultrasound scans of the anatomical target can be received such as via the input interface 630 as shown in FIG. 6. The received EUS images may include perioperative EUS images converted from ultrasound scans of the anatomical target during an EUS-guided procedure using, for example, the echoendoscope 320 as described above with reference to FIGS. 3A-3B and 4. In some examples, one or more images from other sources or of other modalities (e.g., different than EUS images) may additionally be used for creating the tissue acquisition plan. Such additional images may include preoperative images prior to the endoscopic procedure or perioperative image during the endoscopic procedure. Examples of such images may include perioperative endoscopic images or videos of the anatomical target and its surrounding environment (e.g., biliary duct strictures) captured by an imaging sensor associated with the echoendoscope, preoperative or perioperative images acquired by external imaging devices including X-ray or fluoroscopy images, electrical potential map or an electrical impedance map, CT images, or MRI images such as images obtained during MRCP, among others. In addition to the images of the anatomical target, other information may be used in the procedure planning process, including, for example, endo-therapeutic device information, sensor signals, physician information (e.g., the operating physician's habits or preference of using the steerable elongate instrument), and endoscope control log data, as described above with reference to FIG. 6.

At 820, the images of the anatomical target, and optionally other information received at step 810, may be provided to at least one trained machine-learning (ML) model to generate an EUS-TA plan for sampling tissue from the anatomical target, such as using the EUS-TA plan generator 613. The ML model may be trained using data from past endoscopic procedures on a plurality of patients, including images of the anatomical target (e.g., EUS images, and optionally along with other images from various sources or modalities) from a plurality of patient and the tissue acquisition plans corresponding to the images of anatomical targets. Supervised learning or unsupervised learning may be used to train the ML model.

In some examples, a subset of the received images may be selected and fed into the trained ML model to generate the EUS-TA plan. The selection can be on image qualities, such as signal to noise ratio, sharpness, contrast, level of distortion, exposure accuracy, among other attributes. Additionally or alternatively, a subset of the perioperative EUS images can be selected based on contact force between the EUS probe and a surface of the anatomical target where the ultrasound scans are taken. A consistent probe-surface contact force is correlated to consistent and stable EUS image quality. In an example, those perioperative EUS images converted from the ultrasound scans taken while the sensed contact force is maintained at a substantially constant value (e.g., within a margin of ±5%) or within a specific value range are selected and feed into the trained ML model to generate the EUS-TA plan.

By way of example and not limitation, the EUS-TA plan may include one or more of a recommended tissue acquisition tool, recommended values of one or more operational parameters for navigating and manipulating the tissue acquisition tool, recommended values for endoscope navigation parameters, or recommended values of one or more operational parameters for positioning and navigating the EUS probe to take ultrasound scans of the anatomical target, among others. In an example, the trained ML model may automatically determine a recommended tissue acquisition tool of a specific type or size based at least on the images received at 810. Other data may additionally or alternatively be used to make such tool recommendation, including, for example, position of the anatomical target, spatial restrictions of an environment of the anatomical target, or sizes or geometries of candidate tissue acquisition tools. Examples of the recommended tissue acquisition tool may include an aspiration or biopsy needle, brush, forceps, a knife, a snare, or a suction device. The tissue acquisition device recommendation can further include a recommend a tool size for a particular tool type, such as 19-, 22-, or 25-gauge (G) needles to be used with the echoendoscope 120 or 320 in an EUS-FNA or EUS-FNB procedures. These needles vary in flexibility and size, with 25 G needle being smaller in diameter, highly flexible, and yielding less bloody samples. In some examples, the tissue acquisition device recommendation may include a drainage device for EUS-based pancreatic fluid collection drainage, pancreatic duct drainage, gallbladder drainage, or biliary drainage. Examples of such drainage device include plastic or metallic stents of various sizes, such as from 5 to 10 French gauge (Fr). In some examples, the acquisition tool recommendation may include a stricture management device to open or dilate an obstructed or narrowed portion of the ductal system, such as dilating catheters, balloon dilators, and stents.

In some examples, the same trained ML model, or a separately trained ML model may automatically determine proper tool operations, such as recommended values of one or more operational parameters for navigating and manipulating the tissue acquisition tool during the procedure to safely and more effectively collect a sufficient amount of biopsy tissue, based at least on the input image. The tool operational parameters may include, for example, a position, a posture, a heading direction, or an angle of the tissue acquisition device relative to the anatomical target. Recommended values of the tool operational parameters can vary depending on the type of the tool used for tissue acquisition.

For example, for endoscopic forceps, the tool operational parameters may include forceps location; orientation, angle, or orbit of the forceps towards the biopsy site; advance length or distance from the biopsy site; jaw opening states such as having one jaw open or both jaw open, among others.

In some examples, the same trained ML model, or a separately trained ML model may automatically estimate navigation parameters of an endoscope (or other steerable elongate instrument) over which the tissue acquisition device is deployed, such as a distance from the endoscope distal portion to duodenal papilla; a heading direction of the distal portion of the endoscope relative to the biopsy site; an insertion angle of a cannula or a surgical element used in cannulation; a protrusion amount of a cannula or a surgical element; a speed or a force applied to the endoscope distal portion or a surgical element; a rotational direction or a cutting area of a surgical element; among others.

In some examples, the same trained ML model, or a separately trained ML model may automatically estimate one or more operational parameters for positioning and navigating the EUS probe to take ultrasound scans of the anatomical target. Such EUS probe operational parameters may include, for example, a position, posture, a heading direction, or an angle of the EUS probe relative to the anatomical target. In some examples, the EUS probe operational parameters may include a contact force applied to the EUS probe against a surface of the anatomical target where the ultrasound scans are taken. The probe-surface contact force can be sensed using a force sensor 617 associated with the EUS probe. As a consistent probe-surface contact force is correlated to consistent and stable EUS image quality, the sensed contact force can be used as a feedback to the operator or a robotic endoscopy system to control the operation of EUS probe against the tissue wall with consistent force so as to produce high-quality EUS images, which can assist in tissue acquisition device selection and biopsy site identification. In some examples, the trained ML model may be used to determine a probability of success, or an estimate of treatment time in accordance with the EUS-TA plan (including the recommended tissue acquisition tool, the automatically determined tool operational parameters, and the estimated endoscope navigation parameters).

In some examples, the same trained ML model, or a separately trained ML model may automatically recognize pathophysiological properties of the tissue at the biopsy site, such as a lesion, an inflammation state, a stricture level, or a malignancy state (e.g., degree or area of invasion by cancer) of the tissue to be acquired. In some examples, rapid on-site evaluation (ROSE) of biopsy tissue can be performed using an onboard microscopic imaging device such as disposed at the distal end portion of the echoendoscope. The microscopic imaging device can produce in vivo and substantially real-time microscopic images of a lesion at the anatomical target. The microscopic image can be processed to provide an in vivo diagnosis of tissue malignancy of the lesion. After the removal of the identified malignant tissue, images of the tissue removal site can be analyzed to confirm ex vivo that the malignant tissue has been completely removed. In some examples, the in vivo and substantially real-time microscopic image may be output to a user on a user interface for diagnosis. The identified characteristics of the biopsy site (e.g., identified lesion and malignancy thereof) can be used to determine or fine-tune the EUS-TA plan, such as to determine proper type and size of tissue acquisition devices and manipulation of such tools to safely and efficiently sample the tissue.

At 830, the image of the anatomical target, the EUS-TA plan generated at 820 (including the recommended tissue acquisition tool, and recommended values for one or more of tool operational parameters, endoscope navigation parameters, or EUS probe operational parameters), and the recognized pathophysiological properties of the tissue at the biopsy site, may be presented to a user, such as being displayed on a display of a user interface. In some examples, a graphical representation of the navigation of an endoscope based on the navigation parameters and/or a graphical representation of the operation of a tissue acquisition tool based on the tool operational parameters can also be displayed on the user interface.

At 840, a control signal may be provided to an actuator to robotically facilitate operation of a steerable elongate instrument or a tissue acquisition tool associated therewith (such as the recommended tissue acquisition tool) to treat the anatomical target in accordance with the EUS-TA plan determined at step 820. The steerable elongate instrument may include be a diagnostic or therapeutic endoscope, a cannula, a catheter, a guidewire, or a guide sheath, among others. The actuator can be a motor actuating a robot arm operably coupled to the steerable elongate instrument. The steerable elongate instrument may include a tissue acquisition tool robotically operable via the actuator. In response to the control signal, the actuator can robotically adjust position, posture, direction, and navigation path of the steerable elongate instrument and the tissue acquisition tool included therein, and acquire tissue at the biopsy site in accordance with the navigation parameters and/or the tool operational parameters generated at 820.

Figure 9:
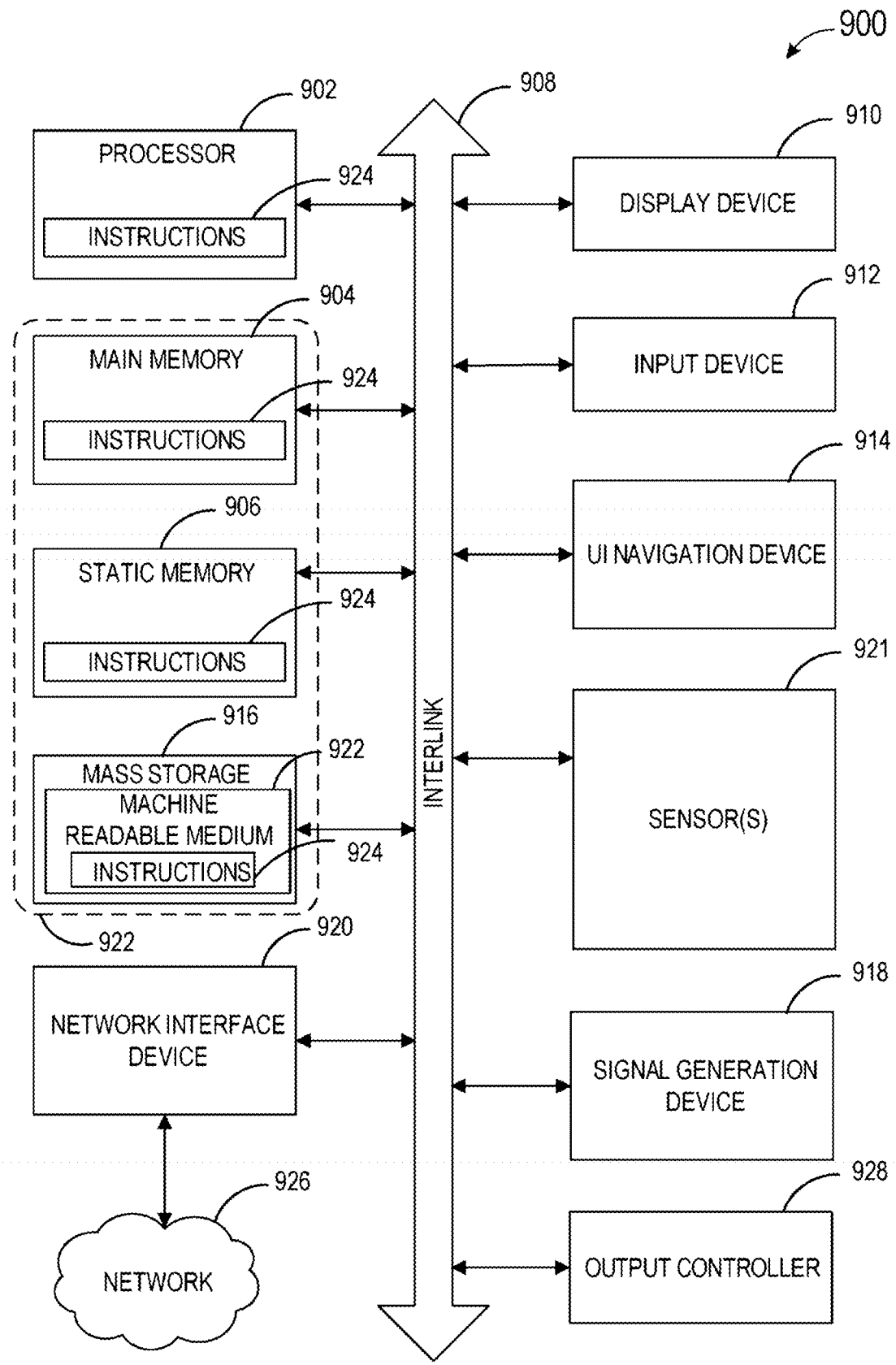
FIG. 9 is a block diagram illustrating an example machine upon which any one or more of the techniques (e.g., methodologies) discussed herein may perform.

FIG. 9 illustrates generally a block diagram of an example machine 900 upon which any one or more of the techniques (e.g., methodologies) discussed herein may perform. Portions of this description may apply to the computing framework of various portions of the imaging and control system 402, or various portions of the EUS-TA planning system 600.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910 (e.g., a raster display, vector display, holographic display, etc.), an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine-readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 924 may further be transmitted or received over a communication network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communication network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

(1st aspect) An endoscopic system, comprising:
 a steerable elongate instrument configured to be positioned and navigated in a patient anatomy, the steerable elongate instrument comprising (i) an endoscopic ultrasound (EUS) probe configured to produce ultrasound scans of an anatomical target and (ii) a tissue acquisition device configured to sample tissue from the anatomical target; and
 a processor configured to:
  receive images including one or more EUS images converted from the ultrasound scans of the anatomical target;
  apply the received images to at least one trained machine-learning (ML) model to generate an EUS-guided tissue acquisition (EUS-TA) plan; and
  provide the EUS-TA plan to a user or a robotic endoscopy system to sample the tissue from the anatomical target during an endoscopic procedure.

(2nd aspect) The endoscopic system of 1st aspect, wherein the received images include one or more preoperative images prior to the endoscopic procedure or one or more perioperative image during the endoscopic procedure.

(3rd aspect) The endoscopic system of 1st aspect, wherein the processor is configured to select a subset of the received images based on image qualities, and to apply the selected subset of the received images to the at least one trained ML model to generate the EUS-TA plan.

(4th aspect) The endoscopic system of 1st aspect, comprising a force sensor associated with the EUS probe, the force sensor configured to sense a contact force between the EUS probe and a surface of the anatomical target when the ultrasound scans are taken,
wherein the processor is configured to select a subset of the received one or more EUS images that correspond to the sensed contact force being maintained at a substantially constant value, and to apply the selected subset of the received one or more EUS images to the at least one trained ML model to generate the EUS-TA plan.

(5th aspect) The endoscopic system of 1st aspect, comprising a user interface configured to present the received images and the EUS-TA plan to the user.

(6th aspect) The endoscopic system of 1st aspect, comprising a controller configured to generate a control signal to an actuator of the robotic endoscopy system to robotically facilitate (i) navigation of the steerable elongate instrument or (ii) manipulation of one or more of the EUS probe or the tissue acquisition device in accordance with the EUS-TA plan.

(7th aspect) The endoscopic system of 1st aspect, wherein the processor includes a training module configured to generate the trained ML model using a training dataset comprising (i) images including EUS images of respective anatomical targets of a plurality of patients undergoing EUS-TA procedures and (ii) EUS-TA plans for the plurality of patients as used in the EUS-TA procedures.

(8th aspect) The endoscopic system of 1st aspect, wherein the EUS-TA plan includes a recommended type or size of the tissue acquisition device for use in the endoscopic procedure.

(9th aspect) The endoscopic system of 8th aspect, wherein the tissue acquisition device includes at least one of a tissue aspiration needle, a tissue biopsy needle, a brush, a snare, forceps, or a suction device.

(10th aspect) The endoscopic system of 1st aspect, wherein the EUS-TA plan includes a recommended type or size of at least one of an ablation device, a drainage device, or a stricture management device.

(11th aspect) The endoscopic system of 1st aspect, wherein the EUS-TA plan includes one or more operational parameters for navigating the steerable elongate instrument, or for maneuvering the tissue acquisition device to facilitate tissue acquisition.

(12th aspect) The endoscopic system of 11th aspect, wherein the one or more operational parameters include a position, a posture, a heading direction, or an angle of the tissue acquisition device relative to the anatomical target.

(13th aspect) The endoscopic system of 11th aspect, wherein the one or more operational parameters include a navigation path for navigating the steerable elongate instrument or maneuvering the EUS probe to the anatomical target.

(14th aspect) The endoscopic system of 1st aspect, wherein the EUS-TA plan includes one or more operational parameters for positioning and maneuvering the EUS probe to take the ultrasound scans of the anatomical target.

(15th aspect) The endoscopic system of 14th aspect, wherein the one or more operational parameters include one or more of a position, posture, a heading direction, or an angle of the EUS probe relative to the anatomical target.

(16th aspect) The endoscopic system of 14th aspect, wherein the one or more operational parameters include a force the EUS probe exerted on a surface of the anatomical target when the ultrasound scans are taken.

(17th aspect) The endoscopic system of 1st aspect, wherein the processor is configured to apply the received images of the anatomical target to the at least one trained ML model to recognize a lesion on the anatomical target and to determine tissue malignancy of the lesion.

(18th aspect) The endoscopic system of 17th aspect, wherein the processor is configured to generate the EUS-TA plan further based on the recognized lesion and the determined tissue malignancy.

(19th aspect) The endoscopic system of 17th aspect, comprising a microscopic imaging device coupled to the steerable elongate instrument, the microscopic imaging device configured to generate an in-vivo and substantially real-time microscopic image of the recognized lesion, wherein the processor is configured to determine the tissue malignancy using the in-vivo and substantially real-time microscopic image.

(20th aspect) The endoscopic system of 17th aspect, wherein the processor is configured to present the in-vivo and substantially real-time microscopic image to the user on a user interface.

(21th aspect) A method of endoscopic ultrasound (EUS)-based tissue acquisition from an anatomical target via an steerable elongate instrument, the method comprising:
receiving images including one or more EUS images converted from ultrasound scans of the anatomical target, the ultrasound scans produced using an EUS probe associated with the steerable elongate instrument;
generating an EUS-guided tissue acquisition (EUS-TA) plan using the received images and at least one trained machine-learning (ML) model; and
providing the EUS-TA plan to a user or a robotic endoscopy system to sample tissue from the anatomical target during an endoscopic procedure using a tissue acquisition device associated with the steerable elongate instrument.

(22th aspect) The method of 21th aspect, comprising presenting the received images and the EUS-TA plan to the user on a user interface.

(23th aspect) The method of 21th aspect, comprising generating a control signal to an actuator of the robotic endoscopy system to robotically facilitate (i) navigation of the steerable elongate instrument or (ii) manipulation of one or more of the EUS probe or the tissue acquisition device in accordance with the EUS-TA plan.

(24th aspect) The method of 21th aspect, comprising selecting a subset of the received images based on image qualities, wherein generating the EUS-guided tissue acquisition (EUS-TA) plan includes applying the selected subset of the received images to the at least one trained ML model.

(25th aspect) The method of 21th aspect, comprising sensing a contact force between the EUS probe and a surface of the anatomical target when the ultrasound scans are taken a force sensor associated with the EUS probe, and selecting a subset of the received one or more EUS images that correspond to the sensed contact force being maintained at a substantially constant value, wherein generating the EUS-guided tissue acquisition (EUS-TA) plan includes applying the selected subset of the received one or more EUS images to the at least one trained ML model.

(26th aspect) The method of 21th aspect, wherein the EUS-TA plan includes a recommended type or size of the tissue acquisition device, an ablation device, a drainage device, or a stricture management device for use in the endoscopic procedure.

(27th aspect) The method of 21th aspect, wherein the EUS-TA plan includes one or more operational parameters for navigating the steerable elongate instrument, or for maneuvering the tissue acquisition device to facilitate tissue acquisition.

(28th aspect) The method of 27th aspect, wherein the one or more operational parameters include a position, a posture, a heading direction, or an angle of the tissue acquisition device relative to the anatomical target.

(29th aspect) The method of 27th aspect, wherein the one or more operational parameters include a navigation path for navigating the steerable elongate instrument or maneuvering the EUS probe to the anatomical target.

(30th aspect) The method of 21th aspect, wherein the EUS-TA plan includes one or more operational parameters for positioning and maneuvering the EUS probe to take the ultrasound scans of the anatomical target.

(31th aspect) The method of 30th aspect, wherein the one or more operational parameters include one or more of a position, posture, a heading direction, or an angle of the EUS probe relative to the anatomical target.

(32th aspect) The method of 30th aspect, wherein the one or more operational parameters include a force the EUS probe exerted on a surface of the anatomical target when the ultrasound scans are taken.

(33th aspect) The method of 21th aspect, comprising:
applying the received images of the anatomical target to the at least one trained ML model to recognize a lesion on the anatomical target and to determine tissue malignancy of the lesion; and
generating the EUS-TA plan further based on the recognized lesion and the determined tissue malignancy.

(34th aspect) The method of 33th aspect, comprising:
generating an in-vivo and substantially real-time microscopic image of the recognized lesion using a microscopic imaging device coupled to the steerable elongate instrument; and
determining the tissue malignancy using the in-vivo and substantially real-time microscopic image.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

FIELD OF THE DISCLOSURE

The present document relates generally to endoscopy systems, and more particularly to systems and methods for generating a three-dimensional (3D) reconstruction of an anatomical target and using the same to improve visualization of anatomical structures and to guide endoscopic procedures.

BACKGROUND

Endoscopes have been used in a variety of clinical procedures, including, for example, illuminating, imaging, detecting and diagnosing one or more disease states, providing fluid delivery (e.g., saline or other preparations via a fluid channel) toward an anatomical region, providing passage (e.g., via a working channel) of one or more therapeutic devices or biological matter collection devices for sampling or treating an anatomical region, and providing suction passageways for collecting fluids (e.g., saline or other preparations), among other procedures. Examples of such anatomical region may include gastrointestinal tract (e.g., esophagus, stomach, duodenum, pancreaticobiliary duct, intestines, colon, and the like), renal area (e.g., kidney(s), ureter, bladder, urethra) and other internal organs (e.g., reproductive systems, sinus cavities, submucosal regions, respiratory tract), and the like.

Some endoscopes include a working channel through which an operator can perform suction, placement of diagnostic or therapeutic devices (e.g., a brush, a biopsy needle or forceps, a stent, a basket, or a balloon), or minimally invasive surgeries such as tissue sampling or removal of unwanted tissue (e.g., benign or malignant strictures) or foreign objects (e.g., calculi). Some endoscopes can be used with a laser or plasma system to deliver energy to an anatomical target (e.g., soft or hard tissue or calculi) to achieve desired treatment. For example, laser has been used in applications of tissue ablation, coagulation, vaporization, fragmentation, and lithotripsy to break down calculi in kidney, gallbladder, ureter, among other stone-forming regions, or to ablate large calculi into smaller fragments.

Endoscopic ultrasound (EUS) is a specialized endoscopy that combines conventional endoscopy with ultrasound to obtain images of internal organs such as upper gastrointestinal (GI) tract, including organs such as the stomach, pancreas, bile duct, liver and lymph nodes, etc. An echoendoscope includes at its tip an ultrasound transducer that emits ultrasound waves and converts the ultrasound echoes into detailed images of the target organ such as pancreas and surrounding abdominal organs. Although EUS is established as a diagnostic modality with high-resolution imaging, various EUS-based interventions and techniques have emerged, including tissue acquisition, pancreatic fluid collection drainage, pancreatic duct drainage, gallbladder drainage, and biliary drainage, pancreatic cyst ablation, vascular interventions, among others. EUS has also been used for cancer pain relief (celiac plexus neurolysis), and targeted cancer treatment via brachytherapy, radiofrequency ablation, or injection therapy.

SUMMARY

The present disclosure recognizes several technological problems to be solved with conventional endoscopes, such as duodenoscopes used for diagnostics and retrieval of sample biological matter. One of such problems is increased difficulty in navigating endoscopes, and instruments inserted therein (e.g., tissue acquisition devices), to locations in anatomical regions deep within a patient. For example, as the endoscope and the tissue acquisition device have become progressively smaller to be inserted sequentially into in progressively smaller lumens, it has become more difficult to maneuver and navigate the endoscope through the patient anatomy, maintain endoscope stabilization, and maintain correct cannulation position in a narrow space (e.g., the bile duct). It can also be difficult to maintain an appropriate cannulation angle due to limited degree of freedom in scope elevator. Cannulation and endoscope navigation require advanced surgical skills and manual dexterity, which can be particularly challenging for less-experienced operating physicians (e.g., surgeons or endoscopists).

The difficulty in cannulation and endoscope navigation may also be attributed to variability of patient anatomy, such as patients with surgically altered anatomy. For example, in Endoscopic Retrograde Cholangio-Pancreatography (ERCP) procedures for diagnosing and/or treating certain pancreaticobiliary problems, some patients may have altered anatomy to a portion of the GI tract or the pancreaticobiliary system (e.g., the ampulla). In some patients, stricture ahead of pancreas can compress the stomach and part of duodenum, making it difficult to navigate the duodenoscope in a limited lumen of the compressed duodenum and to navigate the cholangioscope to reach the duodenal papilla, the point where the dilated junction of the pancreatic duct and the bile duct (ampulla of Vater) enter the duodenum. In another example, some patients have alternated papilla anatomy. With the duodenoscope designed to be stable in the duodenum, it can be more difficult to reach the duodenal papilla in surgically altered anatomy. Conventional endoscopy systems generally lack the capability of providing cannulation and endoscope navigation guidance based on patient's unique anatomy.

Conventional endoscopy systems also lack advanced visualization capabilities and visual acuity. For example, conventional diagnostic EUS procedure or EUS-guided interventions generally rely on two-dimensional ultrasound images. Such 2D images cannot provide direct and explicit three-dimensional (3D) form of observation and spatial details, such as shape, depth, and structural or geometric characteristics of an anatomical target. The small field of view and the lack of spatial and topological information make it difficult for the operator to conceive a complete 3D geometry (e.g., contours) of a critical anatomical structure of interest, to identify features of such structure (e.g., boundaries or orientations of vessels or organs), and to determine spatial positions and postures of an instrument such as the echoendoscope, the EUS probe, or other treatment tools (e.g., cannula or tissue acquisition needles) relative to the anatomical target. Instead, the operator usually needs to perform extra procedure to presume, or mentally reconstruct, a 3D shape of the observed anatomy. However, as such 2D images of different modalities (e.g., endoscopic images and fluoroscopy images) are separately acquired and usually neither calibrated or properly registered or aligned, mental 3D reconstruction from the 2D images is not only burdensome and time-consuming, but the interpretation can also be highly variable among physicians due to their different experiences and skill levels.

The lack of advanced visualization in conventional endoscopy systems limits the capability and usability of image-guided navigation and target anatomy recognition. The present inventors have recognized an unmet need for technologies that enable improved visualization and enhanced user appreciation of spatial and geometric properties of anatomical structures of interest and their spatial relationship with the EUS probe and other interventional tools during an echoendoscopy procedure.

The present disclosure describes systems, devices, and methods for creating a 3D reconstruction of an anatomical target using EUS images, optionally along with images from other external sources or of other modalities, and using the 3D reconstruction to improve visualization and to guide endoscopic procedures. According to one embodiment, an endoscopy system comprises an endoscope configured to be positioned and navigated in a patient anatomy, a position sensor, and a processor. The endoscope comprise an endoscopic ultrasound (EUS) probe to produce ultrasound scans of an anatomical target as the EUS probe is controllably placed at different positions or postures with respect to the anatomical target. The positions and postures of the EUS probe can be detected by the position sensor. The processor can generate a three-dimensional (3D) reconstruction of the anatomical target using EUS images converted from the ultrasound scans and the corresponding probe positions or postures. The 3D reconstruction can be provided to an operator or a robotic to facilitate visualization and identification of critical anatomical structures, and to guide endoscope navigation and probe positioning in an endoscopic procedure.

The present disclosure provides techniques that allow an operator to better visualize and appreciate topography of a target anatomy and its surrounding environment. Compared to conventional 2D EUS images, the 3D reconstruction can be observed more intuitively and objectively with addition of 3D shape, depth, and structural details of the target anatomy, thereby enhancing the visualization capabilities of an endoscopy system. The reconstructed 3D images also help ease physician burden of performing extra procedure to presume, or mentally reconstruct, 3D structure of the observed anatomy, and reduce inter-physician variations in image interpretation. In accordance with some embodiments, integration of images of different modalities into the reconstructed 3D image may provide more complete location and structural information of the target anatomy. The enhanced visualization can improve target anatomy recognition, maintain correction cannulation position and direction, and provide more robust and precise cannulation and endoscope navigation. As a result, the overall procedure success rate can be increased and patient outcome can be improved.

Example 1 is an endoscopic system, comprising: an endoscope comprising an endoscopic ultrasound (EUS) probe configured to produce ultrasound scans of an anatomical target as the EUS probe is controllably placed at different positions or postures relative to the anatomical target; a position sensor configured to detect the different positions or postures of the EUS probe corresponding to the ultrasound scans; and a processor configured to: generate a three-dimensional (3D) reconstruction of the anatomical target using (i) EUS images converted from the ultrasound scans and (ii) the detected different positions or postures of the EUS probe; and present a graphical representation of the generated 3D reconstruction on a user interface.

In Example 2, the subject matter of Example 1 optionally includes, wherein the processor is configured to generate the 3D reconstruction further using preoperative or perioperative image data from one or more imaging modalities different than endoscopic ultrasound.

In Example 3, the subject matter of any one or more of Examples 1-2 optionally include, wherein the EUS probe is manually or robotically actuatable to rotate around an longitudinal axis of the endoscope to create a plurality of radial scans in a plane perpendicular to an longitudinal axis of the endoscope from different angular positions centered on the longitudinal axis, wherein the processor is configured to generate the 3D reconstruction using EUS images converted from the plurality of radial scans.

In Example 4, the subject matter of any one or more of Examples 1-3 optionally include, wherein the EUS probe is manually or robotically actuatable to move to-and-fro along an longitudinal axis of the endoscope to create a plurality of linear array scans in a plane parallel to the longitudinal axis of the endoscope from different longitudinal positions along the longitudinal axis, wherein the processor is configured to generate the 3D reconstruction using EUS images converted from the plurality of linear array scans.

In Example 5, the subject matter of any one or more of Examples 1-4 optionally include, wherein the processor is configured to: identify an anatomical structure from each of the EUS images converted from the ultrasound scans; select a subset of the EUS images with the identified anatomical structure being located at substantially a center of respective EUS images; and generate the 3D reconstruction using the selected subset of images.

In Example 6, the subject matter of any one or more of Examples 1-5 optionally include, wherein the processor is configured to: determine respective image qualities of the EUS images; and generate the 3D reconstruction using a subset of the EUS images selected based on the respective image qualities.

In Example 7, the subject matter of any one or more of Examples 1-6 optionally include a force sensor configured to sense contact force between the EUS probe and a surface of the anatomical target when the ultrasound scans are taken, wherein the processor is configured to generate the 3D reconstruction using a subset of the EUS images corresponding to the sensed contact force being maintained at a substantially constant value.

In Example 8, the subject matter of Example 7 optionally includes, wherein the processor is configured to provide the sensed contact force to a user or a robotic endoscopy system as a feedback to guide positioning and navigation of the endoscope or the EUS probe while maintaining the sensed contact force at substantially a preset level or within a preset range.

In Example 9, the subject matter of any one or more of Examples 1-8 optionally include a force sensor configured to sense contact force between the EUS probe and a surface of the anatomical target when the ultrasound scans are taken, wherein the processor is configured to generate the 3D reconstruction using a subset of the EUS images corresponding to the sensed contact force being equal to or exceeding a force threshold.

In Example 10, the subject matter of Example 9 optionally includes, wherein the processor is configured to provide the sensed contact force to a user or a robotic endoscopy system as a feedback to guide positioning and navigation of the endoscope or the EUS probe while maintaining the sensed contact force being equal to or exceeding the force threshold.

In Example 11, the subject matter of any one or more of Examples 1-10 optionally include, wherein the position sensor includes at least one of: an external electromagnetic (EM) detector configured to detect transabdominal EM wave emission from an EM emitter associated with the EUS probe; or an external optical sensor configured to detect an optical signal emitted from an optical signal source associated with the EUS probe.

In Example 12, the subject matter of any one or more of Examples 1-11 optionally include, wherein the position sensor includes an internal shape sensor disposed at a shaft portion of the endoscope in proximity to the EUS probe, the internal shape sensor configured to sense a shape of the shaft portion of the endoscope.

In Example 13, the subject matter of any one or more of Examples 1-12 optionally include, wherein the position sensor includes an external angle sensor associated with an actuator to robotically manipulate the endoscope and the EUS probe, the external angle sensor configured to detect a rotation angel of the EUS probe actuated by the actuator.

In Example 14, the subject matter of any one or more of Examples 1-13 optionally include, wherein the processor is configured to: receive a real-time perioperative endoscopic image of the anatomical target taken at a real-time position or posture of the EUS probe during an endoscopic procedure; generate a virtual EUS image based on the generated 3D reconstruction of the anatomical target and the real-time position or posture of the EUS probe; superimpose the real-time perioperative endoscopic image onto the virtual EUS image to create a 3D composite image model; and present on the user interface a graphical representation of the 3D composite image model.

In Example 15, the subject matter of any one or more of Examples 1-14 optionally include, wherein the ultrasound scans include two or more ultrasound scans taken at different times when the EUS probe is at fixed position and posture, and wherein the processor is configured to: detect a common anatomical landmark from each of EUS images of the two or more ultrasound scans; detect a spatial shift of an anatomical structure using the detected common anatomical landmark; and adjust a location of the anatomical structure in the graphical representation of the 3D reconstruction to correct or compensate for the detected spatial shift.

In Example 16, the subject matter of Example 15 optionally includes, wherein the processor is configured to present a graphical representation of a real-time perioperative endoscopic image superimposed onto the 3D reconstruction with the adjusted location of the anatomical structure.

In Example 17, the subject matter of any one or more of Examples 1-16 optionally include, wherein the processor is further configured to: detect a presence or absence of an anatomical structure from a real-time perioperative endoscopic image of the anatomical target; in response to the detected presence of the anatomical structure, present on the user interface a graphical representation of the anatomical structure on the real-time perioperative endoscopic image; and in response to the detected absence of the anatomical structure: generate an endoscope navigation plan for positioning and navigating the endoscope or the EUS probe using the generated 3D reconstruction; provide the endoscope navigation plan to a user or a robotic endoscopy system to reposition or renavigate the endoscope or the EUS probe; and detect the presence or absence of the anatomical structure from a different real-time perioperative endoscopic image.

In Example 18, the subject matter of any one or more of Examples 1-17 optionally include, wherein the ultrasound scans include a first ultrasound scan taken at a first position or posture of the EUS probe, and a second ultrasound scan taken at a second position or posture of the EUS probe, wherein the processor is configured to: generate a first estimate of a change from the first position or posture to the second position or posture ($\Delta PP$) based on outputs of the position sensor; generate a second estimate of the $\Delta PP$ using EUS images converted from the first ultrasound scan and EUS images converted from the second ultrasound scan; and generate or update an endoscope navigation plan for positioning and navigating the endoscope or the EUS probe based at least on a comparison between the first estimate of $\Delta PP$ and the second estimate of $\Delta PP$.

In Example 19, the subject matter of Example 18 optionally includes, wherein the processor is configured to determine a correlation or a deviation between the first estimate of $\Delta PP$ and the second estimate of $\Delta PP$, wherein to generate or update the endoscope navigation plan includes to determine an operational parameter of the EUS probe that corresponds to (i) the determined correlation exceeding a correlation threshold or (ii) the determined deviation falling below a deviation threshold.

In Example 20, the subject matter of Example 19 optionally includes, wherein the operational parameter of the EUS probe includes at least one of: a position of the EUS probe to aim a center of the anatomical target; a rotating angle of the EUS probe; or a contact force between the EUS probe and a surface of the anatomical target.

Example 21 is a method of planning an ultrasound guided endoscopic procedure, the method comprising: producing ultrasound scans of an anatomical target using an endoscopic ultrasound (EUS) probe being placed at different positions or postures relative to the anatomical target; detecting, via a position sensor, the different positions or postures of the EUS probe corresponding to the ultrasound scans; generating a three-dimensional (3D) reconstruction of the anatomical target using (i) EUS images converted from the ultrasound scans and (ii) the detected different positions or postures of the EUS probe; and presenting a graphical representation of the generated 3D reconstruction on a user interface.

In Example 22, the subject matter of Example 21 optionally includes, wherein generating the 3D reconstruction further includes using preoperative or perioperative image data from one or more imaging modalities other than endoscopic ultrasound.

In Example 23, the subject matter of any one or more of Examples 21-22 optionally include, wherein the ultrasound scans used for generating the 3D reconstruction includes a plurality of radial scans as the EUS probe is manually or robotically actuated to rotate around an longitudinal axis of the endoscope, the plurality of radial scans being in a plane perpendicular to an longitudinal axis of the endoscope from different angular positions centered on the longitudinal axis.

In Example 24, the subject matter of any one or more of Examples 21-23 optionally include, wherein the ultrasound scans used for generating the 3D reconstruction includes a plurality of linear array scans as the EUS probe is manually or robotically actuated to move to-and-fro along an longitudinal axis of the endoscope, the plurality of linear array scans being in a plane parallel to the longitudinal axis of the endoscope from different longitudinal positions along the longitudinal axis.

In Example 25, the subject matter of any one or more of Examples 21-24 optionally include: identifying an anatomical structure from each of the EUS images converted from the ultrasound scans; selecting a subset of the EUS images with the identified anatomical structure being located at substantially a center of respective EUS images; and generating the 3D reconstruction using the selected subset of the EUS images.

In Example 26, the subject matter of any one or more of Examples 21-25 optionally include: determining respective image qualities of the EUS images; and generating the 3D reconstruction using a subset of the EUS images selected based on the respective image qualities.

In Example 27, the subject matter of any one or more of Examples 21-26 optionally include: sensing contact force between the EUS probe and a surface of the anatomical target when the ultrasound scans are taken; and generating the 3D reconstruction using a subset of the EUS images corresponding to the sensed contact force being maintained at a substantially constant value or being equal to or exceeding a force threshold.

In Example 28, the subject matter of Example 27 optionally includes providing the sensed contact force to a user or a robotic endoscopy system as a feedback to guide positioning and navigation of the endoscope or the EUS probe while maintaining the sensed contact force at substantially a preset level or within a preset range, or at or exceeding a force threshold.

In Example 29, the subject matter of any one or more of Examples 21-28 optionally include, wherein detecting the different positions or postures of the EUS probe is based on at least one of: electromagnetic (EM) wave emission from an EM emitter associated with the EUS probe and transabdominally detected using an external EM sensor; an optical signal emitted from an optical signal source associated with the EUS probe and detected using an external optical sensor; a shape of a shaft portion of the endoscope sensed using an internal shape sensor disposed at the shaft portion of the endoscope in proximity to the EUS probe; or an rotation angle of the EUS probe actuated by an actuator of a robot endoscopy system, the rotation angle sensed using an external angle sensor associated with the actuator.

In Example 30, the subject matter of any one or more of Examples 21-29 optionally include: receiving a real-time perioperative endoscopic image of the anatomical target taken at a position or posture of the EUS probe during an endoscopic procedure; generating a virtual EUS image based on the generated 3D reconstruction of the anatomical target and the real-time position or posture of the EUS probe; superimposing the real-time perioperative endoscopic image onto the virtual EUS image to create a 3D composite image model; and presenting on the user interface a graphical representation of the 3D composite image.

In Example 31, the subject matter of any one or more of Examples 21-30 optionally include, wherein the ultrasound scans of the anatomical target include two or more ultrasound scans taken at different times when the EUS probe is at fixed position and posture, the method comprising: detecting a common anatomical landmark from each of EUS images of the two or more ultrasound scans; detecting a spatial shift of an anatomical structure using the detected common anatomical landmark; and adjusting a location of the anatomical structure in the graphical representation of the generated 3D reconstruction to correct or compensate for the detected spatial shift.

In Example 32, the subject matter of Example 31 optionally includes presenting a graphical representation of a real-time perioperative endoscopic image superimposed onto the generated 3D reconstruction with the adjusted location of the anatomical structure.

In Example 33, the subject matter of any one or more of Examples 21-32 optionally include: detecting a presence or absence of an anatomical structure from a real-time perioperative endoscopic image of the anatomical target; in response to the detected presence of the anatomical structure, presenting on the user interface a graphical representation of the anatomical structure on the real-time perioperative endoscopic image; and in response to the detected absence of the anatomical structure: generating an endoscope navigation plan for positioning and navigating the endoscope or the EUS probe using the generated 3D reconstruction; providing the endoscope navigation plan to a user or a robotic endoscopy system to reposition or renavigate the endoscope or the EUS probe; and detecting the presence or absence of the anatomical structure from a different real-time perioperative endoscopic image.

In Example 34, the subject matter of any one or more of Examples 21-33 optionally include, wherein the ultrasound scans include a first ultrasound scan taken at a first position or posture of the EUS probe, and a second ultrasound scan taken at a second position or posture of the EUS probe, the method further comprising: generating a first estimate of a change from the first position or posture to the second position or posture ($\Delta PP$) based on outputs of the position sensor; generating a second estimate of the $\Delta PP$ using EUS images converted from the first ultrasound scan and EUS images converted from the second ultrasound scan; and generating or updating an endoscope navigation plan for positioning and navigating the endoscope or the EUS probe based at least on a comparison between the first estimate of $\Delta PP$ and the second estimate of $\Delta PP$.

In Example 35, the subject matter of Example 34 optionally includes determining a correlation or a deviation between the first estimate of $\Delta PP$ and the second estimate of $\Delta PP$, wherein generating or updating the endoscope navigation plan includes determining an operational parameter of the EUS probe that corresponds to the correlation exceeding a correlation threshold, or the determined deviation falling below a deviation threshold.

In Example 36, the subject matter of Example 35 optionally includes, wherein the operational parameter of the EUS probe includes at least one of: the operational parameter of the EUS probe including at least one of: a position of the EUS probe to aim a center of the anatomical target; a rotating angle of the EUS probe; or a contact force between the EUS probe and a surface of the anatomical target.

Example 37 is an image processor, comprising: an image input circuit configured to receive EUS images of an anatomical target from an endoscope and information about positions or postures of an EUS probe of the endoscope corresponding to each of the received EUS images; and an image processing circuit configured to: generate a three-dimensional (3D) reconstruction of the anatomical target using the received EUS images and the information about the positions or postures of the EUS probe; and present a graphical representation of the generated 3D reconstruction on a user interface.

In Example 38, the subject matter of Example 37 optionally includes, wherein the image processing circuit is configured to generate the 3D reconstruction further using preoperative or perioperative image data from one or more imaging modalities different than endoscopic ultrasound.

In Example 39, the subject matter of any one or more of Examples 37-38 optionally include, wherein the image processing circuit is configured to determine respective image qualities of the EUS images, and to generate the 3D reconstruction using a subset of the EUS images selected based on the respective image qualities.

In Example 40, the subject matter of any one or more of Examples 37-39 optionally include, wherein the image processing circuit is configured to receive information about contact force between the EUS probe and a surface of the anatomical target, and to generate the 3D reconstruction using a subset of the EUS images corresponding to the received contact force being maintained at a substantially constant value, or being equal to or exceeding a force threshold.

In Example 41, the subject matter of Example 40 optionally includes, wherein the image processing circuit is configured to provide the sensed contact force to a user or a robotic endoscopy system as a feedback to guide positioning and navigation of the endoscope or the EUS probe while maintaining the sensed contact force at substantially a preset level or within a preset range, or at or exceeding a force threshold.

In Example 42, the subject matter of any one or more of Examples 37-41 optionally include, wherein the image processing circuit is configured to: receive a real-time perioperative endoscopic image of the anatomical target taken at a real-time position or posture of the EUS probe during an endoscopic procedure; generate a virtual EUS image based on the generated 3D reconstruction of the anatomical target and the real-time position or posture of the EUS probe; superimpose the real-time perioperative endoscopic image onto the virtual EUS image to create a 3D composite image model; and present on the user interface a graphical representation of the 3D composite image model.

In Example 43, the subject matter of any one or more of Examples 37-42 optionally include, wherein the received EUS images include two or more EUS images taken at different times and corresponding to the EUS probe being positioned at fixed position and posture, and wherein the image processing circuit is configured to: detect a common anatomical landmark from each of the two or more EUS images; detect a spatial shift of an anatomical structure using the detected common anatomical landmark; and adjust a location of the anatomical structure in the graphical representation of the 3D reconstruction to correct or compensate for the detected spatial shift.

In Example 44, the subject matter of any one or more of Examples 37-43 optionally include, wherein the image processing circuit is further configured to: detect a presence or absence of an anatomical structure from a real-time perioperative endoscopic image of the anatomical target; in response to the detected presence of the anatomical structure, present on the user interface a graphical representation of the anatomical structure on the real-time perioperative endoscopic image; and in response to the detected absence of the anatomical structure: generate an endoscope navigation plan for positioning and navigating the endoscope or the EUS probe using the generated 3D reconstruction; provide the endoscope navigation plan to a user or a robotic endoscopy system to reposition or renavigate the endoscope or the EUS probe; and detect the presence or absence of the anatomical structure from a different real-time perioperative endoscopic image.

In Example 45, the subject matter of any one or more of Examples 37-44 optionally include a position sensor configured to detect the positions or postures of the EUS probe corresponding to each of the received EUS images, wherein the image processing circuit is configured to: generate a first estimate of a change in position or posture (ΔPP) from a first position or posture corresponding a first EUS image to a second position or posture corresponding to a second EUS image, based on outputs of the position sensor; generate a second estimate of the ΔPP based on the first and second EUS images; and generate or update an endoscope navigation plan for positioning and navigating the endoscope or the EUS probe based at least on a comparison between the first estimate of ΔPP and the second estimate of ΔPP.

The presented techniques are described in terms of health-related procedures, but are not so limited. This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

DETAILED DESCRIPTION

This document describes systems, devices, and methods for creating a three-dimensional (3D) reconstruction of an anatomical target to enhance visualization and to guide an endoscopic procedure. An endoscopy system comprises an endoscope, a position sensor, and a processor. The endoscope comprises an endoscopic ultrasound (EUS) probe configured to produce ultrasound scans of an anatomical target as the probe is controllably placed at different positions or postures relative to the anatomical target, which can be detected by the position sensor. The processor can generate a 3D reconstruction of the anatomical target using image data converted from the ultrasound scans and the corresponding EUS probe positions or postures. The 3D reconstruction can be provided to an operator or a robotic to facilitate visualization and identification of critical anatomical structures, and to guide endoscope navigation and probe positioning in an endoscopic procedure.

Figure 10:
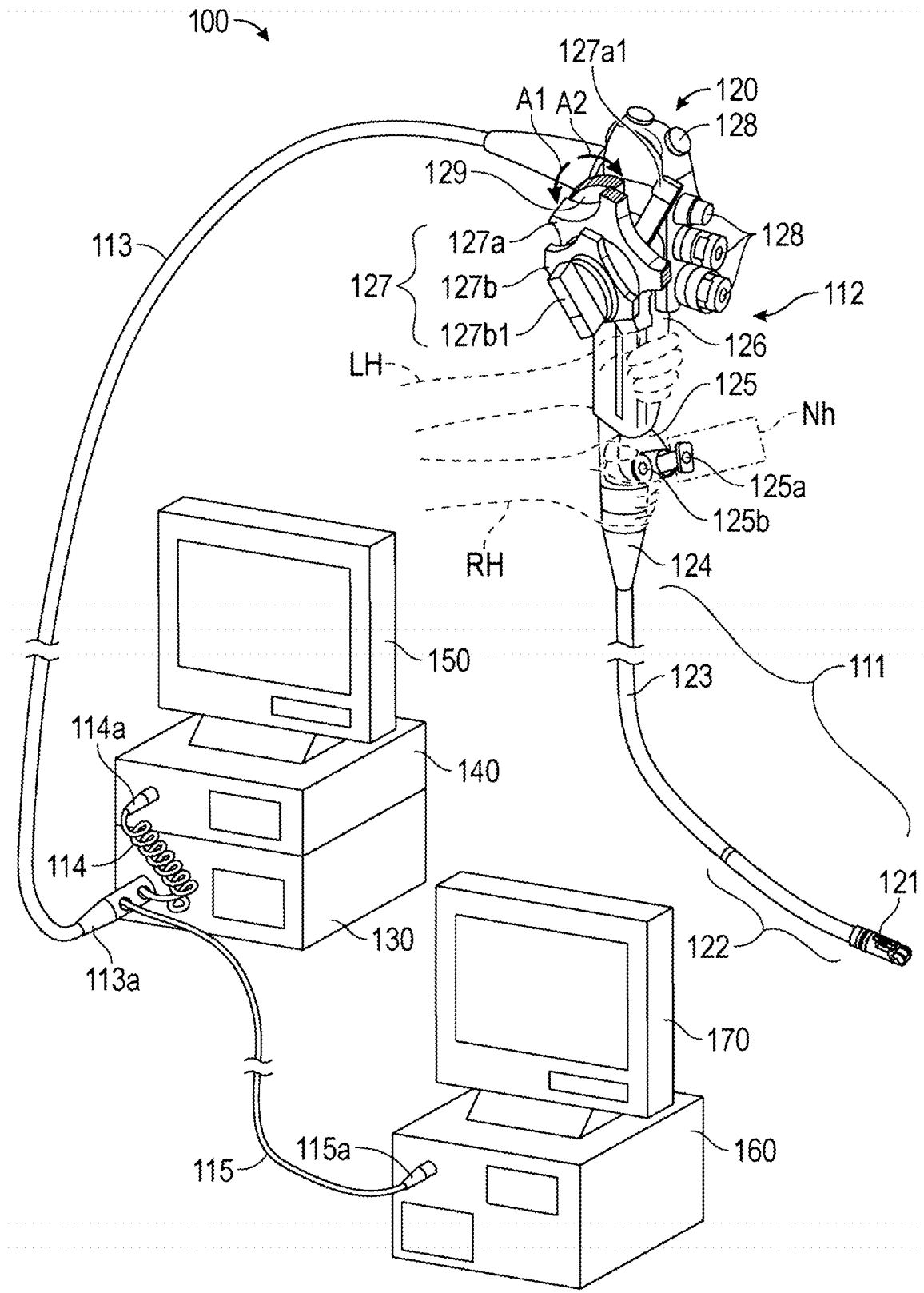
FIG. 10 is a schematic diagram illustrating an example of an echoendoscopy system for use in an endoscopic ultrasound (EUS) procedure.

FIG. 10 is a schematic diagram illustrating an example of an echoendoscopy system 100 for use in endoscopic ultrasound (EUS) procedures for diagnostic or treatment purposes, such as EUS-guided tissue acquisition. The echoendoscopy system 100 comprises an ultrasound endoscope, also referred to as an echoendoscope 120, a light source apparatus 130, a video processor 140, a first monitor 150 for displaying an optical image, an ultrasound observation apparatus 160, and a second monitor 170 for displaying an ultrasound image.

The echoendoscope 120 includes an insertion portion 111, an operation portion 112 from which the insertion portion 111 extends, and a universal cord 113 that from the operation portion 112. The insertion portion 111 extends in a longitudinal direction and configured to be inserted into a living body. The universal cord 113 can be connected to the light source apparatus 130 via a scope connector 113A provided at a proximal end portion. A coiled scope cable 114 and an ultrasound signal cable 115 extend from the scope connector 113A. An electric connector portion 114A is provided at one end of the scope cable 114. The electric connector portion 114A can be connected to the video processor 140. An ultrasound connector portion 115A is provided at one end of the ultrasound signal cable 115. The ultrasound connector portion 115A can be connected to the ultrasound observation apparatus 160.

The insertion portion 111 of the echoendoscope 120 can be configured to consecutively connect a distal end portion 121, a bending portion 122, and a flexible tube portion 123 in that order from the distal end. Channel opening portions, an optical observation window, an optical illuminating window and an ultrasound transducer, or the like are arranged on one side of the distal end portion 121, as to be described further with reference to FIGS. 11A-11B.

The operation portion 112 may include a bend preventing portion 124 from which the insertion portion 111 extends, a channel opening setting portion 125, an operation portion body 126 making up a grip portion, a bending operation portion 127 including two bending operation knobs 127A and 127B provided so as to superimpose on one another on one upper side of this operation portion body 126, a plurality of switches 128 that instruct the execution of various endoscope functions and a raising lever 129 for operating a raising stand. Examples of the switches 128 include an air/water feeding button, a suction button and a freeze button.

The channel opening setting portion 125 is provided on one side in the lower part of the operation portion body 126 and provided with one or more ports each configured to receive respective treatment instruments. By way of example and not limitation, two forceps ports 125A and 125B are disposed at the channel opening setting portion 125. Such forceps ports can communicate with respective two channel opening portions provided at the distal end portion 121 of the insertion portion 111 via two respective treatment instrument channels (not shown) inside the insertion portion 111. In an example, the forceps port 125A can receive a tissue acquisition tool, such as a fine needle for use in EUS-guided tissue acquisition, such as EUS-guided fine-needle aspiration (FNA) or fine-needle biopsy (FNB). In an example, the forceps port 125B can receive a cannula for use in endoscopic retrograde cholangiopancreatography (ERCP). A puncture needle handle portion Nh shown by a single-dot dashed line is fitted into the forceps port 125A.

The two forceps ports 125A and 125B can be arranged at the channel opening setting portion 125 such that when the operator brings the right hand RH close to the channel opening setting portion 125, the forceps port closer to the right hand RH becomes the forceps port 125B and the forceps port farther from the right hand RH becomes the forceps port 125A. More specifically, as shown by a dotted line in FIG. 10, the operator manipulates the treatment instrument inserted into each forceps port by the right hand RH while holding the operation portion body 126 by the left hand LH. The manipulation using the treatment instrument such as ERCP cannula has a higher degree of difficulty than manipulation using a treatment instrument of an EUS-FNA puncture apparatus. Thus, the forceps port 125B for a treatment instrument such as cannula requiring fine manipulation when the operator holds the operation portion body 126 by the left hand LH is arranged at the channel opening setting portion 125 so as to be located on the right side compared to the forceps port 125A when seen from the operator.

The bending knob 127A is a vertical direction bending knob and the bending knob 127B is a horizontal direction bending knob. A bending fixing lever 127A1 for fixing the vertical direction bending state is provided on the proximal end side of the bending knob 127A and a bending fixing lever 127B1 for fixing the horizontal direction bending state is provided on the distal end side of the bending knob 127B.

An image pickup section for acquiring an optical image inside a subject, and an illumination section and an ultrasound transducer section (see FIGS. 11A and 111B) for acquiring an ultrasound tomographic image inside the subject are provided at the distal end portion 121 of the echoendoscope 120. This allows the operator to insert the echoendoscope 120 into the subject and causes the monitors 150 and 170 to display an optical image and an ultrasound tomographic image inside the subject at a desired position in the subject respectively.

Figure 11A:
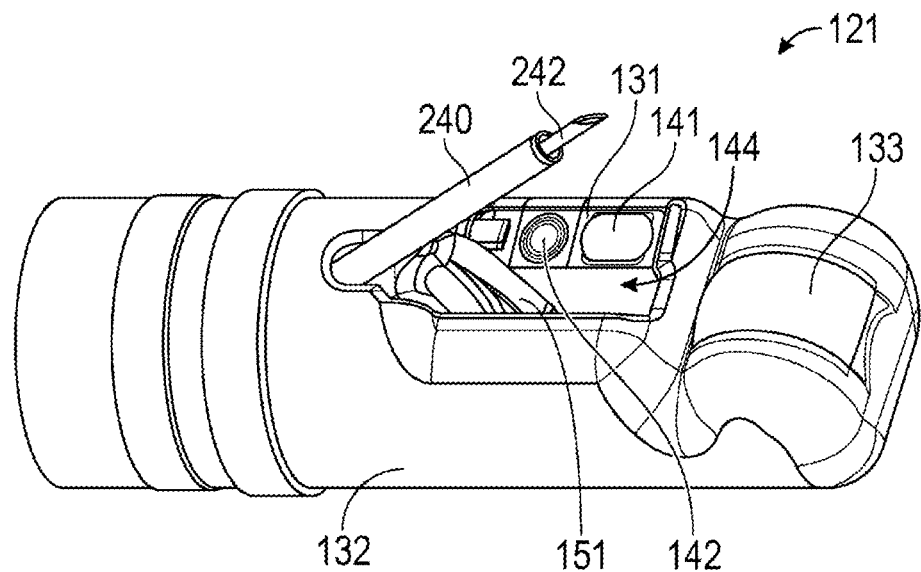
FIGS. 11A-11B illustrate, by way of example, perspective views of a distal end portion of an echoendoscope that includes an EUS probe and a treatment instrument such as a tissue acquisition device.
Figure 11B:
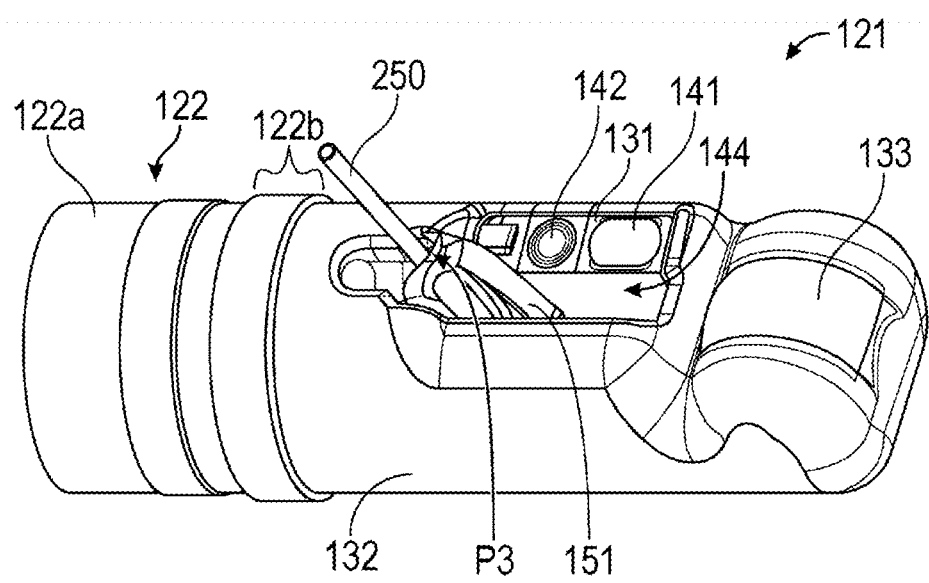

FIGS. 11A-11B illustrate perspective views of the distal end portion 121 of the insertion portion 111 of the echoendoscope 120. The distal end portion 121 may include a metallic distal end rigid member 131 and a cylindrical synthetic resin cover member 132 in which the distal end rigid member 131 is inserted, such that the cover member 132 can partially cover the distal end rigid member 131. An ultrasound transducer section 133 is accommodated within the distal end portion 121. The ultrasound transducer section 133 may include an ultrasound transducer configured to emit ultrasound waves sideward at a predetermined angle with respect to an insertion axis of the insertion portion 111. The cylindrical synthetic resin cover member 132 provides insulation of the distal end portion 121, and allows the ultrasound transducer section 133 to be reliably fixed there within.

When the cover member 132 is attached to the distal end rigid member 131, part of the opening portion of the cylindrical cover member 132 is covered with part of the distal end rigid member 131 on which an illuminating window 141 and an optical observation window 142 are arranged. Optical light emitted from a light source, such as located at the distal end portion 121 of the echoendoscope 120 and coupled to the light source apparatus 130, can pass through the illuminating window 141 and incident on the anatomical target and surrounding environment. The optical observation window 142 allow an imaging device (e.g., a camera lens, not shown) at the distal end portion 121 of the echoendoscope 120 to view target tissue. Other part of the opening portion not covered with part of the distal end rigid member 131 forms an opening portion 144 from which a raising stand 151 protrudes when the raising stand 151 is raised.

One or more treatment instruments can be activated to protrude from the opening portion 144. The treatment instrument(s) can be diagnostic or therapeutic in nature. FIG. 11A illustrates a treatment instrument 240 protruding from the opening portion 144 when the raising stand 151 is in a maximum raised position. By way of example and not limitation, the treatment instrument 240 is a puncture device from which a needle 242 protrudes. The needle 242 may be used to sample tissues from an anatomical target such as an pancreaticobiliary target in a EUS-FNA or EUS-FNB procedure. Additionally or alternatively, the treatment instrument 240 may include other types of tissue acquisition devices, such as a brush, a snare, forceps, a suction device, among others. In various examples, the treatment instrument 240 can be an object retrieval device for retrieving biological matters (e.g., cancerous tissue, gallstones, bill duct stones), or a resection device for surgically removing tissue. In some examples, the treatment instrument 240 can be a therapeutic device configured to direct a therapeutic modality to the anatomical target. Examples of such EUS-guided therapeutic devices may include an ablation device (e.g., radio-frequency ablation, laser ablation, or injection of chemotherapy ablation agent), a drainage device such as a needle to tube to drain pancreatic cysts or pseudocysts, or a stricture management device to open or dilate a narrowed or obstructed portion of a duct in the pancreaticobiliary system, among others. The treatment instrument 240 can be inserted into one of the forceps ports on the operation portion 112 of the echoendoscope 120, such as the forceps port 125A, pass through a channel within the echoendoscope 120, and controllably protrude from the opening portion 144 of the distal end portion 121.

FIG. 11B illustrates a treatment instrument 250 protruding from the opening portion 144 when the raising stand 151 is in a maximum raised position. By way of example and not limitation, the treatment instrument 250 is a cannula or the like that can be endoscopically inserted through the papilla during an ERCP procedure. The treatment instrument 250 can be inserted into a different forceps port than the port for inserting the treatment instrument 240, such as forceps port 125B on the operation portion 112, pass through a channel within the echoendoscope 120, and controllably protrude from the opening portion 144 of the distal end portion 121.

The different forceps ports and dedicated channels within the echoendoscope 120 allow an operator to use the echoendoscope 120 to perform different operations (e.g., ERCP cannulation and EUS-guided tissue acquisition) using one ultrasound endoscope. For example, the operator may first insert the treatment instrument 240 (e.g., aspiration or biopsy needle) from the forceps port 125A and perform EUS-FNA or EUS-FNB of tissue of a target pancreaticobiliary anatomy. When a lesioned part is confirmed from an ultrasound image (optionally along with other diagnostic information) and ERCP cannulation is indicated, the operator can then insert the treatment instrument 250 (e.g., ERCP cannula) from the forceps port 125B even without pulling out the echoendoscope 120, and perform ERCP by inserting the cannula or the like through the papilla.

In some examples, the echoendoscope 120 can be robotically controlled, such as by a robot arm attached thereto. The robot arm can automatically, or semi-automatically (e.g., with certain degree of user manual control or commands), via an actuator, position and navigate instrument such as the echoendoscope 120 in an anatomical target, or position a device at a desired location with desired posture to facilitate an operation on the anatomical target (e.g., to collect tissue samples from the anatomical target using a brush, a snare, forceps, or a suction device). In accordance with various examples discussed in this document, a controller can use artificial intelligence (AI) to determine cannulation and navigation parameters and/or tool operational parameters (e.g., position, angle, posture, force, and navigation path), and generate a control signal to the actuator of the robot arm to facilitate operation of such instrument or tools in accordance with the determined navigation and operational parameters in a robot-assisted procedure.

Figure 12A:
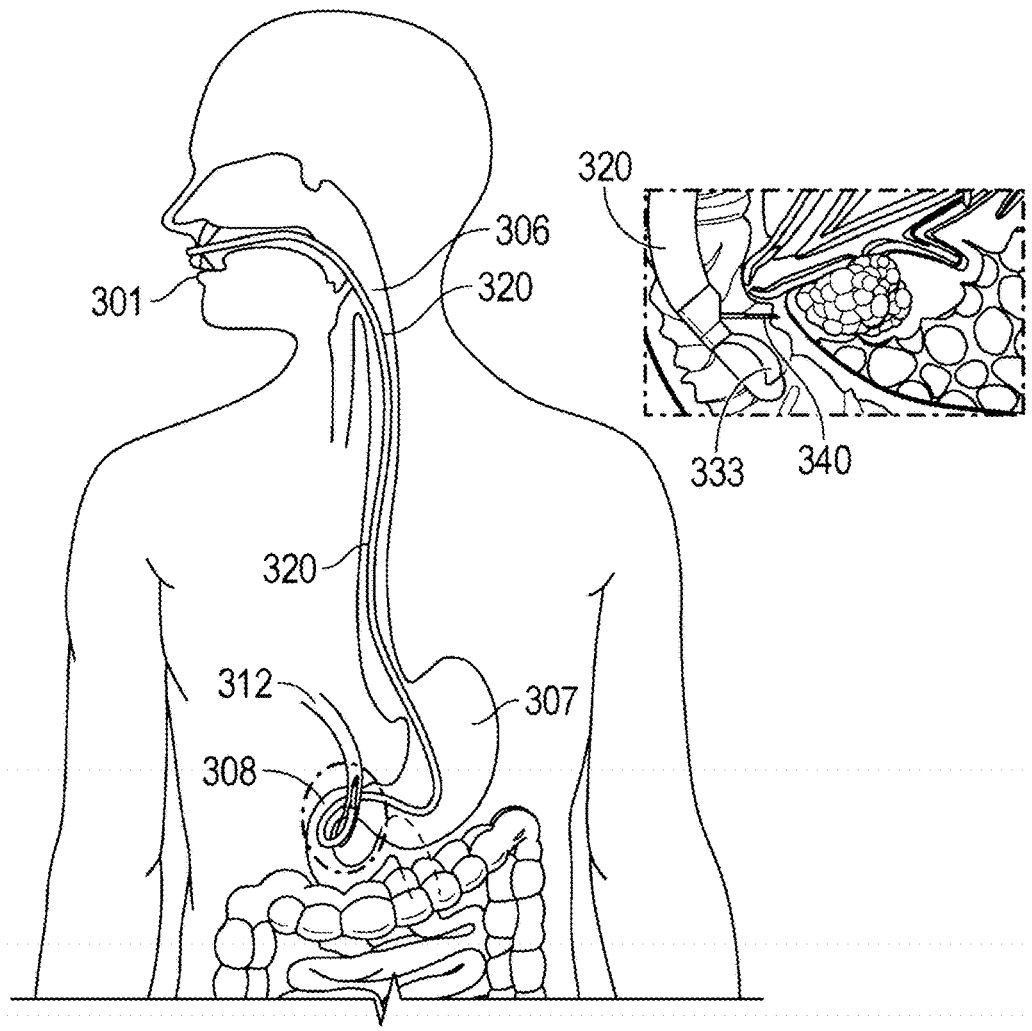
FIGS. 12A-12B illustrate an example of EUS procedure for high-resolution ultrasound imaging and treatment modalities such as fine-needle aspiration or biopsy.
Figure 12B:
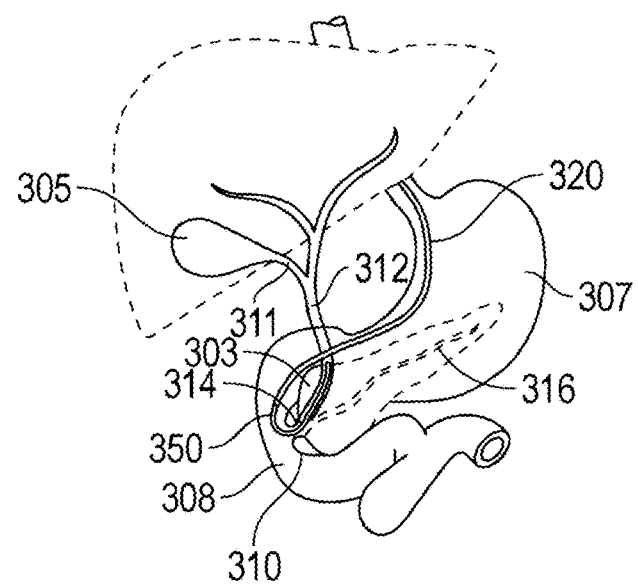

FIGS. 12A-12B illustrate an example of endoscopic ultrasound (EUS) procedure, also known as echoendoscopy, for high-resolution ultrasound imaging and diagnostic or therapeutic modalities such as fine-needle aspiration (FNA) or fine-needle biopsy (FNB). As illustrated in FIG. 12A, the EUS procedure involves insertion of an echoendoscope 320 perorally into the upper GI tract. The echoendoscope 320, which is an embodiment of the echoendoscope 120 as illustrated in FIG. 10, can extend into mouth 301, through esophagus 306, through stomach 307 to reach the duodenum 308. Similar to the distal end portion 121 of the echoendoscope 120 as shown in FIGS. 11A-11B, at the distal end portion of the echoendoscope 320 is an ultrasound transducer 333 configured to produce ultrasound scans of the pancreas and surrounding tissue or organs of the pancreaticobiliary system. The ultrasound scans can be converted to detailed EUS images. Based on the analysis of the EUS images, a diagnostic or therapeutic modality may be directed to the anatomical target, such as tissue aspiration or biopsy via a tissue acquisition device 340 extended from the distal end portion of the echoendoscope 320. An example of the tissue acquisition device 340 is the needle 242 that protrudes from the treatment instrument 240 as illustrated in FIG. 11A. The needle may pierce through the duodenal wall collect aspiration or biopsy sample from the anatomical target, such as pancreatic cystic tumors. In addition or alternative to the fine needles, one or more other tissue acquisition devices may be passed through the lumen of the echoendoscope 320 and extended from the distal end portion therefor, such as a brush, a snare, forceps, or a suction device.

FIG. 12B is a schematic view of an EUS procedure involving insertion of an echoendoscope 320 perorally into the duodenum 308 and performing ERCP or biliary intervention procedures through the duodenal papilla 314 into one of the ducts in the pancreaticobiliary system using a biliary intervention device 350 extended from the distal end portion of the echoendoscope 320. The biliary intervention device 350 can be an embodiment of the treatment instrument 250 as illustrated in FIG. 11B. As illustrated in FIG. 12B, the duodenum 308 is connected to the common bile duct 312 via duodenal papilla 314. Common bile duct 312 can branch off into pancreatic duct 316 and gallbladder duct 311. Duodenal papilla 314 may include sphincter of Oddi 310 that controls flow of bile and pancreatic juice into the intestine (duodenum). Pancreatic duct 316 can lead to pancreas 303. Pancreatic duct 316 carries pancreatic juice from pancreas 303 to the common bile duct 312. Gallbladder duct 311 can lead to gallbladder 305. The treatment instrument 250 may include an ERCP cannula, a stricture management device, an ablation device, or a drainage device configured to pass through duodenal papilla 314 to enter into the common bile duct 312. In patients with biliary stricture (abnormal narrowing or blockage of a portion of the bile duct), EUS-guided stricture management generally involves placing a stricture management device to open or dilate the narrowed or obstructed portion of the duct. As illustrated in FIG. 12B, analysis of the EUS images can provide guidance for selection of property types of stricture management device such as dilating catheters, balloon dilators, or stents. In an example, biliary endoscopic sphincterotomy (EST) may be performed to cut the biliary sphincter and intraduodenal segment of the common bile duct following selective cannulation, using a high frequency current applied with a special knife, sphincterotome, inserted into the papilla. Biliary endoscopic sphincterotomy is either used solely for the treatment of diseases of the papilla of Vater, such as dysfunction of sphincter of Oddi 310, or to facilitate subsequent therapeutic biliary interventions.

Figure 13:
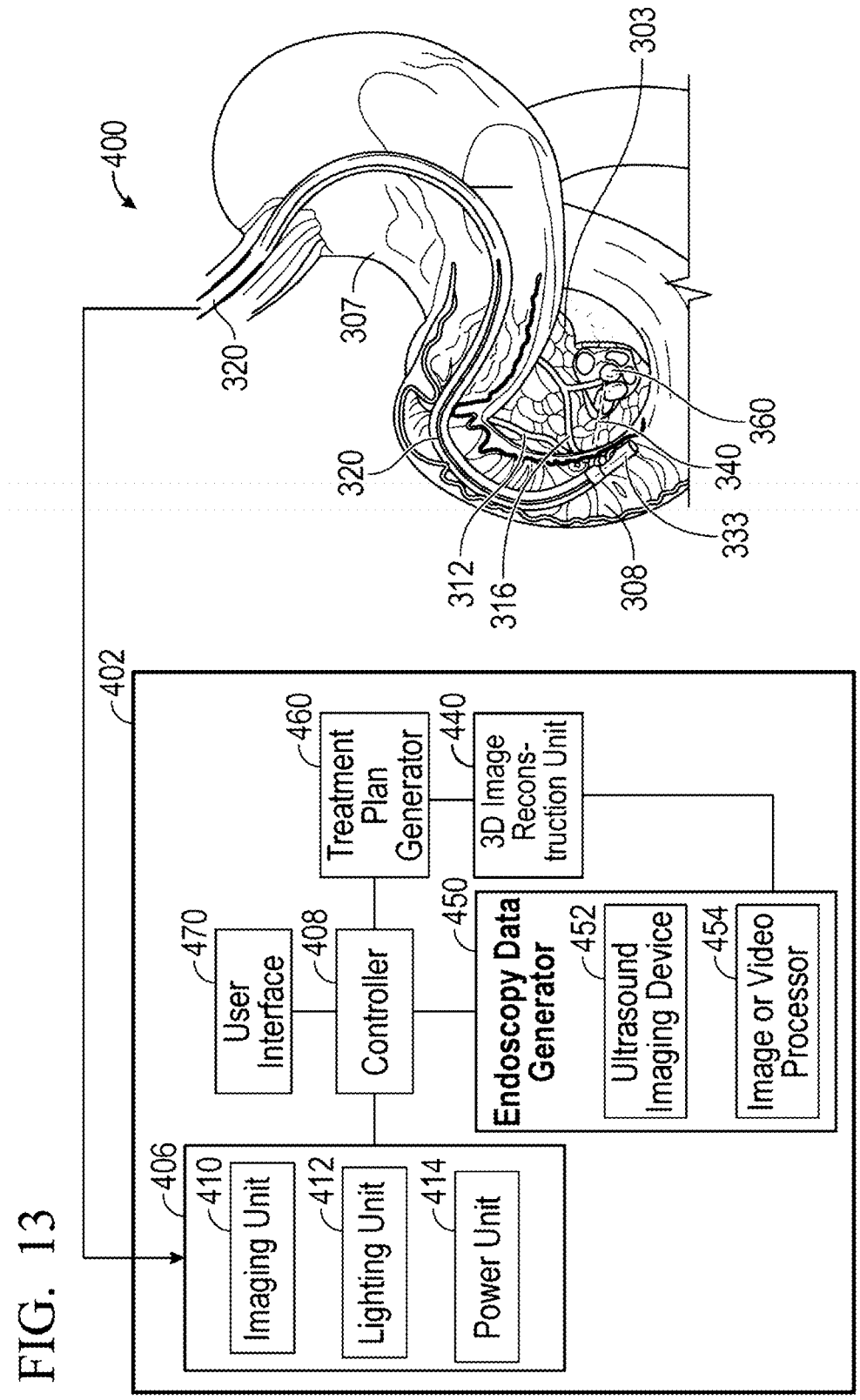
FIG. 13 illustrates an example of a portion of an EUS-guided tissue acquisition (EUS-TA) system and a portion of patient anatomy at the procedure site.

FIG. 13 is a diagram illustrating an example of a portion of an EUS-guided tissue acquisition system 400 and a portion of patient anatomy at the procedure site. The system 400 comprises an echoendoscope 320 configured to be inserted into patient anatomy such as a portion of a upper GI tract, and an imaging and control system 402 controllably interfacing with the echoendoscope 320. As described above with reference to FIG. 12A, the echoendoscope 320 incudes at its distal end portion an ultrasound transducer 333 to produce ultrasound scans of an anatomical target, and a treatment instrument such as the tissue acquisition device 340 extendable from the distal end portion of the echoendoscope 320 to sample tissue from a cyst or tumor 360 of pancreas 303.

The imaging and control system 402 may include a control module 406, which can further include or be coupled to a controller 408. The control module 406 can comprise a imaging unit 410, a lighting unit 412 and a power unit 414 for controlling an imaging device (e.g., a camera) and a light source connected to the echoendoscope 320. The control module 406 can activate an imaging device (e.g., camera lens) at the distal end portion of the echoendoscope 320 to view the anatomical target via optically enhanced materials and components, such as the observation window 142 at the at the distal end portion 121 of the echoendoscope 120 as illustrated in FIG. 11A. The control module 406 can activate a light source located at the distal end portion of the echoendoscope 320 and coupled to the lighting unit 412 (which is an embodiment of the light source apparatus 130) to shine light on anatomical target and surrounding environment.

The controller 408 may include, or be coupled to, an endoscopy data generator 450, a 3D image reconstruction unit 440, and a treatment plan generator 460. The endoscopy data generator 450 can generate images of an anatomical target, such as strictures or stenosis in biliary and pancreatic ductal system. The endoscopy data generator 450 may include an ultrasound imaging device 452, which can be an embodiment of the ultrasound observation apparatus 160 as shown in FIG. 10, configured to generate real-time EUS images of the anatomical target and its surrounding environment based on the ultrasound scans produced by the ultrasound transducer 333 at the distal end portion of echoendoscope 320. The endoscopy data generator 450 may include an image or video processor 454, such as the video processor 140 as shown in FIG. 10, which can generate real-time optical endoscopic images of the anatomical target and its surrounding environment using an imaging sensor such as a camera at the distal end portion of the echoendoscope 320. In addition to the ultrasound images and optical images, in some examples, the endoscopy data generator 450 can receive images of other modalities from external imaging devices such as X-ray or fluoroscopy images, electrical potential map or an electrical impedance map, computer tomography (CT) images, magnetic resonance imaging (MRI) images such as those obtained from Magnetic resonance cholangiopancreatography (MRCP), among others. The endoscopy data generator 450 may additionally generate or receive other procedure-related information, including sensor information (e.g., sensors associated with the endoscope or with a treatment device passing through the endoscope), device information, patient medical history etc. In some examples, the endoscopy data generator 450 can retrieve, such as from a database, stored control log data (e.g., time-series data) of past endoscopic procedures performed by a plurality of physicians on a plurality of patients. The control log data can represent preferred cannulation and endoscope navigation approaches and habits of physicians with different experience levels.

The 3D image reconstruction unit 440 may include 3D reconstruction data of an anatomical target generated from a plurality of 2D images. The 2D images can be from the same or different sources, have the same or different modalities. Examples of the 2D images may include images generated by an optical imaging device (e.g., a camera) on an endoscope, ultrasound images, or fluoroscopic images. In an example, the images used for 3D reconstruction can be of the same modality, such as EUS images converted from ultrasound scans of the anatomical target produced by the ultrasound transducer 333 on the echoendoscope 320 as the EUS probe is controllably placed at different positions or postures with respect to the anatomical target. To reconstruct the 3D image data, a plurality of EUS images corresponding to respective different EUS probe positions or postures can be registered with respect to a common landmark detected from each of the EUS images. The registered EUS images, along with the information about the corresponding EUS probe positions or postures, can be fed into a 3D reconstruction unit to produce 3D reconstruction image data. The reconstructed image data may be presented to the operator on a user interface 470 in substantially real time to guide cannulation and endoscope navigation. For example, the operator can identify in substantially real time an optimal route of cannulation and subsequent procedures (e.g., endoscopic submucosal dissection of tissue or other biological mass). Various 3D properties of the anatomical target included in the 3D image reconstruction, such as depth, length, and width can help the operator better appreciate the shape of target anatomy (e.g., duodenal papilla and ducts in the pancreaticobiliary system) and topology of the nearby region, ease the burden of performing extra procedure to presume, or mentally reconstruct, 3D structure of the observed anatomy, and reduce inter-physician variations in image interpretation. Examples of the 3D reconstruction unit are discussed below with reference to FIG. 14.

In some examples, the reconstructed 3D image data can be integrated with one or more secondary images generated by external imaging devices other than endoscope, examples of which may include a CT image, an MRI image, or an image obtained from specialized MRI such as MRCP. Such images are referred to as secondary images to distinguish from images from primary sources, such as EUS images or optical endoscopic images obtained from imaging modalities associated with the echoendoscope 320. In some examples, the two or more images used for 3D reconstruction may include at least one existing 3D image obtained by using, for example, an external imaging device of equipment, such as a CT scanner, an MRI scanner, X-ray equipment, or a nuclear-medicine camera, among others. For example, the 3D image reconstruction unit 440 can reconstruct a 3D image using at least one 2D image and at least one existing 3D image, or in another example, using at least two existing 3D images.

The treatment plan generator 460 can generate an endoscope navigation plan using the reconstructed 3D image data. In some examples, a real-time perioperative endoscopic image (e.g., an EUS image or an optical endoscopic image) may be superimposed onto the reconstructed 3D image data to create a 3D composite image model. The real-time perioperative endoscopic image may be generated using an imaging device when the EUS probe is positioned at a real-time position or posture during an endoscopic procedure. The treatment plan generator 460 can generate a virtual EUS image using the 3D reconstruction of the anatomical target and the real-time position or posture of the EUS scope, and superimpose the real-time perioperative endoscopic image onto the virtual EUS image to create the 3D composite image model. The 3D composite image model may be graphically displayed to the user on the user interface. Additionally or alternatively, the treatment plan generator 460 can generate the endoscope navigation plan using the 3D composite image model. The endoscope navigation plan may include one or more cannulation or navigation parameters with respective values. By way of example and not limitation, the cannulation or navigation parameters may include a position of the endoscope distal portion relative to an anatomical target of interest, such as a distance from the endoscope distal portion to duodenal papilla, a heading direction of the endoscope distal portion relative to the anatomical target, an angle of a cannula or a surgical element used in cannulation, a protrusion amount of a cannula or a surgical element, a speed or force applied to the endoscope distal portion or a surgical element, a rotational direction or a cutting area of a surgical element, among others, or a projected navigation path toward the anatomical target of interest, among others. According to various examples, the endoscope navigation plan (including, for example, cannulation or navigation parameters values) can be generated or updated using a trained machine-learning (ML) model as further described below. The endoscope navigation plan (represented in the form of texts or graphs), optionally along with information used for generating such plan (e.g., real-time EUS image, real-time endoscopic image, the 3D reconstructed image data) can be displayed to the operator as a guidance during the procedure. In some examples, the endoscope navigation plan may additionally or alternatively be provided to a robotic to facilitate a robot-assisted endoscopic procedure. Examples of 3D reconstruction from 2D EUS images and using the reconstructed 3D image data to guide cannulation or navigation in an endoscopic procedure are discussed below with reference to FIG. 14.

Figure 14:
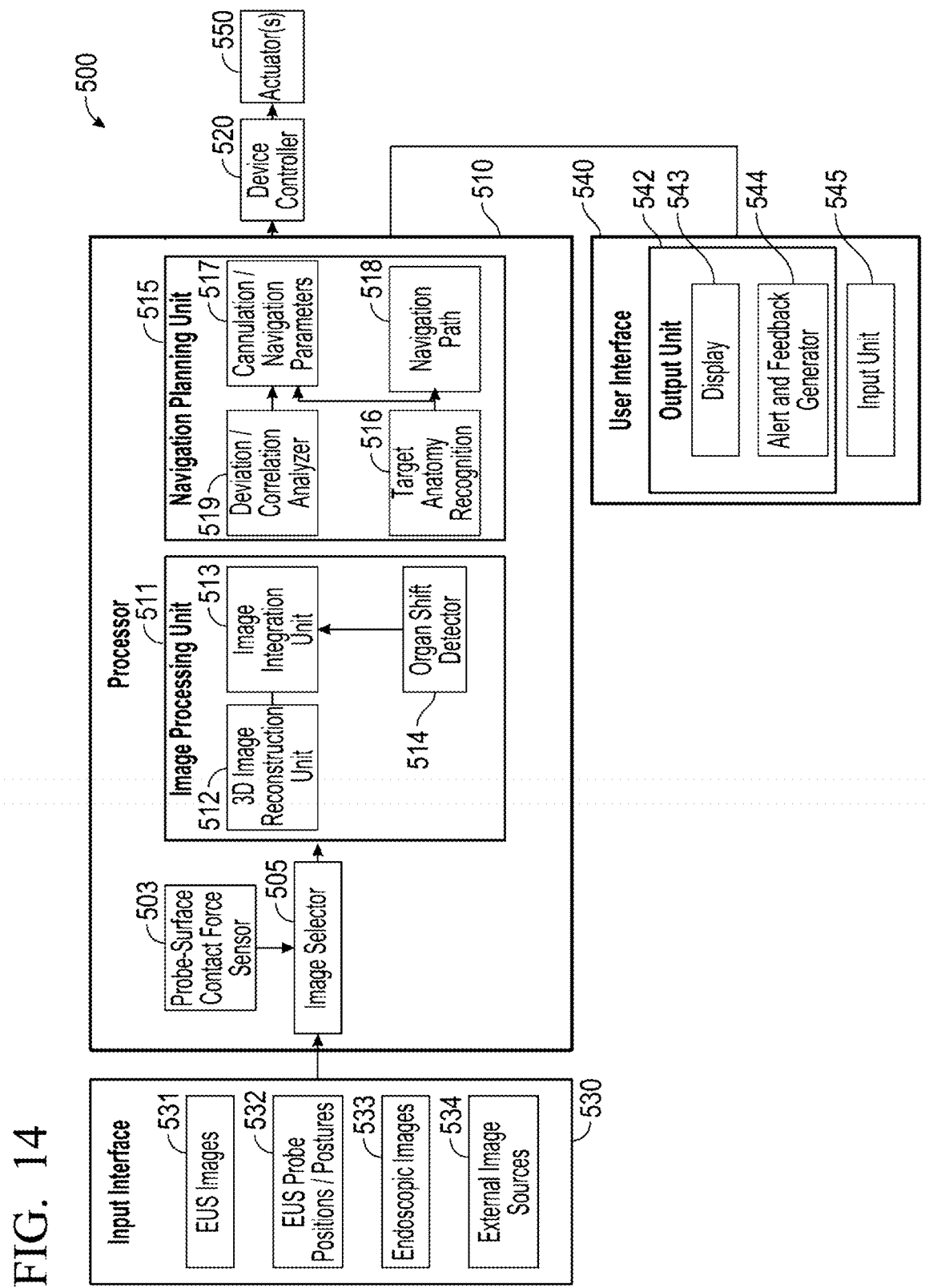
FIG. 14 illustrates an example of a 3D endoscopic navigation system 500 for improved visualization, critical anatomical structures identification, and navigation planning in an endoscopic procedure.

FIG. 14 illustrates an example of a 3D endoscopic navigation system 500 for improved visualization, critical anatomical structures identification, and navigation planning in an endoscopic procedure. The system 500 can create a 3D reconstruction of an anatomical target using images such as EUS images and optionally images of other modalities. The system 500 can be a part of the imaging and control system 402 in FIG. 13.

The system 500 may include a processor 510, a device controller 520, an input interface 530, and a user interface 540. The processor 510 may include circuit sets comprising one or more other circuits or sub-circuits, including an image processing unit 511 and a navigation planning unit 515. These circuits may, individually or in combination, perform the functions, methods, or techniques described herein. In an example, the processor 510 and the circuit sets therein may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a general-purpose processor that may receive and execute a set of instructions of performing the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The image processing unit 511 may receive image data from various sources from the input interface 530 including, for example, EUS images 531, endoscopic images 533, other external image sources 534, along other information such as collected by physiological sensors during an endoscopic procedure including, for example, EUS probe positions or postures 532 with respect to the anatomical target. In an example, the input interface 530 can be included in the user interface 540, and the image data can be received from the input interface 530. The input interface 530 may be a direct data link between the system 500 and one or more medical devices that generate various images. In an example, the input interface 530 may be a classical user interface that facilitates interaction between a user and the system 500, such that the user may manually provide input data to the system 500. Additionally or alternatively, the input interface 530 may provide the system 500 with access to an electronic patient record from which one or more data features may be extracted. In any of these cases, the input interface 530 can collect one or more of sources of patient information before and during the endoscopic procedure.

Figure 15A:
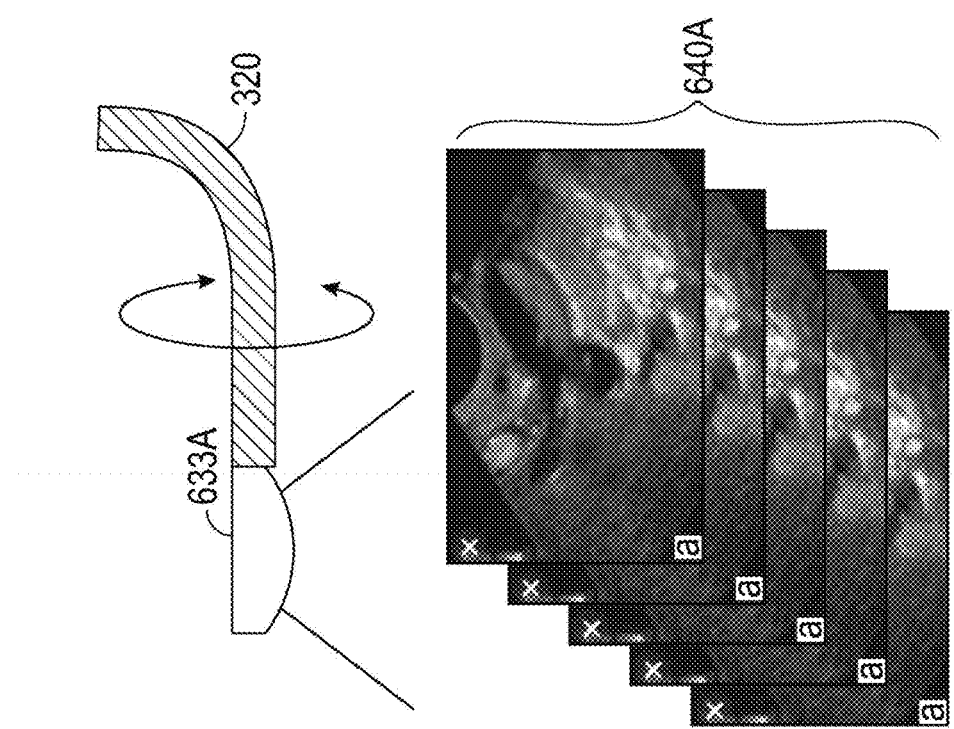
FIGS. 15A-15B illustrate examples of EUS probes that can produce radial scans or linear array scans of an anatomical target.
Figure 15A:
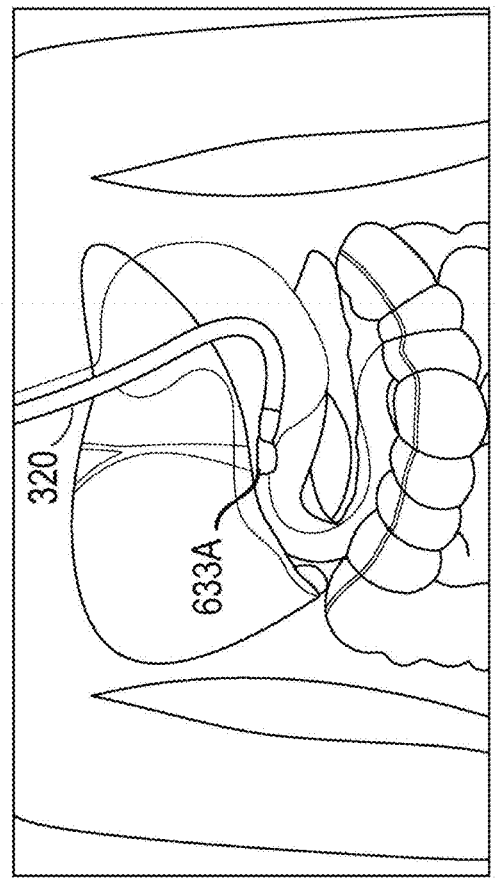
Figure 15B:
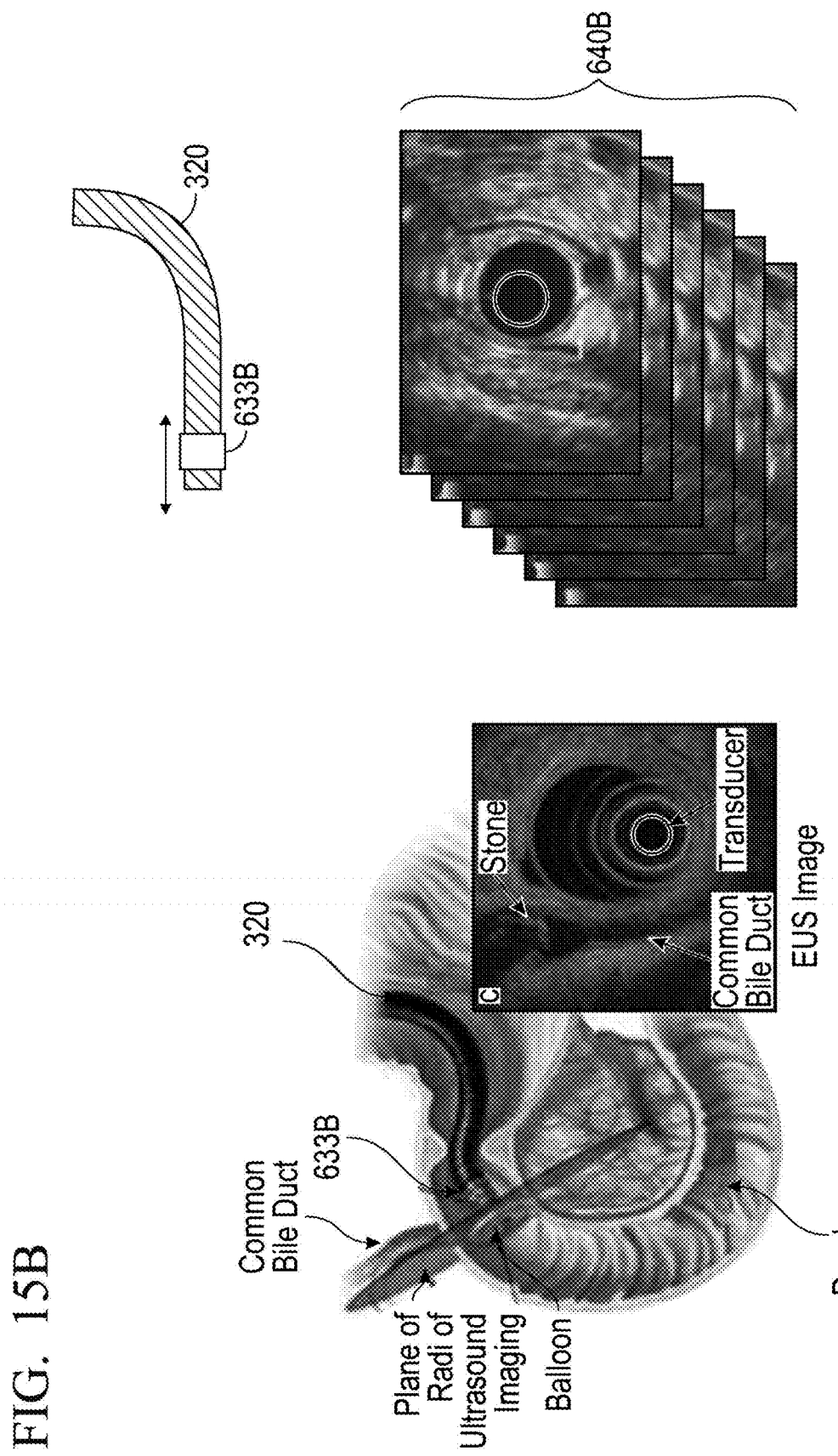

The EUS images 531 may include perioperative EUS images converted from ultrasound scans of the anatomical target during an EUS-guided procedure using, for example, the ultrasound transducer 333 on the echoendoscope 320 as described above with reference to FIGS. 12A-12B and 13. The ultrasound scans are made as the EUS probe is controllably placed at different positions or postures with respect to the anatomical target, such as through controlled EUS probe movement (manually operated by an operator or automatically controlled via a robot system) by vibrating the EUS probe slightly or shifting its position. Accordingly, the EUS images 531 each correspond to respective EUS probe positions or postures 532. Depending on the type of EUS probe, various types of ultrasound scans can be generated. By way of example and not limitation, FIG. 15A illustrates an example of a EUS probe 633A housing a rotating ultrasound transducer that can be manually or robotically activated to rotate around the longitudinal axis of the echoendoscope 320. The rotating ultrasound transducer can produce a plurality of radial scans 640A in a plane perpendicular to an longitudinal axis of the echoendoscope 320 from different angular positions centered on the longitudinal axis. FIG. 15B illustrates an example of a EUS probe 633B housing a linear ultrasound transducer that can be manually or robotically activated to move to-and-fro along an longitudinal axis of the echoendoscope 320. The linear ultrasound transducer can produce a plurality of linear array scans 640B in a plane parallel to the longitudinal axis of the echoendoscope 320 from different longitudinal positions along the longitudinal axis. In some examples, the echoendoscope 320 can have a bifurcated structure comprising two or more EUS probes, such as first EUS probe housing a first ultrasound transducer to produce a first plurality of ultrasound scans of the anatomical target at first positions or postures, and a second EUS probe, separate from the first EUS probe, that houses a second ultrasound transducer to produce a second plurality of ultrasound scans of the anatomical target at second positions or postures different than the first positions or postures. As to be discussed further below, the EUS images 531 and the corresponding EUS probe positions or postures 532 may be used, optionally along with image or sensor information, to create 3D reconstruction of the anatomical target.

The EUS probe positions or postures 532 may be detected using a position sensor. In an example, the position sensor may include an external electromagnetic (EM) wave detector configured to detect transabdominally the EM waves emitted from an EM emitter associated with the EUS probe of the echoendoscope 320. The EM emitter can be disposed at a distal end portion of the echoendoscope 320. The external EM wave detector can determine the EUS probe position or posture based on the detected EM wave emission. In another example, the position sensor may include an external optical sensor configured to detect an optical signal emitted from an optical signal source associated with the EUS probe of the echoendoscope 320. The optical signal source can be disposed at a distal end portion of the echoendoscope 320. The external optical sensor can determine the EUS probe position or posture based on the detected optical signal. In another example, the position sensor may include an internal shape sensor disposed at a shaft portion of the echoendoscope 320 in proximity to the EUS probe and configured to sense a shape of the shaft portion of the echoendoscope 320. The internal shape sensor may include a fiber optic based sensor, such as a Fiber Bragg Grating (FBG) sensor. The FBG sensor a microstructure typically photo inscribed in a segment of the core of a single mode fiber that reflects particular wavelengths of light and transmits all others. Positions and postures of the EUS probe can be determined based on the shape of the shaft portion or a change thereof. In yet another example, the position sensor may include an external angle sensor associated with an actuator 550 of a robotic. The external angle sensor can sense a rotation angle of the actuator 550 (e.g., a motor). Posture of the EUS probe at the tip of the of the echoendoscope 320 can be estimated from the rotation angle of the actuator 550 in substantially real time.

The endoscopic images 533 may include perioperative endoscope images or videos of the anatomical target and its surrounding environment (e.g., biliary duct strictures) captured by an imaging sensor associated with the echoendoscope as described above with reference to FIGS. 11A-11B and 13, can also be received by the input interface 530. The external image sources 534 may include preoperative or perioperative images of the anatomical target acquired by external imaging devices other than the echoendoscope, which may include, for example, X-ray or fluoroscopy images, electrical potential map or an electrical impedance map, CT images, or MRI images such as images obtained during MRCP, among others.

In addition to images of various modalities or from various sources, the input interface 530 may receive other information including, for example, endo-therapeutic device information including specification data, including size, dimension, shape, and structures of the endoscope used in the procedure or other steerable instruments such as a cannular, a catheter, or a guidewire; size, dimension, shape, and structures of tissue acquisition tools (e.g., knives, forceps, brushes, snares, suction devices). Such device specification information may be used to determine cannulation or navigation parameter values such as the angle and/or the force applied to the device, or for selecting suitable tools and determining tool operational parameters to effectively and efficiently sample biopsy tissue. In an example, the input interface 530 may receive information from sensors coupled to the echoendoscope or a treatment device passing through the endoscope, or otherwise associated with the patient. In an example, a proximity sensor positioned at a distal end portion of the echoendoscope can sense information including position, direction, or proximity of a distal portion of the echoendoscope relative to an anatomical target. In some examples, the input interface 530 may receive physician/patient information, such as operating physician's habits or preference of using a steerable elongate instrument (e.g., preferred approach for cannulation and endoscope navigation) or past procedures of the similar type to the present procedure performed by the physician and the corresponding procedure outcome (e.g., success/failure assessment, procedure time, prognosis and complications), or patient information including patient demographics (e.g., age, gender, race), medical history such as prior endoscopic procedures and images or data associated therewith, etc.

The processor 510 may include an image selector 505 that can select a subset of the received images (e.g., one of more of EUS images 531, endoscopic images 533, or the external images sources 534) for use in creating a 3D reconstruction of the anatomical target. In an example, the image selection can be based on image qualities, such as signal to noise ratio, sharpness, contrast, level of distortion, exposure accuracy, among other attributes. In an example, the image selector 505 can be coupled to a force sensor 503 associated with the EUS probe. The force sensor 503 can sense the contact force between the EUS probe and an anatomical surface where the ultrasound scans are taken. A consistent probe-surface contact force is correlated to consistent and stable EUS image quality. In an example, the image selector 505 can select a subset of the receive EUS images 531 converted from the ultrasound scans taken while the sensed contact force is maintained at a substantially constant value (e.g., within a 5% margin) or within a specific value range. In another example, the image selector 505 can select a subset of the received EUS images 531 corresponding to the sensed contact force being equal to or exceeding a force threshold. The force threshold can be set by the user.

In some example, for a plurality of EUS images obtained from radial scans via a EUS probe with rotating ultrasound transducer (such as the EUS probe 633A as shown in FIG. 15A), an anatomical target can be recognized (such as by the image processing unit 511) from each of such plurality of EUS images. The image selector 505 can select a subset of the EUS images with the recognized anatomical target being substantially at a center of the respective images (e.g., within a user defined margin). In some examples, the distal end of the echoendoscope 320 may be manually or robotically adjusted such as by moving it forward or backward to reposition the EUS probe relative to the anatomical target. Radial scans can then be taken and converted to EUS images, and the image selector 505 can select a subset of the EUS images with the anatomical target being substantially centered. This process can be repeated automatically while adjusting the mutual positional relationship between the EUS probe and the contact surface so that a plurality of images can be easily generated and later combined by the image processing unit 511 to create the 3D reconstruction of the anatomical target. The mutual positional relationship between the EUS probe and the contact surface may be controlled based on the probe-surface contact force sensed by the force sensor 503. In some examples, the displacement the EUS probe can be determined using a machine-learning method.

The image processing unit 511 may include a 3D image reconstruction unit 512 and an image integration unit 513. The 3D image reconstruction unit 512 can reconstruct 3D image data of the anatomical target using the selected subset of the images provided by the image selector 505. The 3D image reconstruction unit 512 may include a landmark detector to recognize from each of the received images a landmark that may be used for image alignment or registration. The landmark can have a known geometry, location, or the spatial characteristics. Examples of the landmark may include intrinsic tissue of interest (e.g., duodenal papilla), other tissue (e.g., a bile duct, a pancreatic duct, a blood vessel, duodenum wall, or bony structures on a fluoroscopy image or other secondary image modalities), or an artificial extrinsic object placed in the surgical area and recognizable from the received images. The landmark detector can detect and localize the landmark using an image processing algorithm (e.g., edge detection), and extract geometric features or other spatial characteristics of the landmark. In some example, the landmark detector may detect multiple landmarks from each of the received images. Multiple landmarks may increase the probability of identifying matching landmarks between images, and improve image alignment and registration accuracy.

The 3D image reconstruction unit 512 may include an image registration module to align the received target images with respect to respective landmarks detected from the received images. The image registration may include identifying one or more matching landmarks from each or two or images, performing transformation on one or more images into a common coordinate system, and aligning one image (source) to another image (target) with respect to the matching landmarks. The image transformation may include linear transformations (e.g., rotation, scaling, translation, and other affine transforms), and nonrigid transformations (e.g., radial basis functions, physical continuum models, and large deformation models).

The 3D image reconstruction unit 512 can reconstruct a 3D image using two or more of the registered images, and a reconstruction model. In an example, the 3D reconstruction can be based on the selected EUS images and information about their corresponding EUS probe positions or postures. In some examples, the images from different sources and/or of different modalities, such as endoscopic images, X-ray or fluoroscopy images, or electrical potential map or impedance map, real-time endoscopic images, or existing 3D image obtained by using, for example, an external imaging device of equipment, such as a CT scanner, an MRI scanner, X-ray equipment, or a nuclear-medicine camera, among others. For example, the 3D image reconstruction unit 512 can reconstruct a 3D image using at least one 2D image and at least one existing 3D image, or in another example, using at least two existing 3D images. In an example, the reconstruction model is an auto-calibration model to recover the camera motion and parameters. In another example, the reconstruction model is a stratification model to progressively upgrade the projected 2D structure to a Euclidean reconstruction with prior constraints. Other examples of the reconstruction model may include discrete linear transform based on stereo corresponding points, surface rendering technique, among others.

The 3D image can be generated, and updated during the endoscopic procedure. In some examples, the 3D image reconstruction unit 512 may generate a 3D image before the endoscope procedure. In some examples, the 3D image may be reconstructed using X-ray images or stored endoscopic images from past procedures performed on patients having similar anatomy or medical condition to the target patient. In some examples, the reconstruction of 3D image includes creating cross-section views of the target anatomy along different directions. The cross-section view can be displayed along a user specified direction. Once the 3D image is created, the user can use the map for an existing area to explore another area within the image.

The image integration unit 513 can integrate images from various sources into a composite image for use in cannulation or navigation planning. In an example, the image integration unit 513 can integrate the reconstructed 3D image with a real-time perioperative endoscopic image (e.g., a real-time EUS image or a real-time optical endoscopic image) of the anatomical target being taken at a specific ESU probe position or posture. In an example, a real-time perioperative endoscopic image (e.g., a real-time EUS image or a real-time optical endoscopic image) can be superimposed onto the reconstructed 3D image data to create a 3D composite image model. An alignment between the position or posture of the ESU probe corresponding to the real-time perioperative endoscopic image and the positions or postures of the EUS probe used for creating the reconstructed 3D image data can be made prior to superimposing the real-time perioperative endoscopic image onto the reconstructed 3D image data. In some examples, optimal alignment between the images may involve calculating an optimal displacement between image features (e.g., the positions or postures of the EUS probe on respective images) using a machine-learning (ML) model such as a trained deep learning model. A graphical representation of the 3D composite image model may be displayed on the display 543 of the user interface 540. In some examples, the graphical representation may further include a visual identifier of the anatomical target, such as a visual highlight of the anatomical target on the superimposed image.

During the endoscopy, an organ or a part thereof may shift from its previous position or deform from its previous shape. Images (e.g., EUS images 531) taken before and after such organ shift or deformation may present different organ geometries which, without proper identification and correction, may introduce error in image alignment and reduce the quality of the reconstructed 3D image. The image processing unit 511 may include an organ shift detector 514 that can detect organ shift using a plurality of EUS images converted from respective ultrasound scans of an anatomical target (e.g., an organ or a part thereof) taken at different times when the EUS probe is a fixed position and posture. In an example, the organ shift detector 514 can detect a common anatomical landmark from respective EUS images, such as papilla, bile duct, pancreatic duct, or one or more blood vessels. The EUS images can be aligned with respect to the detected common landmark. Since the EUS images are generated at fixed EUS probe position and posture and the landmark location relative to the EUS probe is presumably unchanged over time, a spatial shift or deformation of the anatomical structure can be detected based on a change (across the EUS images taken at different time) in the position of the anatomical structure relative to the landmark on the EUS image. For example, the organ shift detector 514 can calculate from each of the EUS image a displacement between the anatomical structure and the landmark, and determine the presence and the amount of shift based on a comparison of the displacements respectively calculated from the EUS images. In the presence of the detected organ shift, the image integration unit 513 can correct or post-process an EUS image, such as by adjusting the location of the anatomical structure on the reconstructed 3D image to correct or compensate for the detected spatial shift. A graphical representation of a real-time perioperative endoscopic image (e.g., a real-time EUS image or a real-time optical endoscopic image) may be superimposed onto the reconstructed 3D image data with the adjusted location of the anatomical target to generate a 3D composite image model that can be displayed on the display 543 of the user interface 540.

The navigation planning unit 515 may generate an endoscope navigation plan with respect to an anatomical target of interest (e.g., duodenal papilla) using the 3D reconstruction of the anatomical target generated by the image processing unit 511. The navigation planning unit 515 may include a target anatomy recognition unit 516 to automatically recognize the anatomical target and determine its location from the reconstructed 3D image such as by using a template matching technique, where geometric features (e.g., edges) or other spatial characteristics of a portion of the reconstructed 3D image may be compared to an anatomical target template to determine a morphological similarity or a distance in a feature space. Alternatively, the anatomical target of interest may be identified manually by the user such as from the reconstructed 3D images displayed on a user interface. The navigation plan may include one or more preferred cannulation or navigation parameters 517, including, for example: a position of the endoscope distal portion relative to an anatomical target of interest, such as a distance from the endoscope distal portion to duodenal papilla, a heading direction of the endoscope distal portion relative to the anatomical target, an angle of a cannula or a surgical element used in cannulation, a protrusion amount of a cannula or a surgical element, a speed or force applied to the endoscope distal portion or a surgical element, or a rotational direction or a cutting area of a surgical element, among others. In some examples, the navigation plan may include a projected navigation path 518 toward the anatomical target of interest.

In some examples, artificial intelligence (AI) technology may be used by the image processing unit 511 to generate reconstructed 3D images from various image sources, or used by the navigation planning unit 515 to generate an endoscope navigation plan. A machine-learning (ML) model may be trained using procedure data stored in a database, including images of different modalities, acquired from multiple patients in prior endoscopic procedures of the same or similar type. The ML model may be trained using supervised learning, unsupervised learning, or reinforcement leaning. Examples of ML model architectures and algorithms may include, for example, decision trees, neural networks, support vector machines, or a deep-learning networks, etc. Examples of deep-learning networks include a convolutional neural network (CNN), a recurrent neural network (RNN), a deep belief network (DBN), or a hybrid neural network comprising two or more neural network models of different types or different model configurations. In an example, the training of a ML model may include constructing a training dataset using selected procedure data of endoscopic procedures performed on a plurality of patients. In an example, the training data can be screened such that only data of procedures performed by experienced physicians, and/or data of procedures on patients with anatomies or medical conditions similar to the present patient, are included in the training dataset. The training of the ML model may be performed continuously or periodically, or in near real time as additional procedure data are made available. The training involves algorithmically adjusting one or more ML model parameters, until the ML model being trained satisfies a specified training convergence criterion.

In an example, a first ML model may be trained to determine, for a given set of images of a patient, optimal parameters used for landmark detection, image registration (e.g., transformation and alignment), and spatial fusion of the registered images (e.g., 3D image reconstruction and integration of images of different modalities). Alternatively, the first ML model may be trained to directly map the input images (optionally along with other information such as the endo-therapeutic device information and/or sensor information) to a reconstructed 3D model. In an example, the 3D image reconstruction unit 512 can take at least two 2D images as input, and use a Simultaneous Localization and Mapping (SLAM) method to generate 3D point positions and a camera trajectory. Deep-learning networks, such as CNN or RNN, can be used for SLAM tasks and to predict depth and camera poses and trajectories, which in turn can be used in reconstructing 3D images. The first trained ML model can be validated, and implemented in an AI-based image integration and navigation planning platform. The image integration unit 513 may apply a set of multi-modality images of the patient (optionally along with the endo-therapeutic device information and/or the sensor signals) to the first trained ML model to generate an integrated image.

In another example, a second ML model may be trained to establish a relationship between images or image features representing variants of the patient anatomy and endoscope navigation plans (e.g., cannulation or navigation parameters, navigation path) for the variants of the patient anatomy. In an example, the second ML model can be trained using video recordings of previously performed procedures. The second trained ML model can be validated, and implemented in the AI-based image integration and navigation planning platform. The navigation planning unit 515 may apply the reconstructed 3D images of the patient anatomy (optionally along with the endo-therapeutic device information and/or the sensor signals) to the second trained ML model to generate the endoscope navigation plan.

In some examples, AI technology may be used to determine an endo-therapeutic device to be used in an endoscopic procedure in a patient based on the patient's anatomy. An ML model may be trained to establish a relationship between (i) images or image features representing variants of patient anatomy, and (ii) endo-therapeutic devices (with respective sizes, shapes, and configurations) as used in respective endoscopic procedures that yield satisfactory outcomes (e.g., satisfying procedure efficacy and/or efficiency criteria). Such trained ML model can be validated, and implemented in the AI-based image integration and navigation planning platform. To plan an endoscopic procedure for a patient, the navigation planning unit 515 may apply the reconstructed 3D images of the patient to the trained ML model to determine an appropriate endo-therapeutic device for the patient.

In some examples, the navigation planning unit 515 may generate the endoscope navigation plan including the navigation parameters 517 and navigation path 518 for positioning and navigating the echoendoscope or the EUS probe based at least on the probe-surface contact force sensed by the force sensor 503. The endoscope navigation plan may include a recommendation to a user, or a control signal to an actuator, to manually or robotically move the EUS probe along the surface of the anatomical target while maintaining the sensed probe-surface contact force at substantially a preset level or within a preset range. As discussed above, a consistent probe-surface contact force is correlated to consistent and stable EUS image quality. Using the force sensor 503 and maintaining a substantially constant and well-controlled probe-surface contact force can advantageously provide high-quality perioperative feedback (e.g., EUS images) to the operator or a robotic and can improve the accuracy of the procedure.

As described above, in robotic endoscopy procedure where a robot arm controls the positioning and navigation of the endoscope, a change in EUS probe position or posture ($\Delta PP$), such as from a first position or posture to a second position or posture after slightly moving the endoscope position or orientation, may be estimated based on the amount of movement of the actuator of the robotic system, which can be sensed using a position sensor. The change in EUS probe position or posture may alternatively be estimated using EUS images taken at respective first and second EUS probe positions or postures, such as based on changes in an image feature (e.g., position of the landmark) between the EUS images. Sometimes, the position sensor-based estimation of the change in $\Delta PP$ ($\Delta PP_{sensor}$) can be different from the EUS image-based estimation of $\Delta PP$ ($\Delta PP_{image}$). Such discrepancy in estimations may indicate that the robotic feedback control of the endoscope and the EUS probe, when solely based on the position sensor output, may not be reliable and may lead to navigation or positioning errors in certain occasions. A deviation/correlation analyzer 519 can determine a deviation or a correlation between the sensor-based estimation ($\Delta PP_{sensor}$) and the EUS image-based estimation ($\Delta PP_{image}$). The navigation planning unit 515 can modify the endoscope navigation plan to correct the discrepancies between $\Delta PP_{sensor}$ and $\Delta PP_{image}$. For example, one or more operational parameters of the EUS probe can be determined or adjusted to reduce the discrepancies between $\Delta PP_{sensor}$ and $\Delta PP_{image}$ (e.g., to increase the correlation between $\Delta PP_{sensor}$ and $\Delta PP_{image}$ to a level exceeding the correlation threshold, or to decrease the deviation between $\Delta PP_{sensor}$ and $\Delta PP_{image}$ to a level below a deviation threshold). Examples of such operational parameters may include a position of the EUS probe to aim a center of the anatomical target, a desired rotating angle of the EUS probe, or a contact force between the EUS probe and a surface of the anatomical target. Correcting such discrepancies between $\Delta PP_{sensor}$ and ΔPP$_{image}$ allows for more precise robotic control of the EUS probe to capture a desired target anatomy. For example, by using the control amount of the actuator of the robot and the above-mentioned correlation coefficient, it is possible to accurately and safely determine the position of the target at the center of EUS images, the angle at which the EUS probe should be applied, the pressing force, and the like.

The user interface 540 may include an output unit 542 and an input unit 545. The output unit 542 may include a display 543 that can display the reconstructed 3D images of the patient anatomy such as generated by the image processing unit 511. In some examples, the display 543 can present a visual presentation of the endoscope navigation plan such as generated by the navigation planning unit 515.

In some examples, the displayed region of the reconstructed 3D images can be automatically adjusted in accordance with the endoscope navigation plan. In addition, the display 543 may display the real-time 3D image of the patent's anatomy during the procedure. Further, the output unit 542 may automatically zoom in or zoom out a region in the image of the patient anatomy based on a position or direction of a distal end of the endoscope relative to an anatomical target. For example, the output unit 542 may automatically zoom in an image as the endoscope tip gets closer to the anatomical target to show more structural details. Alternatively, the zooming function can be activated and adjusted manually by the user (e.g., operating physician) via the input unit 545. In an example, the output unit 542 can display a cross-section view of an anatomy in a direction specified by a user, such as via the input unit 545. In an example, the user may adjust viewing angle (e.g., rotating the view) via the input unit 545 to have a substantially 360-degree view of the reconstructed 3D images. In an example, at least a portion of the input unit 545 can be incorporated into the endoscope, such as the handle section 32 of endoscope 14, to facilitate user control of the viewing area and viewing angle during the procedure.

In some examples, the output unit 542 may display, on the reconstructed 3D images of the patient anatomy, one or more of visual indication of one or more of an anatomical target, a projected navigation direction/path toward the anatomical target, or a progress of the endoscope advancing toward the anatomical target along the projected navigation path. Display settings can be adjusted by the user via the input unit 545. The visual indication may take the format of markers, annotations (e.g., icons, texts, or graphs), highlights, or animation, among other visual indicators. In an example, markers of different shapes, colors, forms, or sizes can be displayed over the reconstructed or integrated image to differentiate different tissue, anatomical regions, their accessibility, or vulnerability to protrusion force exerted by endoscope tip.

The output unit 542 may include an alert and feedback generator 544 that can generate an alert, a notification, or other type of human-perceptible feedback on the status or progress of the cannulation or navigation in reference to the navigation plan. For example, an alert can be generated to indicate a risk of tissue damage associated with improper cannulation. The feedback can be in one or more forms of audio feedback, visual feedback, or haptic feedback. For example, a proximity sensor on the endoscope can measure a distance to a critical anatomical target. When the endoscope tip enters or comes closer to a "critical zone" as indicated by the measured distance being shorter than a threshold, the critical zone can be displayed in different colors to represent the proximity of the endoscope tip to the anatomical target, such as a green zone, a yellow zone, and a red zone as the endoscope gets closer and closer to the anatomical target. Additionally or alternatively, human-perceptible haptic feedback such as touch or vibration may be generated and provided to the operating physician. The alert and feedback generator 544 can automatically adjust the vibration strength according to the distance to the critical zone. For example, a low vibration can be generated when the endoscope tip is in a green zone. If the system predicts, based on present advancing speed and direction of the endoscope, that the endoscope tip will reach the critical zone in a time less than a predetermined threshold, then the alert and feedback generator 544 can apply moderate vibration when the endoscope tip reaches the yellow zone, and apply high vibration when the endoscope tip reaches the red zone to indicate a heightened risk of tissue damage. The real-time alert and feedback in an image-guided endoscopic procedure as described herein can improve the efficiency of cannulation and endoscope navigation, especially for inexperienced physicians, and can improve endoscopic procedure success rate and patient outcome.

In an example, the projected navigation path 518 for an endoscope (or other steerable elongate instrument such as a guidewire) can be displayed in one color and overlaid upon the preoperative images. Once insertion of the endoscope starts, the actual, live navigation path can be displayed in a different color over the planned navigation path. In case that the actual navigation path substantially deviates from the planned navigation path, an alert may be generated to notify the physician such effect. Cannulation or navigation parameters, such as distance to duodenal papilla, can be displayed in real-time on the display 543 to indicate the progress of the procedure. In some examples, the output unit 542 may provide real-time recommendations for adjusting the cannulation or navigation. Once the cannulation is completed successfully, an audio, visual, or haptic confirmation can be generated and provided to the physician. The image-guided endoscopic procedure and real-time alert and feedback as described in this disclosure can improve cannulation and endoscope navigation accuracy and efficiency and procedure success rate, especially for inexperienced physicians.

Figure 16:
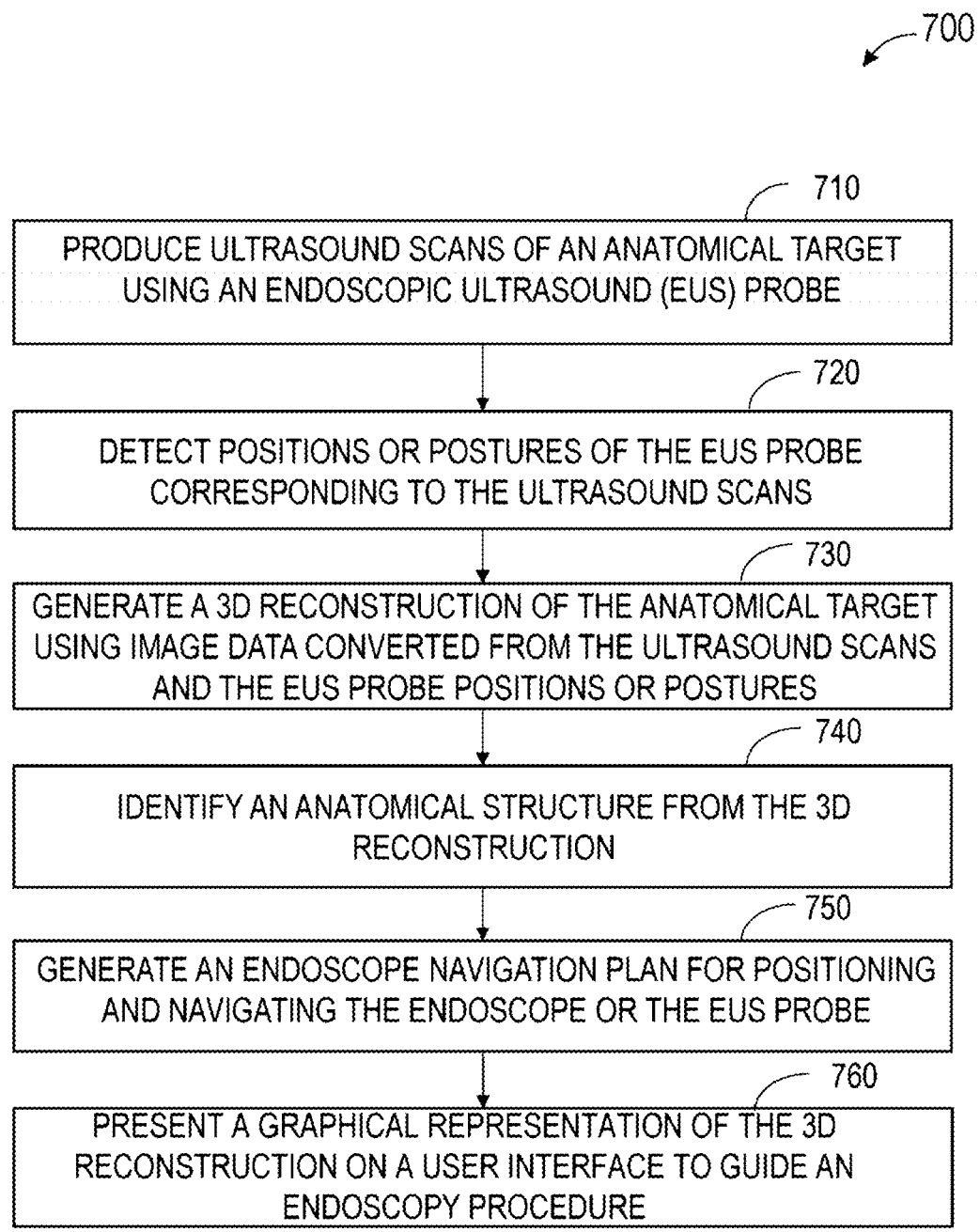
FIG. 16 is a flow chart illustrating an example method for creating a 3D reconstruction of an anatomical target and using the same for planning an endoscopic procedure.

FIG. 16 is a flow chart illustrating an example method 700 of creating a 3D reconstruction of an anatomical target and using the same for planning an endoscopic procedure. The method 700 may be implemented in and executed by the system 500. Although the processes of the method 700 are drawn in one flow chart, they are not required to be performed in a particular order. In various examples, some of the processes can be performed in a different order than that illustrated herein.

At 710, ultrasound scans of an anatomical target can be produced using an endoscopic ultrasound (EUS) probe placed at different positions or postures relative to the anatomical target. The endoscopic EUS probe, such as the EUS probe as shown in FIGS. 12A-12B and 13, can be manually operated or automatically controlled via a robot system and positioned at different locations or postures to take ultrasound scans of the anatomical target. The ultrasound scans can be converted into EUS images which, along with the corresponding positions and postures of the EUS probe, can be used to generate a 3D reconstruction of the anatomical target.

Various types of ultrasound scans can be generated depending on the type of EUS probe. In an example, the ultrasound scans may include a plurality of radial scans as the EUS probe is manually or robotically actuated to rotate around an longitudinal axis of the endoscope, such that the radial scans are in a plane perpendicular to an longitudinal axis of the endoscope from different angular positions centered on the longitudinal axis, as illustrated in FIG. 15A. Additionally or alternatively, the ultrasound scans may include a plurality of linear array scans as the EUS probe is manually or robotically actuated to move to-and-fro along an longitudinal axis of the endoscope, such that the linear array scans are in a plane parallel to the longitudinal axis of the endoscope from different longitudinal positions along the longitudinal axis, as illustrated in FIG. 15B. In some examples, the ultrasound scans can be produced by an echoendoscope that has a bifurcated structure comprising two or more EUS probes each producing a respective set of ultrasound scans at respective positions or postures.

At 720, the positions or postures of the EUS probe corresponding to the ultrasound scans produced at 710 can be detected such as using a position sensor. In an example, the position and posture of the EUS probe can be detected using an external electromagnetic (EM) wave detector that can detect transabdominally EM wave emission from an EM emitter associated with the EUS probe. In another example, the position and posture of the EUS probe can be detected based on an optical signal emitted from an optical signal source associated with the EUS probe and detected using an external optical sensor. In another example, the position and posture of the EUS probe can be detected based on a shape of a shaft portion of the endoscope sensed using an internal shape sensor disposed at the shaft portion of the endoscope in proximity to the EUS probe. In yet another example, the position and posture of the EUS probe can be detected based on an rotation angle of the EUS probe actuated by an actuator of a robot, where the rotation angle can be sensed using an external angle sensor associated with the actuator.

At 730, a 3D reconstruction of the anatomical target can be generated using at least the EUS images converted from the ultrasound scans as obtained from step 710 and the detected positions or postures of the EUS probe as obtained from step 720. In some examples, other preoperative or perioperative images from one or more imaging modalities other than EUS can also be used in constructing the 3D image data. Examples of such preoperative or perioperative images include perioperative endoscope images or videos of the anatomical target and its surrounding environment (e.g., biliary duct strictures) captured by an imaging sensor associated with the echoendoscope, preoperative or perioperative X-ray or fluoroscopy images, electrical potential map or an electrical impedance map, CT images, or MRI images such as images obtained during MRCP, among others.

In some examples, a subset of the received images (including the EUS images, and optionally images of other modalities) may be selected for use in creating a 3D reconstruction of the anatomical target. The image selection can be based on image qualities, such as signal to noise ratio, sharpness, contrast, level of distortion, exposure accuracy, among other attributes. In some examples, a force sensor associated with the EUS probe can be used to sense the contact force between the EUS probe and a surface of the anatomical target when the ultrasound scans are taken. A subset of the ultrasound scans that correspond to the sensed contact force being maintained at a substantially constant value, or being maintaining at or exceeding a force threshold, can be selected for creating the 3D reconstruction. In some examples, an anatomical structure can be identified from one or more of the received images (such as EUS images) and the locations of the anatomical structure can be determined. A subset of the images in which the identified locations of the anatomical structure are at substantially the center of the respective images can be selected for creating the 3D reconstruction.

The selected subset of the images (which may include one or more of the selected EUS images, and optionally one or more endoscopic images or external images sources) can be used to create the 3D reconstruction, such as using the 3D image reconstruction unit 512. A landmark may be recognized from each of the received images and used for image alignment or registration. The landmark can have a known geometry, location, or the spatial characteristics. By way of example and not limitation, the landmarks include duodenal papilla, a bile duct, a pancreatic duct, a blood vessel, etc. In certain examples, the landmark can be recognized using a trained machine-learning model. The images can be aligned with respect to respective landmarks detected from the received images.

In some examples, in the presence of changes in organ geometries such as due to organ shift or deformation during the procedure, the images being used for 3D reconstruction can be corrected or compensate for organ shift or deformation, such as using the organ shift detector 514. In an example, the organ shift can be detected using a plurality of EUS images converted from ultrasound scans taken at different times when the EUS probe is at a fixed position and posture. A common anatomical landmark (e.g., papilla, bile duct, pancreatic duct, or one or more blood vessels) can be recognized from each of the EUS images. The EUS images can be aligned with respect to the detected common landmark. A spatial shift or deformation of the anatomical structure can be detected based on a change (across the EUS images taken at different time) in the position of the anatomical target relative to the landmark on the EUS image. In the presence of the detected organ shift, the location of the anatomical structure on the reconstructed 3D image can be adjusted to correct or compensate for the detected spatial shift.

At 740, an anatomical structure can be identified from the 3D reconstruction, such as using the target anatomy recognition unit 516. In an example, the anatomical structure can be recognized and its location on the reconstructed 3D image be determined using a template matching technique, where geometric features (e.g., edges) or other spatial characteristics of a portion of the reconstructed 3D image may be compared to an anatomical target template to determine a morphological similarity or a distance in a feature space. Alternatively, the anatomical structure of interest may be identified manually by the user such as from the reconstructed 3D images displayed on a user interface.

In some examples, the reconstructed 3D image can be integrated with a real-time perioperative endoscopic image (e.g., a real-time EUS image or a real-time optical endoscopic image) of the anatomical target being taken at a specific ESU probe position or posture. In an example, a real-time perioperative endoscopic image (e.g., a real-time EUS image or a real-time optical endoscopic image) can be superimposed onto the reconstructed 3D image data to create a 3D composite image model. An alignment between the position or posture of the ESU probe corresponding to the real-time perioperative endoscopic image and the positions or postures of the EUS probe used for creating the reconstructed 3D image data can be made prior to superimposing the real-time perioperative endoscopic image onto the reconstructed 3D image data.

At 750, the 3D reconstruction of the anatomical target can be used to generate a navigation plan for navigating and positioning and the endoscope or the EUS probe. This may include estimating one or more navigation parameters including, for example, a position of the endoscope distal portion relative to an anatomical target of interest, such as a distance from the endoscope distal portion to duodenal papilla, a heading direction of the endoscope distal portion relative to the anatomical target, an angle of a cannula or a surgical element used in cannulation, a protrusion amount of a cannula or a surgical element, a speed or force applied to the endoscope distal portion or a surgical element, a rotational direction or a cutting area of a surgical element, or a projected navigation path toward the anatomical target of interest. The EUS probe operational parameters may include, for example, a position of the EUS probe to aim a center of the anatomical target, a rotating angle of the EUS probe, or a contact force between the EUS probe and a surface of the anatomical target, among others. In an example, the reconstructed 3D images of the patient anatomy, optionally along with the endo-therapeutic device information and/or the sensor signals, may be applied to a trained machine-learning model to generate the navigation plan. The navigation plan can be provided to a user or a robotic to reposition or renavigate the endoscope or the EUS probe.

In some examples, the navigation plan can be based on an estimated of a change in EUS probe position and posture (ΔPP) such as from a first position or posture to a second position or posture after slightly moving the endoscope or repositioning the EUS probe. A first estimate of the ΔPP can be based on the amount of movement of an actuator of the robotic system that robotically positioning and navigating the endoscope, which can be sensed using a position sensor. A second estimate of the ΔPP can be based image data from the first ultrasound scan and image data from the second ultrasound scan. A correlation or a deviation between the first and second ΔPP estimates can then be determined. One or more operational parameter of the EUS probe can be determined or adjusted to keep the correlation between the first and second ΔPP estimates exceeding a correlation threshold, or the deviation between the first and second ΔPP estimates below a deviation threshold.

At 760, a graphical representation of the generated 3D reconstruction can be presented to a user on a user interface. The preoperative or perioperative images that are selected for constructing the 3D image may also be displayed to the user. In an example, the 3D composite image model that is created by superimposing a real-time perioperative endoscopic image (e.g., a real-time EUS image or a real-time optical endoscopic image) onto the reconstructed 3D image can be displayed to the user. The graphical representation may further include a visual identifier of the anatomical target, such as a visual highlight of the anatomical target on the superimposed image. In some examples, a visual presentation of the navigation plan generated at 750 can be displayed on the user interface to guide the operating physician during the procedure. In some examples, contact force between the EUS probe and a surface of the anatomical target, such as sensed by a force sensor associated with the EUS probe as described above, can be monitored during the procedure. The contact force can be provided to the operating physician or a robotic as a feedback to guide positioning and navigation of the endoscope or the EUS probe while maintaining the sensed contact force at substantially a preset level or within a preset range. In some examples, an alert, a notification, or other types of human-perceptible feedback may be generated and provided to the operating physician to indicate the status or progress of the cannulation or navigation in reference to the navigation plan. The feedback can be in one or more forms of audio feedback, visual feedback, or haptic feedback.

Figure 17:
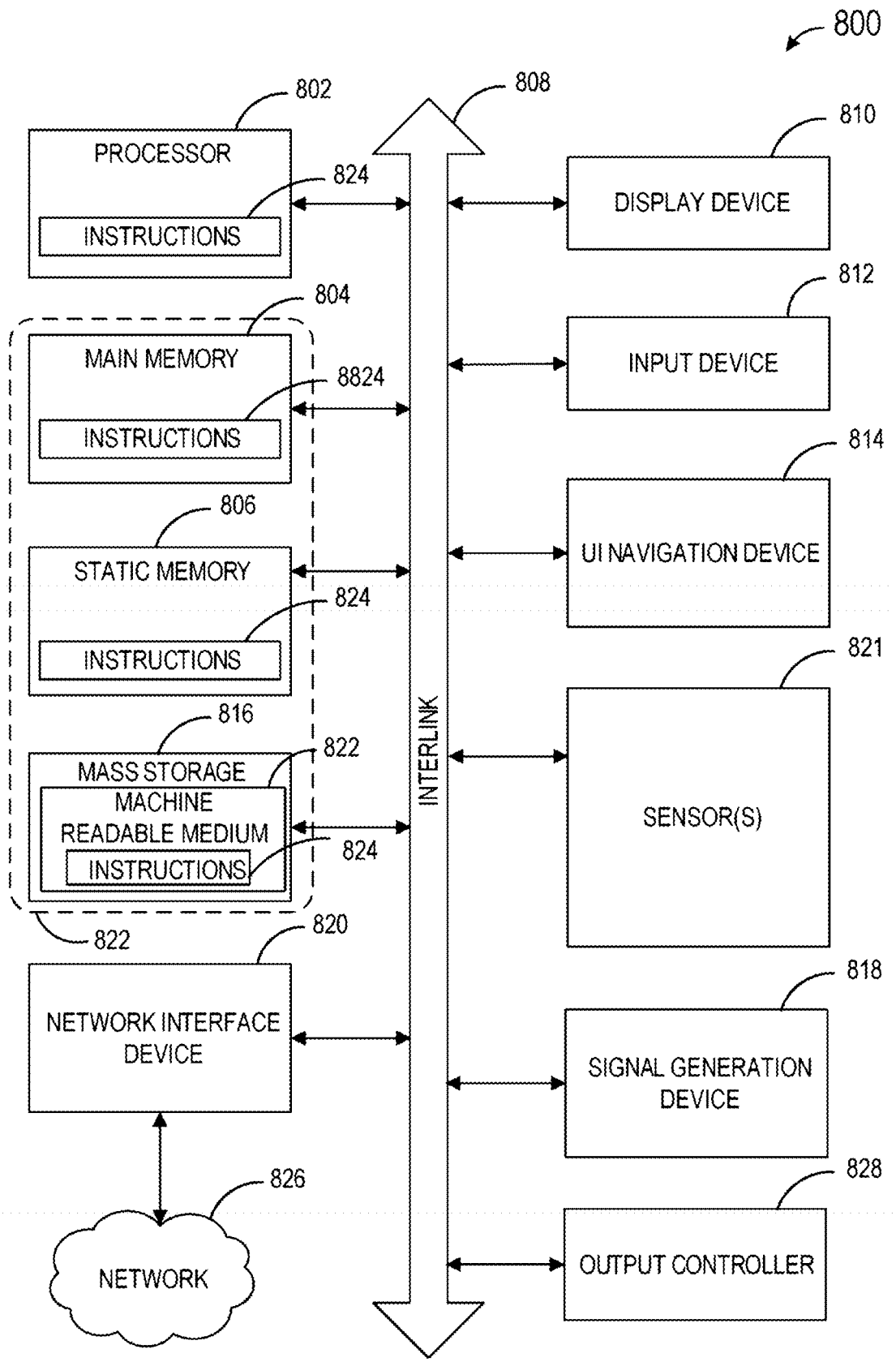
FIG. 17 is a block diagram illustrating an example machine upon which any one or more of the techniques (e.g., methodologies) discussed herein may perform.

FIG. 17 illustrates generally a block diagram of an example machine 800 upon which any one or more of the techniques (e.g., methodologies) discussed herein may perform. Portions of this description may apply to the computing framework of various portions of the 3D endoscopic navigation system 500, such as the image processing unit 511 and the navigation planning unit 515.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810 (e.g., a raster display, vector display, holographic display, etc.), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine-readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 824 may further be transmitted or received over a communication network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communication network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

(1st aspect) An endoscopic system, comprising:
an endoscope comprising an endoscopic ultrasound (EUS) probe configured to produce ultrasound scans of an anatomical target as the EUS probe is controllably placed at different positions or postures relative to the anatomical target;
a position sensor configured to detect the different positions or postures of the EUS probe corresponding to the ultrasound scans; and
a processor configured to:
generate a three-dimensional (3D) reconstruction of the anatomical target using (i) EUS images converted from the ultrasound scans and (ii) the detected different positions or postures of the EUS probe; and
present a graphical representation of the generated 3D reconstruction on a user interface.

(2nd aspect) The endoscopic system of 1st aspect, wherein the processor is configured to generate the 3D reconstruction further using preoperative or perioperative image data from one or more imaging modalities different than endoscopic ultrasound.

(3rd aspect) The endoscopic system of any of 1st-2nd aspect, wherein the EUS probe is manually or robotically actuatable to rotate around an longitudinal axis of the endoscope to create a plurality of radial scans in a plane perpendicular to an longitudinal axis of the endoscope from different angular positions centered on the longitudinal axis, wherein the processor is configured to generate the 3D reconstruction using EUS images converted from the plurality of radial scans.

(4th aspect) The endoscopic system of any of 1st-3rd aspect, wherein the EUS probe is manually or robotically actuatable to move to-and-fro along an longitudinal axis of the endoscope to create a plurality of linear array scans in a plane parallel to the longitudinal axis of the endoscope from different longitudinal positions along the longitudinal axis, wherein the processor is configured to generate the 3D reconstruction using EUS images converted from the plurality of linear array scans.

(5th aspect) The endoscopic system of any of 1st-4th aspect, wherein the processor is configured to:
identify an anatomical structure from each of the EUS images converted from the ultrasound scans;
select a subset of the EUS images with the identified anatomical structure being located at substantially a center of respective EUS images; and
generate the 3D reconstruction using the selected subset of images.

(6th aspect) The endoscopic system of any of 1st-5th aspect, wherein the processor is configured to:
determine respective image qualities of the EUS images; and
generate the 3D reconstruction using a subset of the EUS images selected based on the respective image qualities.

(7th aspect) The endoscopic system of any of 1st-6th aspect, comprising a force sensor configured to sense contact force between the EUS probe and a surface of the anatomical target when the ultrasound scans are taken,
wherein the processor is configured to generate the 3D reconstruction using a subset of the EUS images corresponding to the sensed contact force being maintained at a substantially constant value.

(8th aspect) The endoscopic system of 7th aspect, wherein the processor is configured to provide the sensed contact force to a user or a robotic endoscopy system as a feedback to guide positioning and navigation of the endoscope or the EUS probe while maintaining the sensed contact force at substantially a preset level or within a preset range.

(9th aspect) The endoscopic system of any of 1st-8th aspect, comprising a force sensor configured to sense contact force between the EUS probe and a surface of the anatomical target when the ultrasound scans are taken,
wherein the processor is configured to generate the 3D reconstruction using a subset of the EUS images corresponding to the sensed contact force being equal to or exceeding a force threshold.

(10th aspect) The endoscopic system of 9th aspect, wherein the processor is configured to provide the sensed contact force to a user or a robotic endoscopy system as a feedback to guide positioning and navigation of the endoscope or the EUS probe while maintaining the sensed contact force being equal to or exceeding the force threshold.

(11th aspect) The endoscopic system of any of 1st-10th aspect, wherein the position sensor includes at least one of:
an external electromagnetic (EM) detector configured to detect transabdominal EM wave emission from an EM emitter associated with the EUS probe; or
an external optical sensor configured to detect an optical signal emitted from an optical signal source associated with the EUS probe.

(12th aspect) The endoscopic system of any of 1st-11th aspect, wherein the position sensor includes an internal shape sensor disposed at a shaft portion of the endoscope in proximity to the EUS probe, the internal shape sensor configured to sense a shape of the shaft portion of the endoscope.

(13th aspect) The endoscopic system of any of 1st-12th aspect, wherein the position sensor includes an external angle sensor associated with an actuator to robotically manipulate the endoscope and the EUS probe, the external angle sensor configured to detect a rotation angel of the EUS probe actuated by the actuator.

(14th aspect) The endoscopic system of any of 1st-13th aspect, wherein the processor is configured to:
receive a real-time perioperative endoscopic image of the anatomical target taken at a real-time position or posture of the EUS probe during an endoscopic procedure;
generate a virtual EUS image based on the generated 3D reconstruction of the anatomical target and the real-time position or posture of the EUS probe;
superimpose the real-time perioperative endoscopic image onto the virtual EUS image to create a 3D composite image model; and
present on the user interface a graphical representation of the 3D composite image model.

(15th aspect) The endoscopic system of any of 1st-14th aspect, wherein the ultrasound scans include two or more ultrasound scans taken at different times when the EUS probe is at fixed position and posture, and wherein the processor is configured to:
detect a common anatomical landmark from each of EUS images of the two or more ultrasound scans;
detect a spatial shift of an anatomical structure using the detected common anatomical landmark; and adjust a location of the anatomical structure in the graphical representation of the 3D reconstruction to correct or compensate for the detected spatial shift.

(16th aspect) The endoscopic system of 15th aspect, wherein the processor is configured to present a graphical representation of a real-time perioperative endoscopic image superimposed onto the 3D reconstruction with the adjusted location of the anatomical structure.

(17th aspect) The endoscopic system of any of 1st-16th aspect, wherein the processor is further configured to:
  detect a presence or absence of an anatomical structure from a real-time perioperative endoscopic image of the anatomical target;
  in response to the detected presence of the anatomical structure, present on the user interface a graphical representation of the anatomical structure on the real-time perioperative endoscopic image; and
  in response to the detected absence of the anatomical structure:
    generate an endoscope navigation plan for positioning and navigating the endoscope or the EUS probe using the generated 3D reconstruction;
    provide the endoscope navigation plan to a user or a robotic endoscopy system to reposition or renavigate the endoscope or the EUS probe; and
    detect the presence or absence of the anatomical structure from a different real-time perioperative endoscopic image.

(18th aspect) The endoscopic system of any of 1st-17th aspect, wherein the ultrasound scans include a first ultrasound scan taken at a first position or posture of the EUS probe, and a second ultrasound scan taken at a second position or posture of the EUS probe,
  wherein the processor is configured to:
    generate a first estimate of a change from the first position or posture to the second position or posture ($\Delta PP$) based on outputs of the position sensor;
    generate a second estimate of the $\Delta PP$ using EUS images converted from the first ultrasound scan and EUS images converted from the second ultrasound scan; and
    generate or update an endoscope navigation plan for positioning and navigating the endoscope or the EUS probe based at least on a comparison between the first estimate of $\Delta PP$ and the second estimate of $\Delta PP$.

(19th aspect) The endoscopic system of 18th aspect, wherein the processor is configured to determine a correlation or a deviation between the first estimate of $\Delta PP$ and the second estimate of $\Delta PP$, wherein to generate or update the endoscope navigation plan includes to determine an operational parameter of the EUS probe that corresponds to (i) the determined correlation exceeding a correlation threshold or (ii) the determined deviation falling below a deviation threshold.

(20th aspect) The endoscopic system of 19th aspect, wherein the operational parameter of the EUS probe includes at least one of:
  a position of the EUS probe to aim a center of the anatomical target;
  a rotating angle of the EUS probe; or
  a contact force between the EUS probe and a surface of the anatomical target.

(21th aspect) A method of planning an ultrasound guided endoscopic procedure, the method comprising:
  producing ultrasound scans of an anatomical target using an endoscopic ultrasound (EUS) probe being placed at different positions or postures relative to the anatomical target;
  detecting, via a position sensor, the different positions or postures of the EUS probe corresponding to the ultrasound scans;
  generating a three-dimensional (3D) reconstruction of the anatomical target using (i) EUS images converted from the ultrasound scans and (ii) the detected different positions or postures of the EUS probe; and
  presenting a graphical representation of the generated 3D reconstruction on a user interface.

(22th aspect) The method of 21th aspect, wherein generating the 3D reconstruction further includes using preoperative or perioperative image data from one or more imaging modalities other than endoscopic ultrasound.

(23th aspect) The method of any of 21th-22th aspect, wherein the ultrasound scans used for generating the 3D reconstruction includes a plurality of radial scans as the EUS probe is manually or robotically actuated to rotate around an longitudinal axis of the endoscope, the plurality of radial scans being in a plane perpendicular to an longitudinal axis of the endoscope from different angular positions centered on the longitudinal axis.

(24th aspect) The method of any of 21th-23th aspect, wherein the ultrasound scans used for generating the 3D reconstruction includes a plurality of linear array scans as the EUS probe is manually or robotically actuated to move to-and-fro along an longitudinal axis of the endoscope, the plurality of linear array scans being in a plane parallel to the longitudinal axis of the endoscope from different longitudinal positions along the longitudinal axis.

(25th aspect) The method of any of 21th-24th aspect, comprising:
  identifying an anatomical structure from each of the EUS images converted from the ultrasound scans;
  selecting a subset of the EUS images with the identified anatomical structure being located at substantially a center of respective EUS images; and
  generating the 3D reconstruction using the selected subset of the EUS images.

(26th aspect) The method of any of 21th-25th aspect, comprising:
  determining respective image qualities of the EUS images; and
  generating the 3D reconstruction using a subset of the EUS images selected based on the respective image qualities.

(27th aspect) The method of any of 21th-26th aspect, comprising:
  sensing contact force between the EUS probe and a surface of the anatomical target when the ultrasound scans are taken; and
  generating the 3D reconstruction using a subset of the EUS images corresponding to the sensed contact force being maintained at a substantially constant value or being equal to or exceeding a force threshold.

(28th aspect) The method of 27th aspect, comprising providing the sensed contact force to a user or a robotic endoscopy system as a feedback to guide positioning and navigation of the endoscope or the EUS probe while maintaining the sensed contact force at substantially a preset level or within a preset range, or at or exceeding a force threshold.

(29th aspect) The method of any of 21th-28th aspect, wherein detecting the different positions or postures of the EUS probe is based on at least one of:
- electromagnetic (EM) wave emission from an EM emitter associated with the EUS probe and transabdominally detected using an external EM sensor;
- an optical signal emitted from an optical signal source associated with the EUS probe and detected using an external optical sensor;
- a shape of a shaft portion of the endoscope sensed using an internal shape sensor disposed at the shaft portion of the endoscope in proximity to the EUS probe; or
- an rotation angle of the EUS probe actuated by an actuator of a robot endoscopy system, the rotation angle sensed using an external angle sensor associated with the actuator.

(30th aspect) The method of any of 21th-29th aspect, comprising:
- receiving a real-time perioperative endoscopic image of the anatomical target taken at a position or posture of the EUS probe during an endoscopic procedure;
- generating a virtual EUS image based on the generated 3D reconstruction of the anatomical target and the real-time position or posture of the EUS probe;
- superimposing the real-time perioperative endoscopic image onto the virtual EUS image to create a 3D composite image model; and
- presenting on the user interface a graphical representation of the 3D composite image.

(31th aspect) The method of any of 21th-30th aspect, wherein the ultrasound scans of the anatomical target include two or more ultrasound scans taken at different times when the EUS probe is at fixed position and posture, the method comprising:
- detecting a common anatomical landmark from each of EUS images of the two or more ultrasound scans;
- detecting a spatial shift of an anatomical structure using the detected common anatomical landmark; and
- adjusting a location of the anatomical structure in the graphical representation of the generated 3D reconstruction to correct or compensate for the detected spatial shift.

(32th aspect) The method of 31th aspect, comprising presenting a graphical representation of a real-time perioperative endoscopic image superimposed onto the generated 3D reconstruction with the adjusted location of the anatomical structure.

(33th aspect) The method of any of 21th-32th aspect, comprising:
- detecting a presence or absence of an anatomical structure from a real-time perioperative endoscopic image of the anatomical target;
- in response to the detected presence of the anatomical structure, presenting on the user interface a graphical representation of the anatomical structure on the real-time perioperative endoscopic image; and
- in response to the detected absence of the anatomical structure:
  - generating an endoscope navigation plan for positioning and navigating the endoscope or the EUS probe using the generated 3D reconstruction;
  - providing the endoscope navigation plan to a user or a robotic endoscopy system to reposition or renavigate the endoscope or the EUS probe; and
  - detecting the presence or absence of the anatomical structure from a different real-time perioperative endoscopic image.

(34th aspect) The method of any of 21th-33th aspect, wherein the ultrasound scans include a first ultrasound scan taken at a first position or posture of the EUS probe, and a second ultrasound scan taken at a second position or posture of the EUS probe, the method further comprising:
- generating a first estimate of a change from the first position or posture to the second position or posture ($\Delta PP$) based on outputs of the position sensor;
- generating a second estimate of the $\Delta PP$ using EUS images converted from the first ultrasound scan and EUS images converted from the second ultrasound scan; and
- generating or updating an endoscope navigation plan for positioning and navigating the endoscope or the EUS probe based at least on a comparison between the first estimate of $\Delta PP$ and the second estimate of $\Delta PP$.

(35th aspect) The method of 34th aspect, comprising determining a correlation or a deviation between the first estimate of $\Delta PP$ and the second estimate of $\Delta PP$, wherein generating or updating the endoscope navigation plan includes determining an operational parameter of the EUS probe that corresponds to the correlation exceeding a correlation threshold, or the determined deviation falling below a deviation threshold.

(36th aspect) The method of 35th aspect, wherein the operational parameter of the EUS probe includes at least one of:
- the operational parameter of the EUS probe including at least one of:
  - a position of the EUS probe to aim a center of the anatomical target;
  - a rotating angle of the EUS probe; or
  - a contact force between the EUS probe and a surface of the anatomical target.

(37th aspect) An image processor, comprising:
- an image input circuit configured to receive EUS images of an anatomical target from an endoscope and information about positions or postures of an EUS probe of the endoscope corresponding to each of the received EUS images; and
- an image processing circuit configured to:
  - generate a three-dimensional (3D) reconstruction of the anatomical target using the received EUS images and the information about the positions or postures of the EUS probe; and
  - present a graphical representation of the generated 3D reconstruction on a user interface.

(38th aspect) The image processor of 37th aspect, wherein the image processing circuit is configured to generate the 3D reconstruction further using preoperative or perioperative image data from one or more imaging modalities different than endoscopic ultrasound.

(39th aspect) The image processor of any of 37th-38th aspect, wherein the image processing circuit is configured to determine respective image qualities of the EUS images, and to generate the 3D reconstruction using a subset of the EUS images selected based on the respective image qualities.

(40th aspect) The image processor of any of 37th-39th aspect, wherein the image processing circuit is configured to receive information about contact force between the EUS probe and a surface of the anatomical target, and to generate the 3D reconstruction using a subset of the EUS images corresponding to the received contact force being maintained at a substantially constant value, or being equal to or exceeding a force threshold.

(41th aspect) The image processor of 40th aspect, wherein the image processing circuit is configured to provide the sensed contact force to a user or a robotic endoscopy system as a feedback to guide positioning and navigation of the endoscope or the EUS probe while maintaining the sensed contact force at substantially a preset level or within a preset range, or at or exceeding a force threshold.

(42th aspect) The image processor of any of 37th-41th aspect, wherein the image processing circuit is configured to:
  receive a real-time perioperative endoscopic image of the anatomical target taken at a real-time position or posture of the EUS probe during an endoscopic procedure;
  generate a virtual EUS image based on the generated 3D reconstruction of the anatomical target and the real-time position or posture of the EUS probe;
  superimpose the real-time perioperative endoscopic image onto the virtual EUS image to create a 3D composite image model; and
  present on the user interface a graphical representation of the 3D composite image model.

(43th aspect) The image processor of any of 37th-42th aspect, wherein the received EUS images include two or more EUS images taken at different times and corresponding to the EUS probe being positioned at fixed position and posture, and wherein the image processing circuit is configured to:
  detect a common anatomical landmark from each of the two or more EUS images;
  detect a spatial shift of an anatomical structure using the detected common anatomical landmark; and
  adjust a location of the anatomical structure in the graphical representation of the 3D reconstruction to correct or compensate for the detected spatial shift.

(44th aspect) The image processor of any of 37th-43th aspect, wherein the image processing circuit is further configured to:
  detect a presence or absence of an anatomical structure from a real-time perioperative endoscopic image of the anatomical target;
  in response to the detected presence of the anatomical structure, present on the user interface a graphical representation of the anatomical structure on the real-time perioperative endoscopic image; and
  in response to the detected absence of the anatomical structure:
    generate an endoscope navigation plan for positioning and navigating the endoscope or the EUS probe using the generated 3D reconstruction;
    provide the endoscope navigation plan to a user or a robotic endoscopy system to reposition or renavigate the endoscope or the EUS probe; and
    detect the presence or absence of the anatomical structure from a different real-time perioperative endoscopic image.

(45th aspect) The image processor of any of 37th-44th aspect, comprising a position sensor configured to detect the positions or postures of the EUS probe corresponding to each of the received EUS images,
  wherein the image processing circuit is configured to:
    generate a first estimate of a change in position or posture (ΔPP) from a first position or posture corresponding a first EUS image to a second position or posture corresponding to a second EUS image, based on outputs of the position sensor;
    generate a second estimate of the ΔPP based on the first and second EUS images; and
    generate or update an endoscope navigation plan for positioning and navigating the endoscope or the EUS probe based at least on a comparison between the first estimate of ΔPP and the second estimate of ΔPP.

What is claimed is:

1. An endoscopic system, comprising:
  a steerable elongate instrument including at least a portion that is configured to be positioned and navigated in a patient anatomy, the steerable elongate instrument comprising (i) an endoscopic ultrasound (EUS) probe configured to produce one or more ultrasound scans of an anatomical target and (ii) a tissue acquisition device configured to sample tissue from the anatomical target;
  a processor configured to:
    receive images including one or more EUS images converted from the one or more ultrasound scans of the anatomical target;
    apply the received images to at least one trained machine-learning (ML) model to generate an EUS-guided tissue acquisition (EUS-TA) plan; and
    provide the EUS-TA plan to a user or a robotic endoscopy system to sample the tissue from the anatomical target during an endoscopic procedure; and
  a force sensor associated with the EUS probe, wherein:
    the force sensor is configured to sense a contact force between the EUS probe and a surface of the anatomical target when the one or more ultrasound scans are taken; and
    the processor is configured to select a subset of the received one or more EUS images that correspond to the sensed contact force being maintained at a substantially constant value, the substantially constant contact force correlating to stable EUS image quality, and to apply the selected subset of the received one or more EUS images to the at least one trained ML model to generate the EUS-TA plan.

2. The endoscopic system of claim 1, wherein the received images include one or more preoperative images prior to the endoscopic procedure or one or more perioperative image during the endoscopic procedure.

3. The endoscopic system of claim 1, wherein the processor is configured to select a subset of the received images based on one or more image qualities, and to apply the selected subset of the received images to the at least one trained ML model to generate the EUS-TA plan.

4. The endoscopic system of claim 1, comprising a user interface configured to present the received images and the EUS-TA plan to the user.

5. The endoscopic system of claim 1, comprising a controller configured to generate a control signal to an actuator of the robotic endoscopy system to robotically facilitate (i) navigation of the steerable elongate instrument or (ii) manipulation of one or more of the EUS probe or the tissue acquisition device in accordance with the EUS-TA plan.

6. The endoscopic system of claim 1, wherein the processor includes a training module configured to generate the trained ML model using a training dataset comprising (i) images including EUS images of respective anatomical targets of a plurality of patients undergoing EUS-TA procedures and (ii) EUS-TA plans for the plurality of patients as used in the EUS-TA procedures.

7. The endoscopic system of claim 1, wherein the EUS-TA plan includes a recommended type or size of the tissue acquisition device for use in the endoscopic procedure.

8. The endoscopic system of claim 7, wherein the tissue acquisition device includes at least one of a tissue aspiration needle, a tissue biopsy needle, a brush, a snare, forceps, or a suction device.

9. The endoscopic system of claim 1, wherein the EUS-TA plan includes a recommended type or size of at least one of an ablation device, a drainage device, or a stricture management device, the recommended type or size based at least in part on the selected subset of the received one or more EUS images being applied to the at least one trained ML model to generate the EUS-TA plan.

10. The endoscopic system of claim 1, wherein the EUS-TA plan includes one or more operational parameters for navigating the steerable elongate instrument, or for maneuvering the tissue acquisition device to facilitate tissue acquisition device, the one or more operational parameters based at least in part on the selected subset of the received one or more EUS images being applied to the at least one trained ML model to generate the EUS-TA plan.

11. The endoscopic system of claim 10, wherein the one or more operational parameters include a position, a posture, a heading direction, or an angle of the tissue acquisition device relative to the anatomical target, the one or more operational parameters based at least in part on the selected subset of the received one or more EUS images being applied to the at least one trained ML model to generate the EUS-TA plan.

12. The endoscopic system of claim 10, wherein the one or more operational parameters include a navigation path for navigating the steerable elongate instrument or maneuvering the EUS probe to the anatomical target, the one or more operational parameters based at least in part on the selected subset of the received one or more EUS images being applied to the at least one trained ML model to generate the EUS-TA plan.

13. The endoscopic system of claim 1, wherein the EUS-TA plan includes one or more operational parameters for positioning and maneuvering the EUS probe to take the ultrasound scans of the anatomical target, the one or more operational parameters based at least in part on the selected subset of the received one or more EUS images being applied to the at least one trained ML model to generate the EUS-TA plan.

14. The endoscopic system of claim 13, wherein the one or more operational parameters include one or more of a position, posture, a heading direction, or an angle of the EUS probe relative to the anatomical target, the one or more operational parameters based at least in part on the selected subset of the received one or more EUS images being applied to the at least one trained ML model to generate the EUS-TA plan.

15. The endoscopic system of claim 13, wherein the one or more operational parameters include a force the EUS probe exerted on a surface of the anatomical target when the ultrasound scans are taken, the one or more operational parameters based at least in part on the selected subset of the received one or more EUS images being applied to the at least one trained ML model to generate the EUS-TA plan.

16. The endoscopic system of claim 1, wherein the processor is configured to apply the received images of the anatomical target to the at least one trained ML model to recognize a lesion on the anatomical target and to determine tissue malignancy of the lesion.

17. The endoscopic system of claim 16, wherein the processor is configured to generate the EUS-TA plan further based on the recognized lesion and the determined tissue malignancy.

18. The endoscopic system of claim 16, comprising a microscopic imaging device coupled to the steerable elongate instrument, the microscopic imaging device configured to generate an in-vivo and substantially real-time microscopic image of the recognized lesion,
wherein the processor is configured to determine the tissue malignancy using the in-vivo and substantially real-time microscopic image.

19. The endoscopic system of claim 18, wherein the processor is configured to present the in-vivo and substantially real-time microscopic image to the user on a user interface.

* * * * *